United States Patent
Ulyanov et al.

(10) Patent No.: US 7,383,235 B1
(45) Date of Patent: Jun. 3, 2008

(54) METHOD AND HARDWARE ARCHITECTURE FOR CONTROLLING A PROCESS OR FOR PROCESSING DATA BASED ON QUANTUM SOFT COMPUTING

(75) Inventors: Serguei Ulyanov, Crema (IT); Gianguido Rizzotto, Civate (IT); Ichiro Kurawaki, Milan (IT); Serguei Panfilov, Crema (IT); Fabio Ghisi, Flero (IT); Paolo Amato, Limbiate (IT); Massimo Porto, Catania (IT)

(73) Assignees: STMicroelectronic S.r.l., Agrate Brianza (IT); Yamaha Motor Europe, N.V., Schiphol-Rijk (NL)

( * ) Notice: Subject to any disclaimer, the term of this patent is extended or adjusted under 35 U.S.C. 154(b) by 0 days.

(21) Appl. No.: 09/979,348

(22) PCT Filed: Mar. 9, 2000

(86) PCT No.: PCT/IT00/00078

§ 371 (c)(1),
(2), (4) Date: Jan. 23, 2002

(87) PCT Pub. No.: WO01/67186

PCT Pub. Date: Sep. 13, 2001

(51) Int. Cl.
*G06F 15/18* (2006.01)
*G06N 3/00* (2006.01)
*G06N 3/12* (2006.01)
(52) U.S. Cl. .................. 706/13; 706/903; 706/906
(58) Field of Classification Search .............. 706/13, 706/903, 906; 701/106
See application file for complete search history.

(56) References Cited

U.S. PATENT DOCUMENTS 5,774,630 A * 6/1998 Lee et al. .................. 706/3

(Continued)

FOREIGN PATENT DOCUMENTS

WO 96/02025 1/1996

OTHER PUBLICATIONS

Mihai Udrescu, Implementing Quantum Genetic Algorithms: A Solution Based on Grover's Algorithm, 2006, ACM, 1-59593-302-6/06/0005, 71-81.*

(Continued)

*Primary Examiner*—Joseph P Hirl
(74) *Attorney, Agent, or Firm*—Lisa K. Jorgenson; Allen, Dyer, Doppelt, Milbrath & Gilchrist, P.A.

(57) ABSTRACT

A method of controlling a process driven by a control signal for producing a corresponding output includes producing an error signal as a function of a state of the process and of a reference signal. A control signal is generated as a function of the error signal and of a parameter adjustment signal. The control signal is applied to the process. A derived signal representative of a quantity to be minimized is calculated by processing paired values of the state of the process and the control signal. A correction signal is calculated from a set of several different values of the control signal that minimizes the derived signal. The parameter adjustment signal is calculated by a neural network and fuzzy logic processor from the error signal and the correction signal. The correction signal is periodically calculated by a Quantum Genetic Search Algorithm that results from a merging of a genetic algorithm and a quantum search algorithm.

15 Claims, 32 Drawing Sheets

U.S. PATENT DOCUMENTS

| | | | | |
|---|---|---|---|---|
| 5,796,077 A | * | 8/1998 | Jo | 219/497 |
| 5,971,579 A | * | 10/1999 | Kim | 700/42 |
| 5,995,737 A | * | 11/1999 | Bonissone et al. | 703/8 |
| 6,216,083 B1 | * | 4/2001 | Ulyanov et al. | 701/106 |
| 6,415,272 B1 | * | 7/2002 | Ulyanov | 706/2 |
| 6,578,018 B1 | * | 6/2003 | Ulyanov | 706/14 |

OTHER PUBLICATIONS

"Physical Limits and Inofrmation Bounds of Micro Control. Part 2: Quantum Soft Computing and Quantum Searching Algorithms", Ulyanov et al., 1998 International Symposium on Micromechatronics and Human Science, 1998 IEEE, 0-7803-5131-4/98, pp. 217-224.

"Global Optimisation by Evolutionary Algorithms", Xin Yao, Computation Intelligence Group, School of Computer Science University College, The University of New South Wales Australian Defense Academy, Canberra, ACT, Australia 2600, 1997 IEEE, 0-8186-7870-4/96, pp. 282-291.

"Fuzzy Models of Intelligent Industrial Controllers and Control Systems. II. Evolution and Principles of Design", Zakharov et al., Journal of Computer and Sciences International, vol. 33, No. 2, Mar.-Apr. 1995, ISSN 1064-2307.

Osei et al. "Use of Quantum Indeterminacy in Optical Parallel Genetic Algorithms" Proceedings of Spie-The International Society for Optical Engineering, vol. 2565, Jul. 10, 1995, pp. 192-197, XP000938185.

Bardeen et al. "Feedback Quantum Control of Molecular Electronic Population Transfer" Chemical Physics Letters, vol. 280, No. 1-2, Nov. 28, 1997, pp. 151-158, XP000937716.

Jones et al. "Implementation of a Quantum Search Algorithm on a Quantum Computer" Nature, vol. 393, No. 6683, May 28, 1998, pp. 344-346, XP000939342.

* cited by examiner

| STEP | CLASSICAL AND QUANTUM ENTROPY | STATES AND GATE OPERATIONS |
|---|---|---|
| | $S_{|\psi\rangle}(\{j\}) = -\lambda_1 \log \lambda_1 - \lambda_2 \log \lambda_2$ | |
| INPUT | $\lambda_{1/2} = \frac{\alpha^2}{2}\left(1+2^n+\frac{\beta^2}{\alpha^2} \pm \sqrt{5-2^{n+2}+2^{2n}+(2^{n+2}-8)\frac{\beta}{\alpha}+2\frac{\beta^2}{\alpha^2}+\frac{\beta^4}{\alpha^4}}\right)$  $H_{Sh}(|\psi\rangle) = -(2^n-1)\alpha^2 \log\alpha^2 - \beta^2 \log\beta^2$ | $\alpha\left(\|0...0\rangle + ... + \frac{\beta}{\alpha}|x\rangle + ... + \|1...1\rangle\right) \otimes \frac{|0\rangle - |1\rangle}{\sqrt{2}}$ |
| ENTANGLE-MENT | $\lambda_{1/2} = \frac{\alpha^2}{2}\left(1+2^n+\frac{\beta^2}{\alpha^2} \pm \sqrt{5-2^{n+2}+2^{2n}+(2^{n+2}-8)\frac{\beta}{\alpha}+2\frac{\beta^2}{\alpha^2}+\frac{\beta^4}{\alpha^4}}\right)$  $H_{Sh}(|\psi\rangle) = -(2^n-1)\alpha^2 \log\alpha^2 - \beta^2 \log\beta^2$ | $\alpha\left(\|0...0\rangle + ... - \frac{\beta}{\alpha}|x\rangle + ... + \|1...1\rangle\right) \otimes \frac{|0\rangle - |1\rangle}{\sqrt{2}}$ |
| INTERFERENCE | $\lambda_{1/2} = \frac{(\alpha-m)^2}{2}\left[-1+2^n+\frac{(\beta+m)^2}{(\alpha-m)^2} \pm \sqrt{5-2^{n+2}+2^{2n}-(2^{n+2}-8)\frac{\beta+m}{\alpha-m}+2\left(\frac{\beta+m}{\alpha-m}\right)^2+\frac{(\beta+m)^4}{(\alpha-m)^4}}\right]$  $H_{Sh}(|\psi\rangle) = -(2^n-1)(\alpha-m)^2 \log(\alpha-m)^2 - (\beta+m)^2 \log(\beta+m)^2$ | $(\alpha-m)\left(\|0...0\rangle + ... + \frac{\beta+m}{\alpha-m}|x\rangle + ... + \|1...1\rangle\right) \otimes \frac{|0\rangle - |1\rangle}{\sqrt{2}}$ |

| | |
|---|---|
| 420 | OPTIMAL CONTROL SYSTEM |
| 422 | SENSOR SYSTEM WITH m SENSORS |
| 4220 | INFORMATION FROM $n=k_1+k_2$ SENSORS |
| 4221 | INFORMATION FROM $k_2$ SENSORS |
| 4222 | INFORMATION FROM $k_1$ SENSORS |
| 424 | CONTROL OBJECT MODEL |
| 425 | CONTROL UNIT |
| 426 | FUZZY NEURAL NETWORK 1 |
| 427 | FIRST GENETIC ALGORITHM |
| 428 | CONTROL OBJECT |
| 429 | TEACHING SIGNAL |
| 440 | OPTIMIZER |
| 442 | THERMODYNAMIC ENTROPY MODEL |
| 443 | TEACHING SIGNAL |
| 444 | SECOND GENETIC ALGORITHM |
| 448 | QUANTUM GENETIC SEARCH ALGORITHM |
| 450 | GLOBAL OPTIMIZER |
| 460 | COMPENSATOR OF SENSOR INFORMATION |
| 462 | MULTIPLIER |
| 464 | INFORMATION CALCULATOR |
| 465 | $I(x_a,y_a)$ |
| 466 | MULTIPLIER |
| 468 | INFORMATION CALCULATOR |
| 469 | $I(x_b,y_b)$ |
| 480 | REDUCED CONTROL SYSTEM |
| 482 | SENSOR SYSTEM WITH $n=m-k$ SENSORS |
| 4820 | INFORMATION FROM $n=k_1+k_2$ SENSORS |
| 4821 | INFORMATION FROM $k_2$ SENSORS |
| 4822 | INFORMATION FROM $k_1$ SENSORS |
| 483 | SENSOR SIGNAL |
| 484 | CONTROL OBJECT MODEL |
| 485 | REDUCED CONTROL UNIT |
| 486 | FUZZY NEURAL NETWORK 2 |
| 488 | CONTROL OBJECT |
| 490 | SUBTRACTOR |
| 491 | SUBTRACTOR |
| $X_a$ | OPTIMAL CONTROL SIGNAL |
| $X_b$ | OUTPUT SENSOR SIGNAL |
| $Y_a$ | REDUCED CONTROL SIGNAL |
| $Y_b$ | OUTPUT SENSOR SIGNAL |
| $\varepsilon_a$ | $x_a-y_a$ |
| $\varepsilon_b$ | $x_b-y_b$ |

*FIG. 33a.*

METHOD AND HARDWARE ARCHITECTURE FOR CONTROLLING A PROCESS OR FOR PROCESSING DATA BASED ON QUANTUM SOFT COMPUTING

FIELD OF THE INVENTION

The present invention relates to controlling a process or for processing data in a database, and more specifically, to controlling a process and/or including a search-of-minimum intelligent operations.

The method of the invention is useful for minimum searching among a set of values, and in particular, for forming hardware control systems exploiting artificial intelligence to robustly control a nonlinear process and/or to search in a database.

BACKGROUND OF THE INVENTION

Feedback control systems are widely used to maintain the output of a dynamic system at a desired value in spite of external disturbances that would displace it from the desired value. For example, a household space heating furnace, controlled by a thermostat, is an example of a feedback control system. The thermostat continuously measures the air temperature inside the house, and when the temperature falls below a desired minimum temperature the thermostat turns the furnace on. When the interior temperature reaches the desired minimum temperature, the thermostat turns the furnace off. The thermostat-furnace system maintains the household temperature at a substantially constant value in spite of external disturbances such as a drop in the outside temperature. Similar types of feedback controls are used in many applications.

A central component in a feedback control system is a controlled object, a machine or a process that can be defined as a "plant", whose output variable is to be controlled. In the above example, the plant is the house, the output variable is the interior air temperature in the house and the disturbance is the flow of heat (dispersion) through the walls of the house. The plant is controlled by a control system. In the above example, the control system is the thermostat in combination with the furnace. The thermostat-furnace system uses a simple on-off feedback control system to maintain the temperature of the house. In many control environments, such as motor shaft position or motor speed control systems, simple on-off feedback control is insufficient. More advanced control systems rely on combinations of proportional feedback control, integral feedback control, and derivative feedback control. A feedback control based on a sum of proportional, plus integral, plus derivative feedback, is often referred as a PID control.

A PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly nonlinear, and unstable. For example, the dynamic model may contain parameters (e.g., masses, inductance, aerodynamics coefficients, etc.) which are either only approximately known or depend on a changing environment. If the parameter variation is small and the dynamic model is stable, then the PID controller may be satisfactory. However, if the parameter variation is large or if the dynamic model is unstable, then it is common to add adaptive or intelligent (AI) control functions to the PID control system.

AI control systems use an optimizer, typically a nonlinear optimizer, to program the operation of the PID controller and thereby improve the overall operation of the control system.

Classical advanced control theory is based on the assumption that near equilibrium points all controlled "plants" can be approximated as linear systems. Unfortunately, this assumption is rarely true in the real world. Most plants are highly nonlinear, and often do not have simple control algorithms. In order to meet these needs for a nonlinear control, systems have been developed that use soft computing concepts such as genetic algorithms (GA), fuzzy neural networks (FNN), fuzzy controllers and the like. By these techniques, the control system evolves or changes in time to adapt itself to changes that may occur in the controlled "plant" and/or in the operating environment.

A control system for controlling a plant based on soft computing is depicted in FIG. 1. Using a set of inputs, and a fitness function, the genetic algorithm works in a manner similar to an evolutionary process to arrive at a solution which is, hopefully, optimal.

The genetic algorithm generates sets of "chromosomes" (that is, possible approaches) and then sorts the chromosomes by evaluating each approach using the fitness function. The fitness function determines where each approach ranks on a fitness scale. Chromosomes (approaches) which are more fit, are those which correspond to approaches that rate high on the fitness scale. Chromosomes which are less fit, are those which correspond to approaches that rate low on the fitness scale.

Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The PID controller has a linear transfer function and thus is based upon a linearized equation of motion for the controlled "plant". Prior art genetic algorithms used to program PID controllers typically use simple fitness and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with nonlinear motion characteristics, it is common to find certain equilibrium points of the plant, and the motion characteristics of the plant are linearized in a vicinity near an equilibrium point. Control is then based on evaluating the pseudo (linearized) motion characteristics near the equilibrium point. This technique is scarcely, if at all, effective for plants described by models that are unstable or dissipative.

Computation of optimal control based on soft computing includes a GA as the first step of global search for an optimal approach on a fixed space of positive approaches. The GA searches for a set of control weights for the plant. First, the weight vector $K=\{k_1, \ldots, k_n\}$ is used by a conventional proportional-integral-differential (PID) in the generation of a signal $\delta(K)$ which is applied to the plant. The entropy $S(\delta(K))$ associated to the behavior of the plant on this signal is assumed as a fitness function to minimize. The GA is repeated several times at regular time intervals in order to produce a set of weight vectors. The vectors generated by the GA are then provided to a FNN, and the output of the FNN are provided to a fuzzy controller. The output of the fuzzy controller is a collection of gain schedules for the PID-controller that controls the plant. For soft computing systems based on the GA, there is very often no real control law in the classical control sense, but rather, control is based on a physical control law such as minimum entropy production.

This allows robust control because the GA, combined with feedback, guarantees robustness. However, robust control is not necessarily optimal control. The GA attempts to find a global optimum approach for a given approach space. Any random disturbance (m(t) in FIG. 1) of the plant can "kick" the GA into a different approach space.

It is desirable, however, to search for a global optimum in multiple approach spaces in order to find a "universal" optimum.

The application of new knowledge-based control algorithms in advanced intelligent control theory of complex dynamic systems (as in controlling objects) has brought the development of new processing methods, such as Computational Intelligence (CI). Traditional computing basic tools for CI is the GA, FNN, Fuzzy Sets theory, Evolution Programming, and Qualitative Probabilistic Reasoning, etc. Application of CI in the advanced control theory of complex system motion has brought two ways to research: 1) the study of stable non-equilibrium motion; and 2) an unstable non-equilibrium motion of complex dynamic systems.

In the first case (of stable non-equilibrium motion) the development and design of intelligent control algorithms can be described in the structure illustrated in FIG. 1.

The peculiarity of the given structure is the consideration of the control object in accordance with the fuzzy system theory as a "black box" or non-linear models of plants. The study and optimization of "input-output" relations is based on soft computing as GA, FNN and fuzzy control (FC) for the description of the changing law of a PID-controller parameters with a minimum entropy production and control error. At the small random initial states, uncontrollable external excitations or a small change of parameters or a structure of controlled objects (plants) guarantees a robust and stable control for fixed spaces of possible excitations and approaches.

In case of a global unstable dynamic control objective such an approach based on the presence of a robust and stable control does not guarantee success in principle. For this kind of unstable dynamic control objectives, the development of new intelligent robust algorithms based on the knowledge about a movement of essentially non-linear unstable non-holonomic dynamic systems is necessary.

SUMMARY OF THE INVENTION

In view of the foregoing background, an object of the present invention is to provide a new method and a respective hardware architecture for controlling a generic process using an algorithm that is obtained substantially by merging a Genetic Algorithm and a Quantum Search Algorithm.

A hardware structure of a generic control system with a reduced number of sensors is described. Several practical embodiments of such a structure are described. By way of example, the novel structure of the invention is used for implementing a control system with a reduced number of sensors for an internal combustion engine and for a vehicle suspension.

Naturally, the method as well as the hardware architecture of the invention can also be used efficiently for searching data in a database and in similar applications. Integrated silicon devices containing circuits that implement the different steps of the method of the invention are also described.

The invention is concisely defined in the attached claims.

BRIEF DESCRIPTION OF THE DRAWINGS

The particular aspects and advantages of the invention will become clearer through the following description of several important embodiments of the invention and by referring to the attached drawings, wherein:

FIG. 11g resumes the information analysis of the Grover's algorithm for a general number of iterations according to the invention;

FIG. 11i resumes the information analysis of the Grover's algorithm for the second iteration according to the invention;

FIG. 33*a* resumes the meaning of the labels in FIG. 33;

DETAILED DESCRIPTION OF THE PREFERRED EMBODIMENTS

Figure 1:
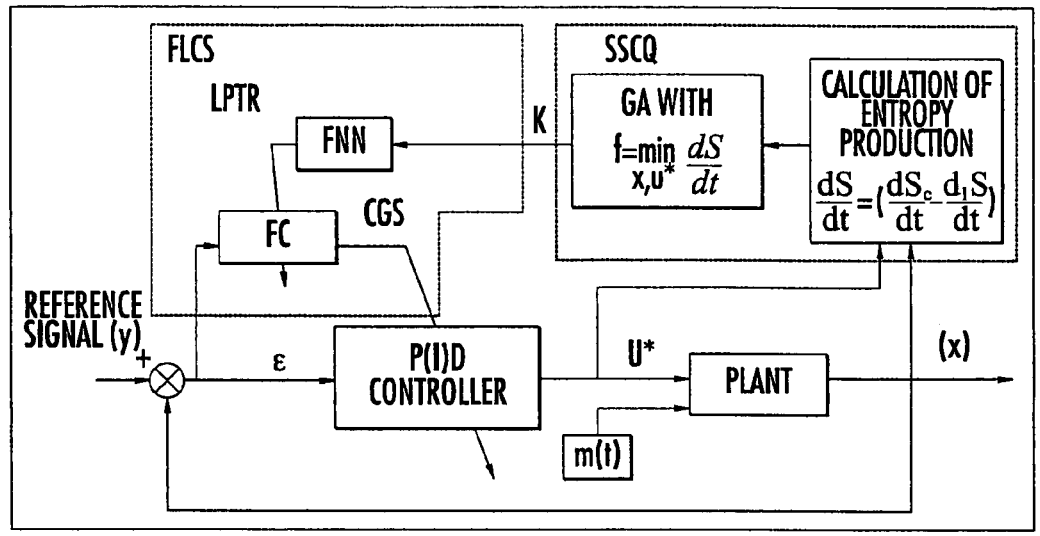
FIG. 1 is a general structure of an Intelligent Control System based on Soft-Computing according to the prior art.

As stated above, the fundamental aspect of the present invention consists in the intuition that the merging of a Quantum Algorithm with a Genetic Algorithm obtaining what may be defined as a Quantum Genetic Search Algorithm would, as indeed has been found true, enhance formidably the function of teaching a Fuzzy Neural Network in implementing intelligent control systems as well as for searching data in a database.

Such a merging has been possible because of the "similarity" between a Quantum Algorithm and a Genetic Algorithm, and in order to make more easily comprehensible the description of the novel Quantum Genetic Search Algorithm of the invention, it is deemed useful to preliminarily present a brief review of the Genetic Algorithm theory and of the Quantum Algorithm theory.

Genetic Algorithms

Genetic Algorithms (GA's) are global search algorithms based on the mechanics of natural genetics and natural selection. In the genetic search, a finite length binary string represents each design variable and the set of all possible solutions is so encoded into a population of binary strings. Genetic transformations, analogous to biological reproduction and evolution, are subsequently used to vary and improve the encoded solutions. Usually, three main operators, i.e., crossover, mutation and selection are used in the genetic search.

The selection process is one that biases the search toward producing more fit members in the population and eliminating the less fit ones. Hence, a fitness value is first assigned to each string in the population. One simple approach to select members from an initial population is to assign each member a probability of being selected, on the basis of its fitness value. A new population pool of the same size as the original is then created with a higher average fitness value.

The process of selection simply results in more copies of the dominant design to be present in the population. The crossover process allows for an exchange of design characteristics among members of the population pool with the intent of improving the fitness of the next generation. Crossover is executed by selecting strings of two mating parents, randomly choosing two sites on the strings, and swapping strings of 0's and 1's between these chosen sites.

Mutation safeguards the genetic search process from a premature loss of valuable genetic material during selection and crossover. The process of mutation consists into choosing a few members from the population pool on the basis of their probability of mutation and switch 0 to 1 or vice versa at a randomly selected mutation rate on the selected string.

In the foregoing discussion, the mechanics of the genetic search are simple. However, there are some key differences from traditional methods that contribute to the strength of the approach. GAs work on function evaluations alone and do not require function derivatives. While derivatives contribute to a faster convergence towards the optimum, they may also direct the search towards a local optimum. Furthermore, since the search proceeds from several points in the design space to another set of design points, the method has a higher probability of locating a global minimum as opposed to those schemes that proceed from one point to another. In addition, genetic algorithms work on a coding of design variables rather than variables themselves. This allows for an extension of these algorithms to design space including of a mix of continuous, discrete and integer variables.

In the context of GAs operating on binary strings, a schema (or similarity template) is a string of symbols taken from the alphabet {0,1,#}. The character # is interpreted as a "don't care" symbol, so that a schema can represent several bit strings. For example, the schema #10#1 represents four strings: 10011, 01011, 11001, and 11011. The number of non-# symbols is called the order O(H) of a schema H. The distance between the furthest two non-# symbols is called the defining length L(H) of the schema.

Holland obtained a result (the schema theorem) that predicts how the number of strings in a population matching (or belonging to) a schema is expected to vary from one generation to the next (Holland, 1992). The theorem is as follows:

$$E[m(H, t+1)] \geq m(H,t) \cdot \underbrace{\frac{f(H,t)}{\bar{f}(t)}}_{Selection} \cdot \underbrace{(1-p_m)^{O(H)}}_{Mutation} \cdot \underbrace{\left[1 - p_c \frac{L(H)}{N-1}\left(1 - \frac{m(H,t)f(H,t)}{M\bar{f}(t)}\right)\right]}_{Crossover}^{P_d(H,t)} \quad (1)$$

where m(H,t) is the number of strings matching the schema H at generation t, f(H,t) is the mean fitness of the strings matching H, $\bar{f}(t)$ is the mean fitness of the strings in the population, $p_m$ is the probability of mutation per bit, $p_c$ is the probability of crossover, N is the number of bits in the strings, M is the number of strings in the population, and E[m(H,t+1)] is the expected number of strings matching the schema H at generation t+1. This is slightly different version of Holland's original theorem. Equation (1) applies when crossover is performed taking both parents from the mating pool (Goldberg, 1989). The three horizontal curly brackets beneath the equation indicate which operators are responsible for each term. The bracket above the equation represents the probability of disruption of the schema H at generation t due to crossover $P_d(H,t)$. Such a probability depends on the frequency of the schema in the mating pool but also on the intrinsic fragility of the schema L(H)/(N−1).

Quantum Algorithms

The problems solved by the quantum algorithms may be stated as follows:

| Input | A function f: $\{0,1\}^n \to \{0,1\}^m$ |
|---|---|
| Problem | Find a certain property of f |

Figure 3:
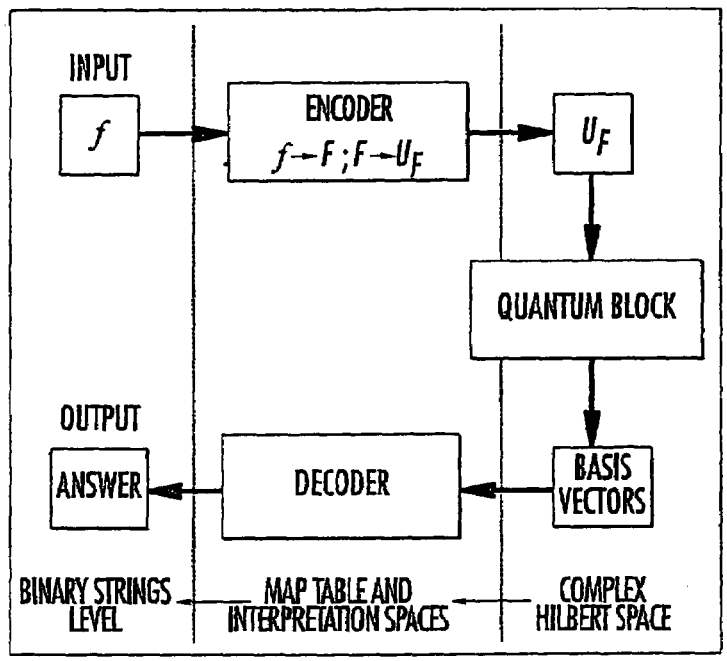
FIG. 3 is a block diagram of Quantum Algorithms according to the invention.

The structure of a quantum algorithm is outlined, by a high level representation, in the schematic diagram of FIG. 3.

The input of a quantum algorithm is always a function f from binary strings into binary strings. This function is represented as a map table, defining for every string its image. Function f is first encoded into a unitary matrix operator $U_F$ depending on f properties. In some sense, this operator calculates f when its input and output strings are encoded into canonical basis vectors of a Complex Hilbert Space: $U_F$ maps the vector code of every string into the vector code of its image by f.

Box 1

Unitary Matrix $U_F$

A squared matrix $U_F$ on the complex field is unitary if its inverse matrix coincides with its conjugate transpose:

$U_F^{-1} = U_F^=$

A unitary matrix is always reversible and preserves the norm of vectors.

When the matrix operator $U_F$ has been generated, it is embedded into a quantum gate G, a unitary matrix whose structure depends on the form of matrix $U_F$ and on the problem we want to solve. The quantum gate is the heart of a quantum algorithm. In every quantum algorithm, the quantum gate acts on an initial canonical basis vector (we can always choose the same vector) in order to generate a complex linear combination (let's call it superposition) of basis vectors as output. This superposition contains all the information to answer the initial problem.

After this superposition has been created, measurement takes place in order to extract this information. In quantum mechanics, measurement is a non-deterministic operation that produces as output only one of the basis vectors in the entering superposition. The probability of every basis vector being the output of measurement depends on its complex coefficient (probability amplitude) in the entering complex linear combination.

The segmental action of the quantum gate and of measurement constitutes the quantum block. The quantum block is repeated k times in order to produce a collection of k basis vectors. Since this measurement is a non-deterministic operation, these basic vectors won't be necessarily identical and each one of them will encode a peace of the information needed to solve the problem.

The last part of the algorithm includes the interpretation of the collected basis vectors in order to get the right answer for the initial problem with a certain probability.

Encoder

Figure 4:
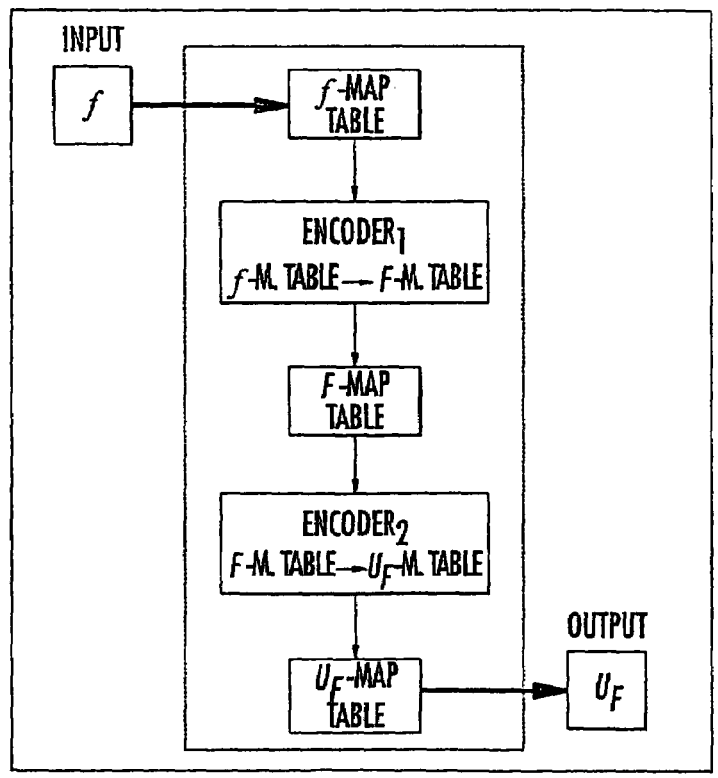
FIG. 4 is a block diagram of an Encoder according to the invention.

The behavior of the encoder block is described in the detailed schematic diagram of FIG. 4.

Function f is encoded into matrix $U_F$ in three steps.

Step 1

The map table of function f: $\{0,1\}^n \to \{0,1\}^m$ is transformed into the map table of the injective function F: $\{0,1\}^{n+m} \to \{0,1\}^{n+m}$ such that:

$$F(x_0, \ldots, x_{n-1}, y_0, \ldots, y_{m-1}) = (x_0, \ldots, x_{n-1}, f(x_0, \ldots, x_{n-1}) \oplus (y_0, \ldots, y_{m-1})) \quad (2)$$

The need to deal with an injective function comes from the requirement that $U_F$ is unitary. A unitary operator is reversible, so it cannot map 2 different inputs in the same output. Since $U_F$ will be the matrix representation of F, F is supposed to be injective. If we directly employed the matrix representation of function f, we could obtain a non-unitary matrix, since f could be non-injective. So, injectivity is fulfilled by increasing the number of bits and considering function F instead of function f. Anyway, function f can always be calculated from F by putting $(y_0, \ldots, y_{m-1}) = (0, \ldots, 0)$ in the input string and reading the last m values of the output string.

Box 2

XOR Operator ⊕

The XOR operator between two binary strings p and q of length m is a string s of length m such that the i-th digit of s is calculated as the exclusive OR between the i-th digits of p and q:

$p = (p_0, \ldots, p_{n-1})$ $q = (q_0, \ldots, q_{n-1})$ $s = p \oplus q ((p_0+q_0) \bmod 2, \ldots, (p_{n-1}+q_{n-1}) \bmod 2))$

Step 2

Function F map table is transformed into $U_F$ map table, following the following constraint:

$$\forall s \in \{0,1\}^{n+m} : U_F[\tau(s)] = \tau[F(s)] \qquad (3)$$

The code map $\tau: \{0,1\}^{n+m} \to C^{2^{n+m}}$ ($C^{2^{n+m}}$ is the target Complex Hilbert Space) is such that:

$$\tau(0) = \begin{pmatrix} 1 \\ 0 \end{pmatrix} = |0\rangle \quad \tau(1) = \begin{pmatrix} 0 \\ 1 \end{pmatrix} = |1\rangle$$

$$\tau(x_0, \ldots, x_{n+m-1}) = \tau(x_0) \otimes \ldots \otimes \tau(x_{n+m-1}) = |x_0 \ldots x_{n+m-1}\rangle$$

Code $\tau$ maps bit values into complex vectors of dimension 2 belonging to the canonical basis of $C^2$. Besides, using tensor product, $\tau$ maps the general state of a binary string of dimension n into a vector of dimension $2^n$, reducing this state to the joint state of the n bits composing the register. Every bit state is transformed into the corresponding 2-dimensional basis vector and then the string state is mapped into the corresponding $2^n$-dimensional basis vector by composing all bit-vectors through tensor product. In this sense tensor product is the vector counterpart of state conjunction.

Box 3

Vector Tensor Product ⊕

The tensor product between two vectors of dimensions h and k is a tensor product of dimension h·k, such that:

$$|x\rangle \otimes |y\rangle = \begin{pmatrix} x_1 \\ \ldots \\ x_h \end{pmatrix} \otimes \begin{pmatrix} y_1 \\ \ldots \\ y_k \end{pmatrix} = \begin{pmatrix} x_1 y_1 \\ \ldots \\ x_1 y_k \\ \ldots \\ x_h y_1 \\ \ldots \\ x_h y_k \end{pmatrix}$$

Physical Interpretation

If a component of a complex vector is interpreted as the probability amplitude of a system of being in a given state (indexed by the component number), the tensor product between two vectors describes the joint probability amplitude of two systems of being in a joint state.

Examples

Vector Tensor Products $$(0,0) \xrightarrow{\tau} \begin{pmatrix} 1 \\ 0 \end{pmatrix} \otimes \begin{pmatrix} 1 \\ 0 \end{pmatrix} = \begin{pmatrix} 1 \\ 0 \\ 0 \\ 0 \end{pmatrix} = |00\rangle \quad (0,1) \xrightarrow{\tau} \begin{pmatrix} 1 \\ 0 \end{pmatrix} \otimes \begin{pmatrix} 0 \\ 1 \end{pmatrix} = \begin{pmatrix} 0 \\ 1 \\ 0 \\ 0 \end{pmatrix} = |01\rangle$$

$$(1,0) \xrightarrow{\tau} \begin{pmatrix} 0 \\ 1 \end{pmatrix} \otimes \begin{pmatrix} 1 \\ 0 \end{pmatrix} = \begin{pmatrix} 0 \\ 0 \\ 1 \\ 0 \end{pmatrix} = |10\rangle \quad (1,1) \xrightarrow{\tau} \begin{pmatrix} 0 \\ 1 \end{pmatrix} \otimes \begin{pmatrix} 0 \\ 1 \end{pmatrix} = \begin{pmatrix} 0 \\ 0 \\ 0 \\ 1 \end{pmatrix} = |11\rangle$$

Basis vectors are denoted using the ket notation $|i\rangle$. This notation is taken from Dirac description of quantum mechanics.

Step 3

$U_F$ map table is transformed into $U_F$ using the following transformation rule:

$$[U_F]_{ij} = 1 \Leftrightarrow U_F|j\rangle = |i\rangle \qquad (4)$$

This rule can easily be understood considering vectors $|i\rangle$ and $|i\rangle$ as column vectors. Since these vectors belong to the canonical basis, $U_F$ defines a permutation map of the identity matrix rows. In general, row $|j\rangle$ is mapped into row $|i\rangle$.

This rule will be illustrated in detail on the first example of quantum algorithm: Grover's algorithm.

Quantum Block

Figure 5:
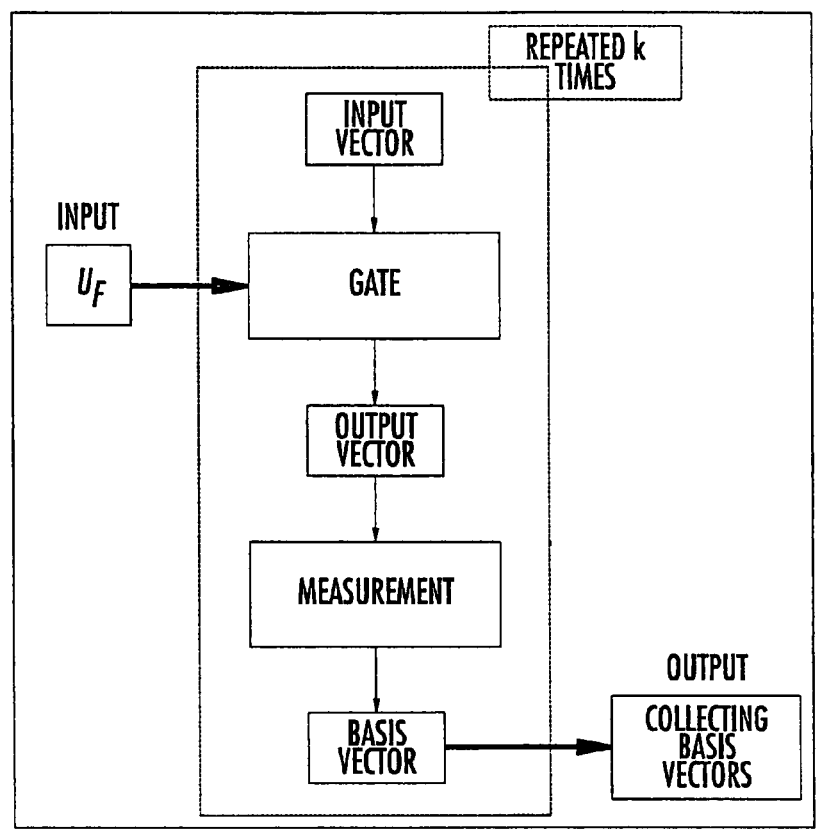
FIG. 5 is a general structure of the Quantum Block in FIG. 3.

The heart of the quantum block is the quantum gate, which depends on the properties of matrix $U_F$. The scheme in FIG. 5 gives a more detailed description of the quantum block. The matrix operator $U_F$ in FIG. 5 is the output of the encoder block represented in FIG. 4. Here, it becomes the input for the quantum block.

This matrix operator is first embedded into a more complex gate: the quantum gate G. Unitary matrix G is applied k times to an initial canonical basis vector $|i\rangle$ of dimension $2^{n+m}$. Every time, the resulting complex superposition $G|0 \ldots 01 \ldots 1\rangle$ of basis vectors is measured, producing one basis vector $|x_i\rangle$ as result. All the measured basis vectors $\{|x_1\rangle, \ldots, |x_k\rangle\}$ are collected together. This collection is the output of the quantum block.

The "intelligence" of such algorithms is in the ability to build a quantum gate that is able to extract the information necessary to find the required property of f and to store it into the output vector collection.

The structure of the quantum gate for every quantum algorithm will be discussed in detail, observing that a general description is possible. In order to represent quantum gates we are going to employ some special diagrams called quantum circuits.

Figure 6:
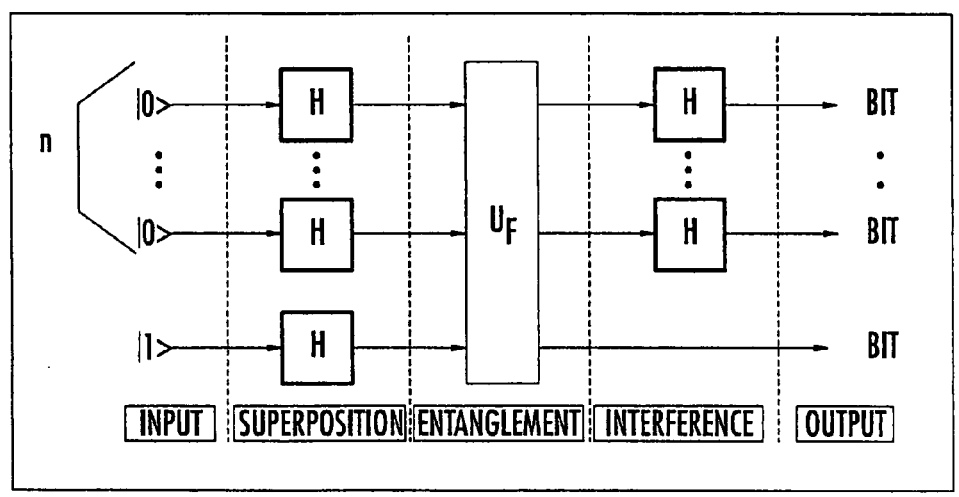
FIG. 6 is an example of a Quantum Circuit.
Figure 7A:
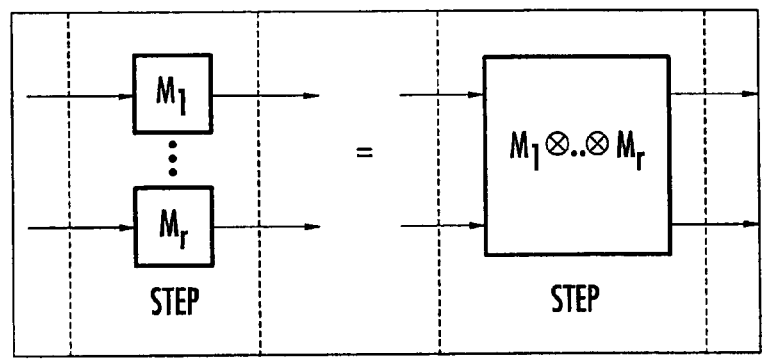
FIG. 7a shows an example of tensor product transformation according to the invention.
Figure 7B:
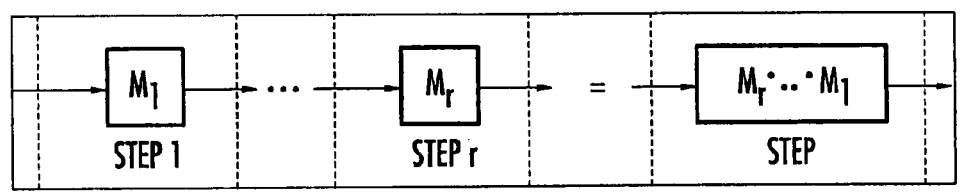
FIG. 7b shows an example of a dot product transformation according to the invention.
Figure 7C:
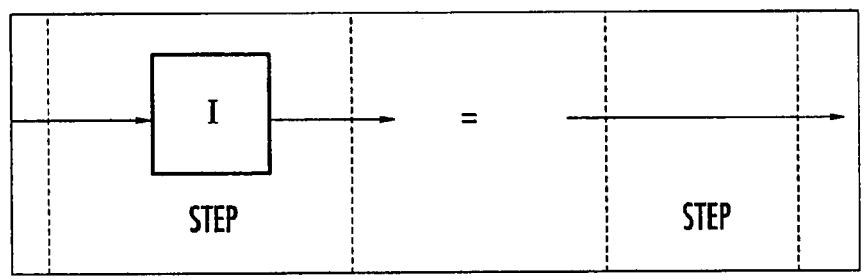
FIG. 7c shows the identity transformation according to the invention.
Figure 7D:
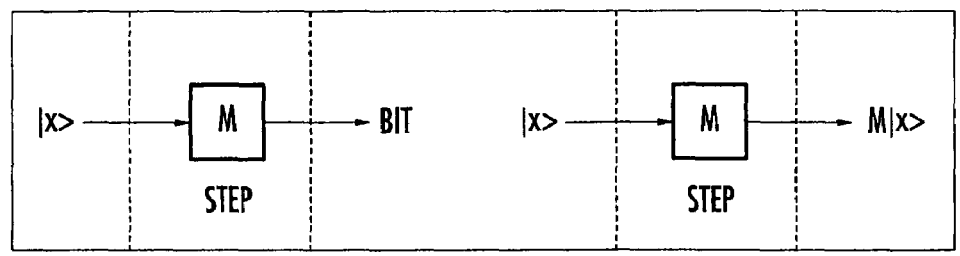
FIG. 7d shows an example of the propagation rule according to the invention.
Figure 7E:
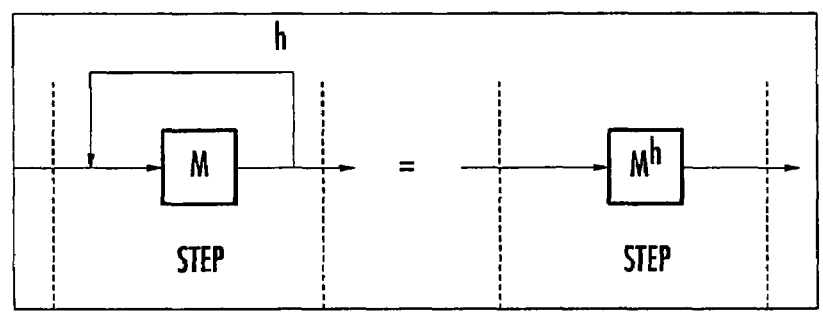
FIG. 7e shows an example of the iteration rule according to the invention.
Figure 7F:
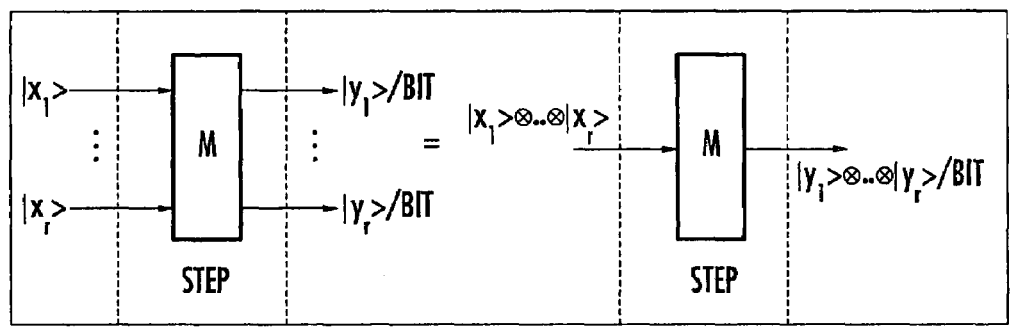
FIG. 7f explains the input/output tensor rule according to the invention.

An example of quantum circuit is reported in FIG. 6. Every rectangle is associated to a matrix $2^n \times 2^n$, where n is the number of lines entering and leaving the rectangle. For example, the rectangle marked $U_F$ is associated to matrix $U_F$.

Quantum circuits let us give a high-level description of the gate and, using some transformation rules, which are listed in FIG. 7, it is possible to compile them into the corresponding gate-matrix.

It will be clearer how to use these rules when we afford the first examples of quantum algorithm.

Box 4

Matrix Tensor Product ⊕

The tensor product between two matrices $X_{n \times m}$ and $Y_{h \times k}$ is a (block) matrix $(n \cdot h) \times (m \cdot k)$ such that:

$$X \otimes Y = \begin{bmatrix} x_{11} Y & \ldots & x_{1m} Y \\ \ldots & \ldots & \ldots \\ x_{n1} Y & \ldots & x_{nm} Y \end{bmatrix} \text{ with } X = \begin{bmatrix} x_{11} & \ldots & x_{1m} \\ \ldots & \ldots & \ldots \\ x_{n1} & \ldots & x_{nm} \end{bmatrix}$$

Example

Matrix Tensor Product $$\begin{bmatrix} 1 & 2 \\ 3 & 4 \end{bmatrix} \otimes \begin{bmatrix} 5 & 6 \\ 7 & 8 \end{bmatrix} = \begin{bmatrix} 1 \cdot \begin{bmatrix} 5 & 6 \\ 7 & 8 \end{bmatrix} & 2 \cdot \begin{bmatrix} 5 & 6 \\ 7 & 8 \end{bmatrix} \\ 3 \cdot \begin{bmatrix} 5 & 6 \\ 7 & 8 \end{bmatrix} & 4 \cdot \begin{bmatrix} 5 & 6 \\ 7 & 8 \end{bmatrix} \end{bmatrix} = \begin{bmatrix} 5 & 6 & 10 & 12 \\ 7 & 8 & 14 & 16 \\ 15 & 18 & 20 & 24 \\ 21 & 24 & 28 & 32 \end{bmatrix}$$

Decoder

The decoder block has the function to interpret the basis vectors collected after the iterated execution of the quantum block. Decoding these vectors means to retranslate them into binary strings and interpreting them directly if they already contain the answer to the starting problem or use them, for instance as coefficient vectors for some equation system, in order to get the searched solution. This part will not being investigated in detail because it is a non-interesting easy classical part.

Because of the particular importance of the Grover's Algorithm in the realization of controllers, a brief description of the Grover's algorithm is given.

Grover's Problem

Grover's problem is so stated:

| Input | A function f: $\{0,1\}^n \to \{0,1\}$ such that $\exists x \in \{0,1\}^n : (f(x) = 1 \wedge \forall y \in \{0,1\}^n : x \neq y \Rightarrow f(y) = 0)$ |
|---|---|
| Problem | Find x |

In Deutsch-Jozsa's algorithm we distinguished two classes of input functions and we were supposed to decide what class the input function belonged to. In this case the problem is in some sense identical in its form, even if it is harder because now we are dealing with $2^n$ classes of input functions (each function of the kind described constitutes a class).

Encoder

In order to make the discussion more comprehensible, we prefer first to consider a special function with n=2. Then we discuss the general case with n=2 and finally we analyze the general case with n>0.

A1. Introductory Example

Let's consider the case:

$n=2\ f(01)=1$

In this case f map table is so defined:

| x | f(x) |
|---|---|
| 00 | 0 |
| 01 | 1 |
| 10 | 0 |
| 11 | 0 |

Step 1

Function f is encoded into injective function F, built according to the usual statement:

$F:\{0,1\}^{n+1} \to \{0,1\}^{n+1}: F(x_0, x_1, y_0) = (x_0, x_1, f(x_0, x_1) \oplus y_0)$ Then F map table is:

| $(x_0, x_1, y_0)$ | $F(x_0, x_1, y_0)$ |
|---|---|
| 000 | 000 |
| 010 | 011 |
| 100 | 100 |
| 110 | 110 |
| 001 | 001 |
| 011 | 010 |
| 101 | 101 |
| 111 | 111 |

Step 2

Let's now encode F into the map table of $U_F$ using the usual rule:

$\forall s \in \{0,1\}^{n+1} : U_F[\tau(s)] = \tau[F(s)]$ where $\tau$ is the code map defined in Equation (3). This means:

| $|x_0 x_1 y_0\rangle$ | $U_F |x_0 x_1 y_0\rangle$ |
|---|---|
| $|000\rangle$ | $|000\rangle$ |
| $|010\rangle$ | $|011\rangle$ |
| $|100\rangle$ | $|100\rangle$ |
| $|110\rangle$ | $|110\rangle$ |
| $|001\rangle$ | $|001\rangle$ |
| $|011\rangle$ | $|011\rangle$ |
| $|101\rangle$ | $|101\rangle$ |
| $|111\rangle$ | $|111\rangle$ |

Step 3

From the map table of $U_F$ we are supposed to calculate the corresponding matrix operator.

This matrix is obtained from Equation (4) using the rule:

$[U_F]_{ij} = 1 \Leftrightarrow U_F |j\rangle = |i\rangle$ $U_F$ is so calculated:

| $U_F$ | $|00\rangle$ | $|01\rangle$ | $|10\rangle$ | $|11\rangle$ |
|---|---|---|---|---|
| $|00\rangle$ | I | 0 | 0 | 0 |
| $|01\rangle$ | 0 | C | 0 | 0 |
| $|10\rangle$ | 0 | 0 | I | 0 |
| $|11\rangle$ | 0 | 0 | 0 | I |

The effect of this matrix is to leave unchanged the first and the second input basis vectors of the input tensor product, flipping the third one when the first vector is $|0\rangle$ and the second is $|1\rangle$. This agrees with the constraints on $U_F$ stated above.

B. General Case with n=2

Let's now take into consideration the more general case:

$n=2\ f(x)=1$

The corresponding matrix operator is:

| $U_F$ | $|00\rangle$ | $|01\rangle$ | $|10\rangle$ | $|11\rangle$ |
|---|---|---|---|---|
| $|00\rangle$ | $M_{00}$ | 0 | 0 | 0 |
| $|01\rangle$ | 0 | $M_{01}$ | 0 | 0 |
| $|10\rangle$ | 0 | 0 | $M_{10}$ | 0 |
| $|11\rangle$ | 0 | 0 | 0 | $M_{11}$ | with $M_x = C \hat{} \forall i \neq \underline{x} : M_i = I$.

C. General Case

It is fairly natural to generalize operator $U_F$ from the case n=2 to the case n>1. In fact, we always find operator C on the main diagonal of the block matrix, in correspondence of the cell labeled by vector $|\underline{x}\rangle$, where $\underline{x}$ is the binary string having image one by f. Therefore:

| $U_F$ | $|00\rangle$ | $|01\rangle$ | ... | $|11\rangle$ |
|---|---|---|---|---|
| $|00\rangle$ | $M_{00}$ | 0 | ... | 0 |
| $|01\rangle$ | 0 | $M_{01}$ | ... | 0 |
| ... | ... | ... | ... | ... |
| $|11\rangle$ | 0 | 0 | ... | $M_{11}$ | with $M_x = C \hat{} \forall i \neq \underline{x} : M_i = I$.

Figure 8:
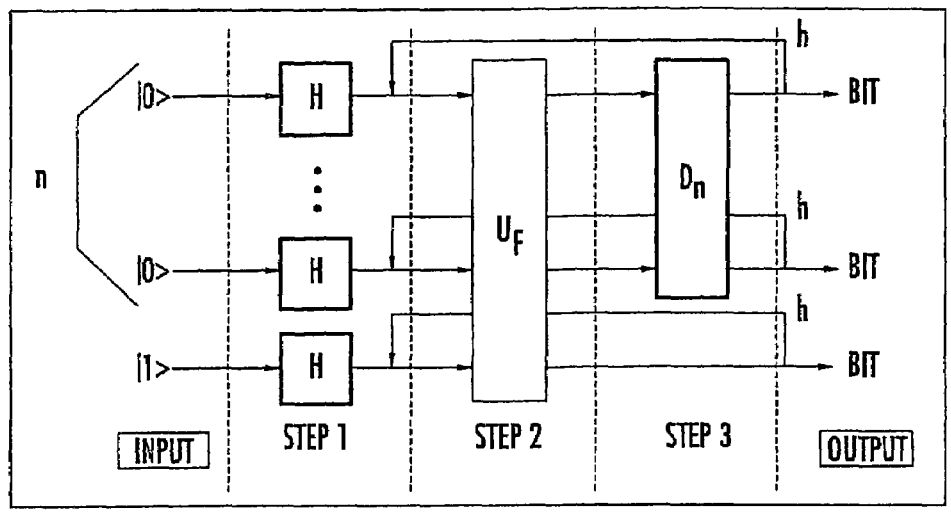
FIG. 8 is an example of a circuit realizing a Grover's Quantum Gate according to the invention.

Matrix $U_F$, the output of the encoder, is embedded into the quantum gate. We describe this gate using a quantum circuit such that depicted in FIG. 8.

Operator $D_n$ is called diffusion matrix of order n and it is responsible of interference in this algorithm. It plays the same role as $QFT_n$ in Shor's algorithm and of $^nH$ in Deutsch-Jozsa's and Simon's algorithms. This matrix is defined in this way:

| $D_n$ | $|0...0\rangle$ | $|0...1\rangle$ | ... | $|i\rangle$ | ... | $|1...0\rangle$ | $|1...1\rangle$ |
|---|---|---|---|---|---|---|---|
| $|0...0\rangle$ | $-1 + 1/2^{n-1}$ | $1/2^{n-1}$ | ... | $1/2^{n-1}$ | ... | $1/2^{n-1}$ | $1/2^{n-1}$ |
| $|0...1\rangle$ | $1/2^{n-1}$ | $-1 + 1/2^{n-1}$ | ... | $1/2^{n-1}$ | ... | $1/2^{n-1}$ | $1/2^{n-1}$ |
| ... | ... | ... | ... | ... | ... | ... | ... |
| $|i\rangle$ | $1/2^{n-1}$ | $1/2^{n-1}$ | ... | $-1 + 1/2^{n-1}$ | ... | $1/2^{n-1}$ | $1/2^{n-1}$ |
| ... | ... | ... | ... | ... | ... | ... | ... |
| $|1...0\rangle$ | $1/2^{n-1}$ | $1/2^{n-1}$ | ... | $1/2^{n-1}$ | ... | $-1 + 1/2^{n-1}$ | $1/2^{n-1}$ |
| $|1...1\rangle$ | $1/2^{n-1}$ | $1/2^{n-1}$ | ... | $1/2^{n-1}$ | ... | $1/2^{n-1}$ | $-1 + 1/2^{n-1}$ |

Figure 9:
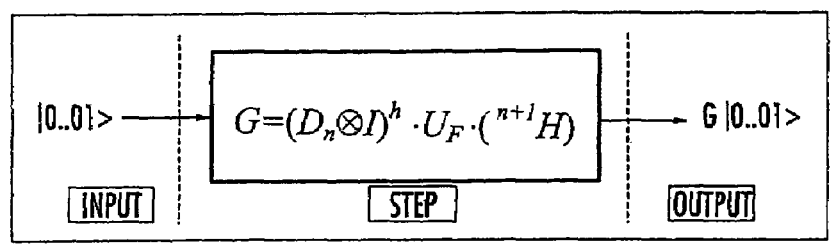
FIG. 9 is a Grover's Quantum Gate according to the invention.
Figure 10A:
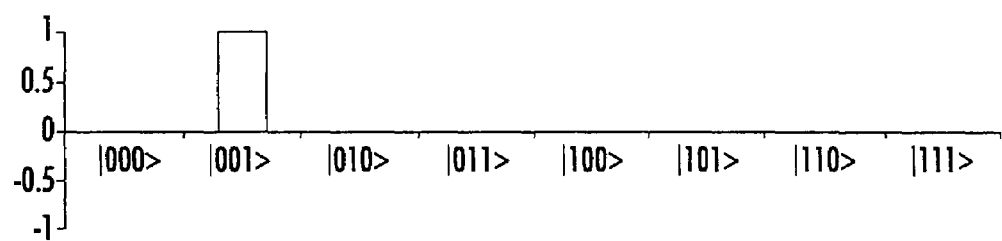
FIG. 10a shows a possible set of input probability amplitudes according to the invention.
Figure 10B:
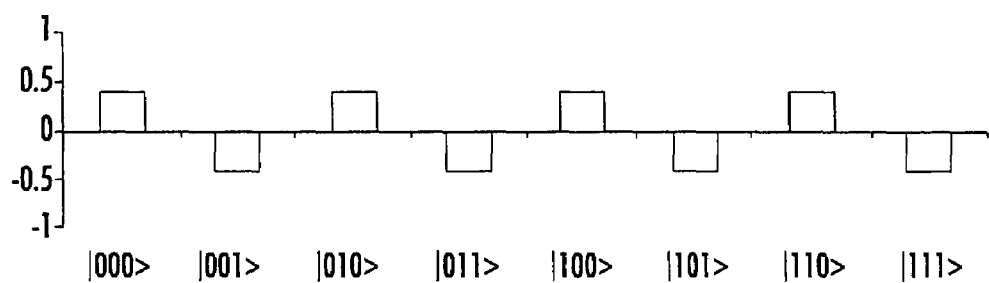
FIG. 10b shows a set of probability amplitudes after Step 1 of FIG. 8.
Figure 10C:
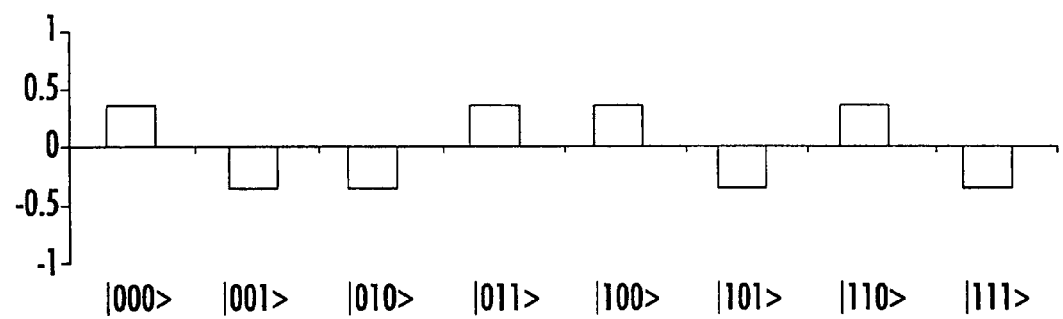
FIG. 10c shows a set of probability amplitudes after Step 2 of FIG. 8.
Figure 10D:
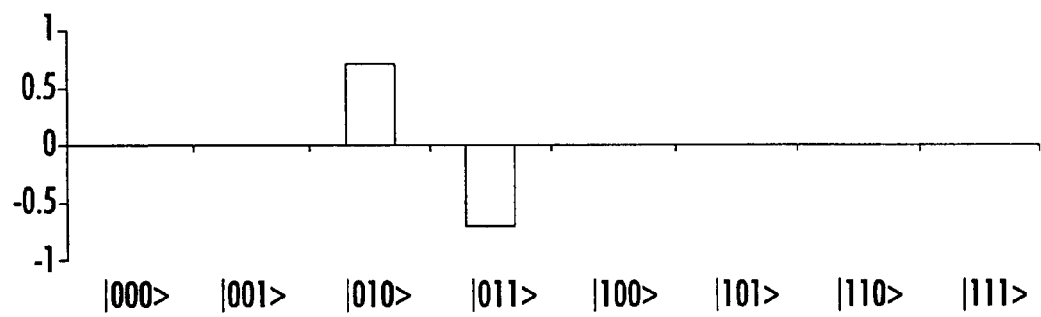
FIG. 10d shows a set of probability amplitudes after Step 3 of FIG. 8.

Using the identity transformation (FIG. 7c), the previous circuit can be compiled into the circuit of FIG. 9.

A2. Introductory Example: Dynamic Analysis

In the introductory example we dealt above, $U_F$ had the following form:

| $U_F$ | $|00\rangle$ | $|01\rangle$ | $|10\rangle$ | $|11\rangle$ |
|---|---|---|---|---|
| $|00\rangle$ | I | 0 | 0 | 0 |
| $|01\rangle$ | 0 | C | 0 | 0 |
| $|10\rangle$ | 0 | 0 | I | 0 |
| $|11\rangle$ | 0 | 0 | 0 | I |

Let's calculate the quantum gate $G = [(D_2 \otimes I) \cdot U_F] \cdot (^{2+1}H)$ in this case:

| $^3H$ | $|00\rangle$ | $|01\rangle$ | $|10\rangle$ | $|11\rangle$ |
|---|---|---|---|---|
| $|00\rangle$ | H/2 | H/2 | H/2 | H/2 |
| $|01\rangle$ | H/2 | −H/2 | H/2 | −H/2 |
| $|10\rangle$ | H/2 | H/2 | −H/2 | −H/2 |
| $|11\rangle$ | H/2 | −H/2 | −H/2 | H/2 |

| $D_2 \otimes I$ | $|00\rangle$ | $|01\rangle$ | $|10\rangle$ | $|11\rangle$ |
|---|---|---|---|---|
| $|00\rangle$ | −I/2 | I/2 | I/2 | I/2 |
| $|01\rangle$ | I/2 | −I/2 | I/2 | I/2 |
| $|10\rangle$ | I/2 | I/2 | −I/2 | I/2 |
| $|11\rangle$ | I/2 | I/2 | I/2 | −I/2 |

| $U_F \cdot {^3H}$ | $|00\rangle$ | $|01\rangle$ | $|10\rangle$ | $|11\rangle$ |
|---|---|---|---|---|
| $|00\rangle$ | H/2 | H/2 | H/2 | H/2 |
| $|01\rangle$ | CH/2 | −CH/2 | CH/2 | −CH/2 |
| $|10\rangle$ | H/2 | H/2 | −H/2 | −H/2 |
| $|11\rangle$ | H/2 | −H/2 | −H/2 | H/2 |

Choosing h=1, we obtain:

| G | $|00\rangle$ | $|01\rangle$ | $|10\rangle$ | $|11\rangle$ |
|---|---|---|---|---|
| $|00\rangle$ | (C + I) H/4 | (−C − I) H/4 | (C − 3I) H/4 | (−C − I) H/4 |
| $|01\rangle$ | (−C + 3I) H/4 | (C + I) H/4 | (−C − I) H/4 | (C + I) H/4 |
| $|10\rangle$ | (C + I) H/4 | (−C − I) H/4 | (C + I) H/4 | (−C + 3I) H/4 |
| $|11\rangle$ | (C + I) H/4 | (−C + 3I) H/4 | (C + I) H/4 | (−C − I) H/4 |

Now, consider the application of G to vector |001>:

$$G|001\rangle = \frac{1}{4}|00\rangle \otimes (C+I)H|1\rangle + \frac{1}{4}|01\rangle \otimes (-C+3I)H|1\rangle +$$
$$\frac{1}{4}|10\rangle \otimes (C+I)H|1\rangle + \frac{1}{4}|11\rangle \otimes (C+I)H|1\rangle$$

Let's calculate the operator $(-C+3I)H/4$. Then

| $-C+3I$ | $|0\rangle$ | $|1\rangle$ |
|---|---|---|
| $|0\rangle$ | 3 | $-1$ |
| $|1\rangle$ | $-1$ | 3 |

| $(-C+3I)H/4$ | $|0\rangle$ | $|1\rangle$ |
|---|---|---|
| $|0\rangle$ | $1/2^{3/2}$ | $1/2^{1/2}$ |
| $|1\rangle$ | $1/2^{3/2}$ | $-1/2^{1/2}$ |

Therefore:

$$\frac{1}{4}(-C+3I)H|1\rangle = \frac{1}{\sqrt{2}}(|0\rangle - |1\rangle)$$

Let's calculate the operator $(C+I)H/4$. Then:

| $C+I$ | $|0\rangle$ | $|1\rangle$ |
|---|---|---|
| $|0\rangle$ | 1 | 1 |
| $|1\rangle$ | 1 | 1 |

| $(C+I)H/4$ | $|0\rangle$ | $|1\rangle$ |
|---|---|---|
| $|0\rangle$ | $1/2^{3/2}$ | 0 |
| $|1\rangle$ | $1/2^{3/2}$ | 0 |

Therefore:

$$\frac{1}{4}(C+I)H|1\rangle = 0$$

This means that |001> is mapped into vector $|01\rangle(|0\rangle-|1\rangle)/2^{1/2}$. Taking the binary values of the first two vectors of dimension 2, we find $\underline{x}$.

It might be useful to picture the evolution of the probability amplitude of every basis vector while operator $^3H$, $U_F$ and $D_2 \otimes I$ are applied in sequence. This is done in FIG. 10.

Operator $^3H$ puts the initial canonical basis vector |001> into a superposition of all basis vectors with the same (real) coefficients in modulus, but with positive sign if the last vector is |0>, negative otherwise. Operator $U_F$ creates correlation: it flips the third vector if the first two vector are |0> and |1>. Finally, $D_2 \otimes I$ produces interference: for every basis vector $|x_0 x_1 y_0\rangle$ it calculates its output probability amplitude $\alpha'_{x_0 x_1 y_0}$ by inverting its initial probability amplitude $\alpha_{x_0 x_1 y_0}$ and summing the double of the mean $\underline{\alpha}_{y_0}$ of the probability amplitude of all vectors in the form $|x_0 x_1 y_0\rangle$. In our example $\underline{\alpha}_0 = 1/(4 \cdot 2^{1/2})$, $\underline{\alpha}_1 = -1/(4 \cdot 2^{1/2})$. Take, for instance, basis vector |000>. Then $\alpha'_{000} = -\alpha_{000} + 2\underline{\alpha}_0 = -1/(2 \cdot 2^{1/2}) + 2/(4 \cdot 2^{1/2}) = 0$.

D. General Case with n=2

In general, if n=2, $U_F$ has the following form:

| $U_F$ | $|00\rangle$ | $|01\rangle$ | $|10\rangle$ | $|11\rangle$ |
|---|---|---|---|---|
| $|00\rangle$ | $M_{00}$ | 0 | 0 | 0 |
| $|01\rangle$ | 0 | $M_{01}$ | 0 | 0 |
| $|10\rangle$ | 0 | 0 | $M_{10}$ | 0 |
| $|11\rangle$ | 0 | 0 | 0 | $M_{11}$ | where $M_{\underline{x}} = C \wedge \forall i \neq \underline{x}: M_i = I(\underline{x}, i \in \{0,1\}^n)$.

Let's calculate the quantum gate $G = (D_2 \oplus I) \cdot U_F \cdot (^{2+1}H)$ in this general case:

| $U_F \cdot {}^3H$ | $|00\rangle$ | $|01\rangle$ | $|10\rangle$ | $|11\rangle$ |
|---|---|---|---|---|
| $|00\rangle$ | $M_{00}H/2$ | $M_{00}H/2$ | $M_{00}H/2$ | $M_{00}H/2$ |
| $|01\rangle$ | $M_{01}H/2$ | $-M_{01}H/2$ | $M_{01}H/2$ | $-M_{01}H/2$ |
| $|10\rangle$ | $M_{10}H/2$ | $M_{10}H/2$ | $M_{10}H/2$ | $M_{10}H/2$ |
| $|11\rangle$ | $M_{11}H/2$ | — | — | $M_{11}H/2$ |
|  |  | $M_{11}H/2$ | $M_{11}H/2$ |  |

| G | $|00\rangle$ | $|01\rangle$ |
|---|---|---|
| $|00\rangle$ | $(-M_{00}+M_{01}+M_{10}+M_{11})H/4$ | $(-M_{00}-M_{01}+M_{10}-M_{11})H/4$ |
| $|01\rangle$ | $(M_{00}-M_{01}+M_{10}+M_{11})H/4$ | $(M_{00}+M_{01}+M_{10}-M_{11})H/4$ |
| $|10\rangle$ | $(M_{00}+M_{01}-M_{10}+M_{11})H/4$ | $(M_{00}-M_{01}-M_{10}-M_{11})H/4$ |
| $|11\rangle$ | $(M_{00}+M_{01}+M_{10}-M_{11})H/4$ | $(M_{00}-M_{01}+M_{10}+M_{11})H/4$ |

| G | $|10\rangle$ | $|11\rangle$ |
|---|---|---|
| $|00\rangle$ | $(-M_{00}+M_{01}-M_{10}+M_{11})H/4$ | $(-M_{00}-M_{01}-M_{10}-M_{11})H/4$ |
| $|01\rangle$ | $(M_{00}-M_{01}-M_{10}-M_{11})H/4$ | $(M_{00}+M_{01}-M_{10}+M_{11})H/4$ |
| $|10\rangle$ | $(M_{00}+M_{01}+M_{10}-M_{11})H/4$ | $(M_{00}-M_{01}+M_{10}+M_{11})H/4$ |
| $|11\rangle$ | $(M_{00}+M_{01}-M_{10}+M_{11})H/4$ | $(M_{00}-M_{01}-M_{10}-M_{11})H/4$ |

Now, consider the application of G to vector |001>:

$$G|001\rangle = \frac{1}{4}|00\rangle \otimes (-M_{00}+M_{01}+M_{10}+M_{11})H|1\rangle +$$
$$\frac{1}{4}|01\rangle \otimes (M_{00}-M_{01}+M_{10}+M_{11})H|1\rangle +$$
$$\frac{1}{4}|10\rangle \otimes (M_{00}+M_{01}-M_{10}+M_{11})H|1\rangle +$$
$$\frac{1}{4}|11\rangle \otimes (M_{00}+M_{01}+M_{10}-M_{11})H|1\rangle$$

Consider the following cases:

$\underline{x}=00$:

$$G|001\rangle = \frac{1}{4}|00\rangle \otimes (-C+3I)H|1\rangle + \frac{1}{4}|01\rangle \otimes (C+I)H|1\rangle +$$
$$\frac{1}{4}|10\rangle \otimes (C+I)H|1\rangle + \frac{1}{4}|11\rangle \otimes (C+I)H|1\rangle = |00\rangle\left(\frac{|0\rangle - |1\rangle}{\sqrt{2}}\right)$$

x=01:

$$G|001\rangle = \frac{1}{4}|00\rangle \otimes (C+I)H|1\rangle + \frac{1}{4}|01\rangle \otimes (-C+3I)H|1\rangle +$$

$$\frac{1}{4}|10\rangle \otimes (C+I)H|1\rangle + \frac{1}{4}|11\rangle \otimes (C+I)H|1\rangle = |01\rangle\left(\frac{|0\rangle - |1\rangle}{\sqrt{2}}\right)$$

x=10:

$$G|001\rangle = \frac{1}{4}|00\rangle \otimes (C+I)H|1\rangle + \frac{1}{4}|01\rangle \otimes (C+I)H|1\rangle +$$

$$\frac{1}{4}|10\rangle \otimes (-C+3I)H|1\rangle + \frac{1}{4}|11\rangle \otimes (C+I)H|1\rangle = |10\rangle\left(\frac{|0\rangle - |1\rangle}{\sqrt{2}}\right)$$

x=11:

$$G|001\rangle = \frac{1}{4}|00\rangle \otimes (C+I)H|1\rangle + \frac{1}{4}|01\rangle \otimes (C+I)H|1\rangle + \frac{1}{4}|10\rangle \otimes$$

$$(C+I)H|1\rangle + \frac{1}{4}|11\rangle \otimes$$

$$(-C+3I)H|1\rangle = |11\rangle\left(\frac{|0\rangle - |1\rangle}{\sqrt{2}}\right)$$

This means that if we measure the output vector and encode back the first two basis vectors of dimension 2 in the resulting tensor product, we get the following results:

| x | Result | Probability |
|---|--------|-------------|
| 00 | 00 | 1 |
| 01 | 01 | 1 |
| 10 | 10 | 1 |
| 11 | 11 | 1 |

E. General Case (n>0)

In the general case n>0, $U_F$ has the following form:

| $U_F$ | $\|0\ldots0\rangle$ | $\|0\ldots1\rangle$ | $\ldots$ | $\|1\ldots1\rangle$ |
|---|---|---|---|---|
| $\|0\ldots0\rangle$ | $M_{0\ldots0}$ | 0 | 0 | 0 |
| $\|0\ldots1\rangle$ | 0 | $M_{0\ldots1}$ | 0 | 0 |
| $\ldots$ | $\ldots$ | $\ldots$ | $\ldots$ | $\ldots$ |
| $\|1\ldots1\rangle$ | 0 | 0 | 0 | $M_{1\ldots1}$ | where $M_{\underline{x}}=C \wedge \forall i \neq \underline{x}: M_i = I(\underline{x}, i \in \{0,1\}^n)$.

Let's calculate the quantum gate $G=(D_n \otimes I)^h \cdot U_F \cdot (^{n+1}H)$:

| $^{n+1}H$ | $\|0\ldots0\rangle$ | $\ldots$ | $\|j\rangle$ | $\ldots$ | $\|1\ldots1\rangle$ |
|---|---|---|---|---|---|
| $\|0\ldots0\rangle$ | $H/2^{n/2}$ | $\ldots$ | $H/2^{n/2}$ | $\ldots$ | $H/2^{n/2}$ |
| $\ldots$ | $\ldots$ | $\ldots$ | $\ldots$ | $\ldots$ | $\ldots$ |
| $\|i\rangle$ | $H/2^{n/2}$ | $\ldots$ | $(-1)^{i \cdot j}H/2^{n/2}$ | $\ldots$ | $(-1)^{i \cdot (1\ldots1)}H/2^{n/2}$ |
| $\ldots$ | $\ldots$ | $\ldots$ | $\ldots$ | $\ldots$ | $\ldots$ |
| $\|11\rangle$ | $H/2^{n/2}$ | $\ldots$ | $(-1)^{(1\ldots1) \cdot j}H/2^{n/2}$ | $\ldots$ | $(-1)^{(1\ldots1) \cdot (1\ldots1)}H/2^{n/2}$ |

| $D_n \otimes I$ | $\|0\ldots0\rangle$ | $\|0\ldots1\rangle$ | $\ldots$ | $\|i\rangle$ | $\ldots$ | $\|1\ldots0\rangle$ | $\|1\ldots1\rangle$ |
|---|---|---|---|---|---|---|---|
| $\|0\ldots0\rangle$ | $-I+I/2^{n-1}$ | $I/2^{n-1}$ | $\ldots$ | $I/2^{n-1}$ | $\ldots$ | $I/2^{n-1}$ | $I/2^{n-1}$ |
| $\|0\ldots1\rangle$ | $I/2^{n-1}$ | $-I+I/2^{n-1}$ | $\ldots$ | $I/2^{n-1}$ | $\ldots$ | $I/2^{n-1}$ | $I/2^{n-1}$ |
| $\ldots$ | $\ldots$ | $\ldots$ | $\ldots$ | $\ldots$ | $\ldots$ | $\ldots$ | $\ldots$ |
| $\|i\rangle$ | $I/2^{n-1}$ | $I/2^{n-1}$ | $\ldots$ | $-I+I/2^{n-1}$ | $\ldots$ | $I/2^{n-1}$ | $I/2^{n-1}$ |
| $\ldots$ | $\ldots$ | $\ldots$ | $\ldots$ | $\ldots$ | $\ldots$ | $\ldots$ | $\ldots$ |
| $\|1\ldots0\rangle$ | $I/2^{n-1}$ | $I/2^{n-1}$ | $\ldots$ | $I/2^{n-1}$ | $\ldots$ | $-I+I/2^{n-1}$ | $I/2^{n-1}$ |
| $\|1\ldots1\rangle$ | $I/2^{n-1}$ | $I/2^{n-1}$ | $\ldots$ | $I/2^{n-1}$ | $\ldots$ | $I/2^{n-1}$ | $-I+I/2^{n-1}$ |

| $U_F \cdot {}^{n+1}H$ | $\|0\ldots0\rangle$ | $\ldots$ | $\|j\rangle$ | $\ldots$ | $\|1\ldots1\rangle$ |
|---|---|---|---|---|---|
| $\|0\ldots0\rangle$ | $M_{0\ldots0}H/2^{n/2}$ | $\ldots$ | $M_{0\ldots0}H/2^{n/2}$ | $\ldots$ | $M_{0\ldots0}H/2^{n/2}$ |
| $\ldots$ | $\ldots$ | $\ldots$ | $\ldots$ | $\ldots$ | $\ldots$ |
| $\|i\rangle$ | $M_iH/2^{n/2}$ | $\ldots$ | $(-1)^{i \cdot j}M_iH/2^{n/2}$ | $\ldots$ | $(-1)^{i \cdot (1\ldots1)}M_iH/2^{n/2}$ |
| $\ldots$ | $\ldots$ | $\ldots$ | $\ldots$ | $\ldots$ | $\ldots$ |
| $\|1\ldots1\rangle$ | $M_{1\ldots1}H/2^{n/2}$ | $\ldots$ | $(-1)^{(1\ldots1) \cdot j}M_{1\ldots1}H/2^{n/2}$ | $\ldots$ | $(-1)^{(1\ldots1) \cdot (1\ldots1)}M_{1\ldots1}H/2^{n/2}$ |

Now, suppose h=1. Then:

| $G_{h=1}$ | $\|0\ldots0\rangle$ | $\ldots$ |
|---|---|---|
| $\|0\ldots0\rangle$ | $(-M_{0\ldots0} + \Sigma_{j \in \{0,1\}^n} M_i/2^{n-1})H/2^{n/2}$ | $\ldots$ |
| $\ldots$ | $\ldots$ | $\ldots$ |
| $\|i\rangle$ | $(-M_i + \Sigma_{j \in \{0,1\}^n} M_i/2^{n-1})H/2^{n/2}$ | $\ldots$ |
| $\ldots$ | $\ldots$ | $\ldots$ |
| $\|1\ldots1\rangle$ | $(-M_{1\ldots1} + \Sigma_{j \in \{0,1\}^n} M_i/2^{n-1})H/2^{n/2}$ | $\ldots$ |

Since $M_{\underline{x}}=C$ and $\forall i \neq \underline{x}: M_i = I$, this column may be written as:

| $G_{h=1}$ | $\|0 \ldots 0\rangle$ | $\ldots$ |
|---|---|---|
| $\|0 \ldots 0\rangle$ | $(-I + \Sigma_{j \in \{0,1\}^n - \{x\}} I/2^{n-1} + C/2^{n-1})\, H/2^{n/2}$ | $\ldots$ |
| $\ldots$ | $\ldots$ | $\ldots$ |
| $\|x\rangle$ | $(-C + \Sigma_{j \in \{0,1\}^n - \{x\}} I/2^{n-1} + C/2^{n-1})\, H/2^{n/2}$ | $\ldots$ |
| $\ldots$ | $\ldots$ | $\ldots$ |
| $\|1 \ldots 1\rangle$ | $(-I + \Sigma_{j \in \{0,1\}^n - \{x\}} I/2^{n-1} + C/2^{n-1})\, H/2^{n/2}$ | $\ldots$ | and so:

| $G_{h=1}$ | $\|0 \ldots 0\rangle$ | $\ldots$ |
|---|---|---|
| $\|0 \ldots 0\rangle$ | $\{[-1 + (2^n - 1)/2^{n-1}]\, I + C/2^{n-1}\}\, H/2^{n/2}$ | $\ldots$ |
| $\ldots$ | $\ldots$ | $\ldots$ |
| $\|x\rangle$ | $\{(2^n - 1)/2^{n-1}\, I + [-1 + 1/2^{n-1}]C\}\, H/2^{n/2}$ | $\ldots$ |
| $\ldots$ | $\ldots$ | $\ldots$ |
| $\|1 \ldots 1\rangle$ | $\{[-1 + (2^n - 1)/2^{n-1}]\, I + C/2^{n-1}\}\, H/2^{n/2}$ | $\ldots$ |

Now, consider to apply matrix operator $\{[-1+(2^n-1)/2^{n-1}]I+C/2^{n-1}\}H/2^{n/2}$ and matrix operator $\{(2^n-1)/2^{n-1}I+[-1+1/2^{n-1}]C\}H/2^{n/2}$ to vector $|1\rangle$:

$$\frac{1}{2^{n/2}}\left\{\left[-1+\frac{2^n-1}{2^{n-1}}\right]I + \frac{1}{2^{n-1}}C\right\}H|1\rangle = \left(-1 + \frac{2^n-2}{2^{n-1}}\right)\frac{|0\rangle - |1\rangle}{2^{\frac{(n+1)}{2}}}$$

$$\frac{1}{2^{n/2}}\left\{\frac{2^n-1}{2^{n-1}}I + \left[-1+\frac{1}{2^{n-1}}\right]C\right\}H|1\rangle = \left(+1 + \frac{2^n-2}{2^{n-1}}\right)\frac{|0\rangle - |1\rangle}{2^{\frac{(n+1)}{2}}}$$

This means:

$$G_{h=1}|0 \ldots 01\rangle = \left[\left(-1+\frac{2^n-2}{2^{n-1}}\right)|0 \ldots 0\rangle + \left(-1+\frac{2^n-2}{2^{n-1}}\right)|0 \ldots 1\rangle + \ldots + \left(+1+\frac{2^n-2}{2^{n-1}}\right)|x\rangle + \ldots + \left(-1+\frac{2^n-2}{2^{n-1}}\right)|1 \ldots 1\rangle\right] \otimes \frac{|0\rangle - |1\rangle}{2^{\frac{(n+1)}{2}}}$$

which can be written as a block vector:

| $G_{h-1}\|0 \ldots 01\rangle$ | |
|---|---|
| $\|0 \ldots 0\rangle$ | $[-1 + (2^n - 2)/2^{n-1}]\, /2^{n/2}H|1\rangle$ |
| $\ldots$ | $\ldots$ |
| $\|x\rangle$ | $[+1 + (2^n - 2)/2^{n-1}]\, /2^{n/2}H|1\rangle$ |
| $\ldots$ | $\ldots$ |
| $\|1 \ldots 1\rangle$ | $[-1 + (2^n - 2)/2^{n-1}]\, /2^{n/2}H|1\rangle$ |

Now, let us suppose of applying the operator $(D_n \otimes I) \cdot U_F$ to a vector in this form:

| $\|\phi\rangle$ | |
|---|---|
| $\|0 \ldots 0\rangle$ | $\alpha H|1\rangle$ |
| $\ldots$ | $\ldots$ |
| $\|x\rangle$ | $\beta H|1\rangle$ |
| $\ldots$ | $\ldots$ |
| $\|1 \ldots 1\rangle$ | $\alpha H|1\rangle$ | where $\alpha$ and $\beta$ are real number such that $(2^n-1)\alpha^2 + \beta^2 = 1$. The result is:

| $U_F \cdot \|\phi\rangle$ | |
|---|---|
| $\|0 \ldots 0\rangle$ | $\alpha H|1\rangle$ |
| $\ldots$ | $\ldots$ |
| $\|x\rangle$ | $\beta C H|1\rangle$ |
| $\ldots$ | $\ldots$ |
| $\|1 \ldots 1\rangle$ | $\alpha H|1\rangle$ |

| $(D_n \otimes I) \cdot U_F \cdot \|\phi\rangle$ | |
|---|---|
| $\|0 \ldots 0\rangle$ | $(-\alpha + \Sigma_{j \in \{0,1\}^n - \{x\}}\alpha/2^{n-1} - \beta/2^{n-1})\, H|1\rangle$ |
| $\ldots$ | $\ldots$ |
| $\|x\rangle$ | $(+\beta + \Sigma_{j \in \{0,1\}^n - \{x\}}\alpha/2^{n-1} - \beta/2^{n-1})\, H|1\rangle$ |
| $\ldots$ | $\ldots$ |
| $\|1 \ldots 1\rangle$ | $(-\alpha + \Sigma_{j \in \{0,1\}^n - \{x\}}\alpha/2^{n-1} - \beta/2^{n-1})\, H|1\rangle$ |

| $(D_n \otimes I) \cdot U_F \cdot \|\phi\rangle$ | |
|---|---|
| $\|0 \ldots 0\rangle$ | $\{-\alpha + [(2^n - 1)\alpha - \beta]/2^{n-1}\}\, H|1\rangle$ |
| $\ldots$ | $\ldots$ |
| $\|x\rangle$ | $\{+\beta + [(2^n - 1)\alpha - \beta]/2^{n-1}\}\, H|1\rangle$ |
| $\ldots$ | $\ldots$ |
| $\|1 \ldots 1\rangle$ | $\{-\alpha + [(2^n - 1)\alpha - \beta]/2^{n-1}\}\, H|1\rangle$ |

This means that if we start from vector $G_{h=1}|0 \ldots 01\rangle$, which is in the form considered, and we apply h times operator $(D_n \otimes I) \cdot U_F$, the coefficients at time t are such that:

$$\alpha_t = 2\frac{(2^n - 1)\alpha_{t-1} - \beta_{t-1}}{2^n} - \alpha_{t-1}$$

$$\beta_t = 2\frac{(2^n - 1)\alpha_{t-1} - \beta_{t-1}}{2^n} + \beta_{t-1}$$

Figure 11A:
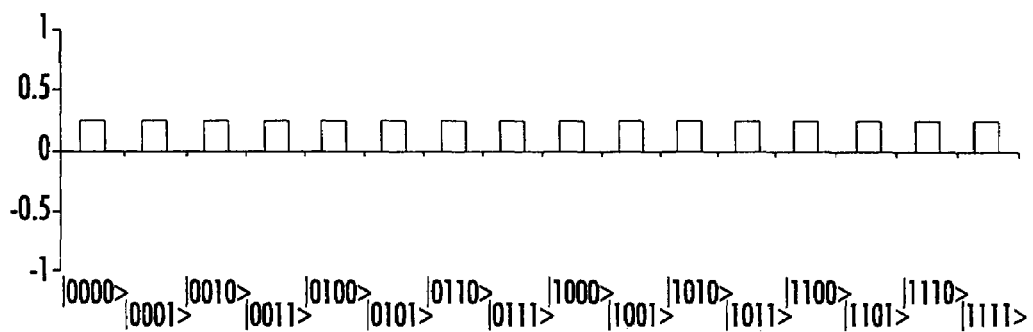
FIG. 11a is an example of a vector superposition according to the invention.
Figure 11B:
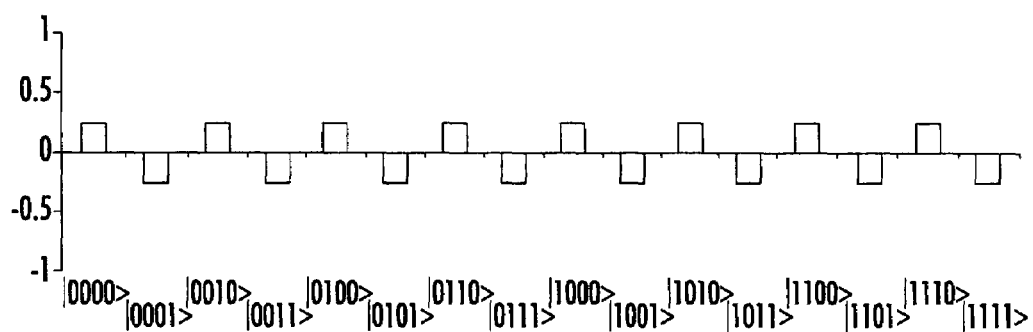
FIG. 11b is the set of vectors from FIG. 11a after $^4$H has been applied.
Figure 11C:
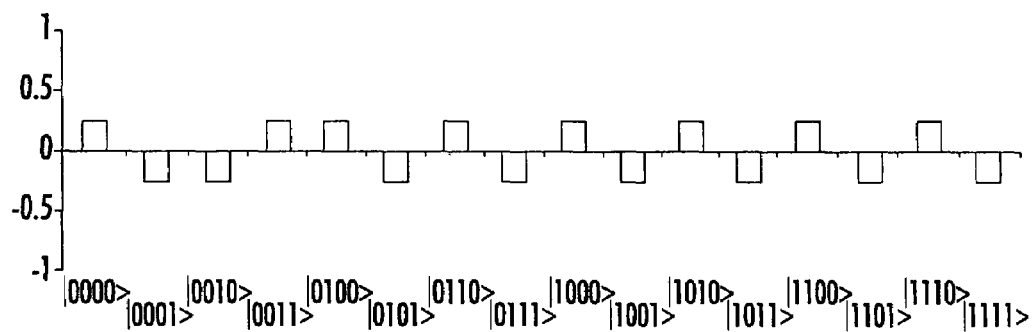
FIG. 11c is the set of vectors from FIG. 11b after the entanglement operator $U_F$ (with x=001) has been applied.
Figure 11D:
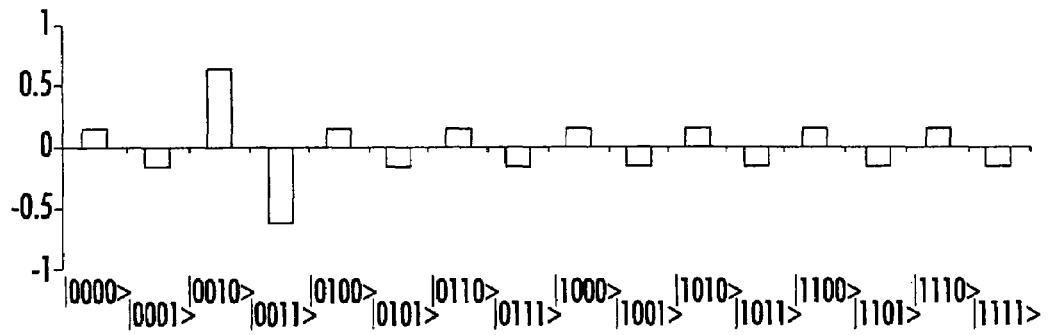
FIG. 11d is the set of vectors from FIG. 11b after having applied the interference operator $D_n \otimes I$.

So $\beta$ increases while $\alpha$ decreases. Consider for example the vector superposition in FIG. 11a. By applying the operator $^4H$ the vector superposition becomes the superposition of FIG. 11b. Applying the entanglement operator $U_F$ with x=001, the vector superposition of FIG. 11c is produced and, after the application of $D_n \otimes I$, the superposition is the one depicted in FIG. 11d. Here, the probability amplitudes of non-interesting vectors are not null, but they are very small.

Figure 11E:
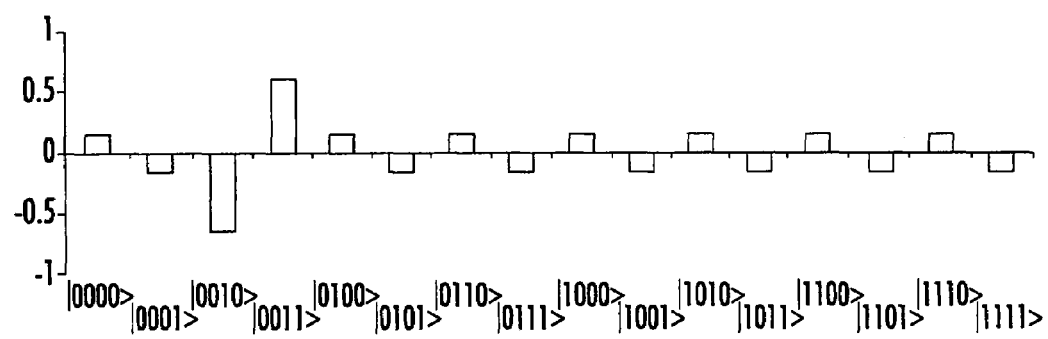
FIG. 11e is the set of vectors from FIG. 11b after having applied the entanglement operator $U_F$ a second time.
Figure 11F:
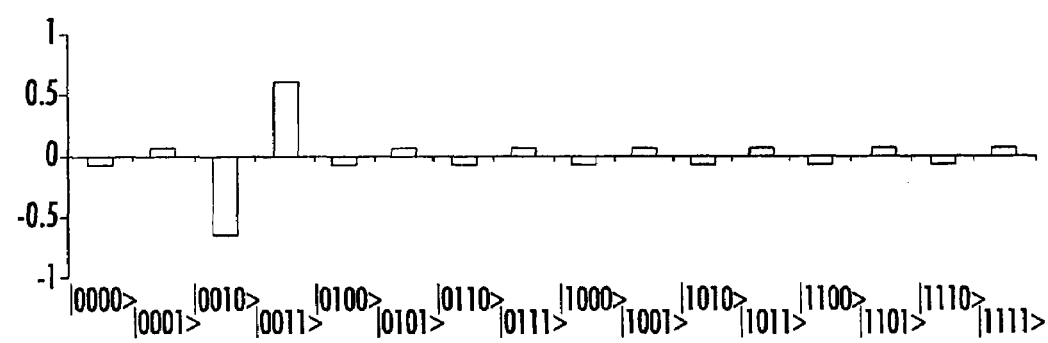
FIG. 11f is the set of vectors from FIG. 11b after having applied the interference operator $D_n \otimes I$ a second time.

Suppose to apply operator $U_F$ again: the resulting superposition is reported in FIG. 11e. Then, by applying $D_n \otimes I$, we obtain the vector linear combination of FIG. 11f.

We can observe that the probability amplitude of the desired vectors has increased in modulus. This means a greater probability to measure vectors $|0010\rangle$ or $|0011\rangle$.

If we do measurements after h repetitions of operator $D_n \cdot U_F$, what is the probability P(h) to measure vectors $|x\rangle \otimes |0\rangle$ or $|x\rangle \otimes |1\rangle$? We can show that the:

$$P(h) = O(2^{-n/2})$$

The quantum block is repeated only 1 time with a sufficiently large $h = O(2^{n/2})$. So, the final collected basis vector is unique.

Information Analysis

A3. Introductory Example: Information Analysis of Grover's Algorithm

Let us consider the operator that encoding the input function as:

$$U_F = \begin{bmatrix} I & 0 & 0 & 0 & 0 & 0 & 0 & 0 \\ 0 & C & 0 & 0 & 0 & 0 & 0 & 0 \\ 0 & 0 & I & 0 & 0 & 0 & 0 & 0 \\ 0 & 0 & 0 & I & 0 & 0 & 0 & 0 \\ 0 & 0 & 0 & 0 & I & 0 & 0 & 0 \\ 0 & 0 & 0 & 0 & 0 & I & 0 & 0 \\ 0 & 0 & 0 & 0 & 0 & 0 & I & 0 \\ 0 & 0 & 0 & 0 & 0 & 0 & 0 & I \end{bmatrix}$$

Figure 11H:
FIG. 11h resumes the information analysis of the Grover's algorithm for the first iteration according to the invention.
Figure 11I:
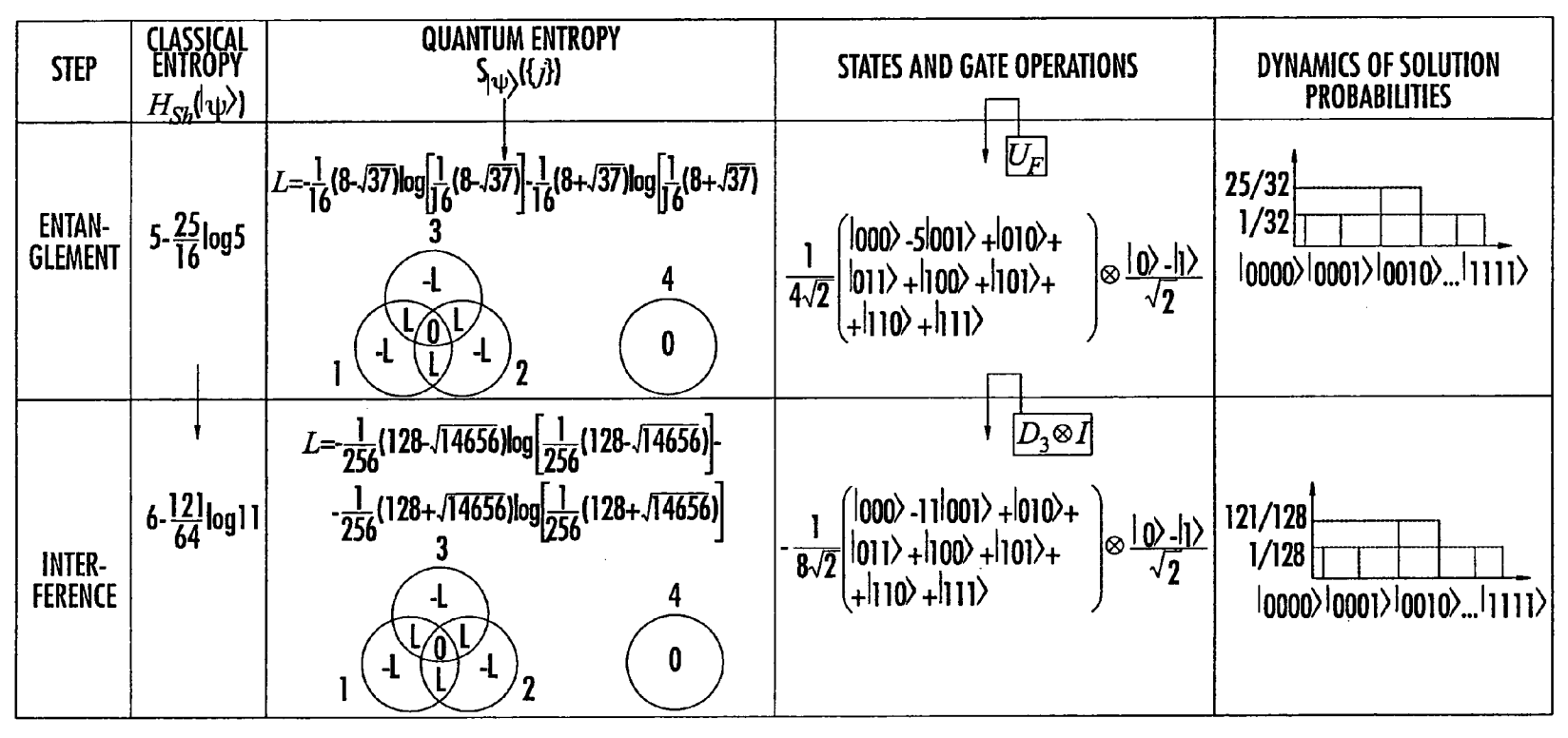

FIG. 11g represents a general iteration algorithm for information analysis of Grover's QA. In FIGS. 11h and 11i two iterations of this algorithm are reported. From these tables we observe that:

1. The entanglement operator in each iteration increases correlation among the different bits;

2. The interference operator reduces the classical entropy but, as side effect, it destroys part of the quantum correlation measure by the Von Neumann entropy.

Grover algorithm builds in several iterations intelligent states (see Eq. (7)). Every iteration first encodes the searched function by entanglement, but then partly destroys the encoded information by the interference operator. Several iterations are needed in order to conceal both the need to have encoded information and the need to access it. Grover's algorithm is from Searching Group of Algorithms. The Principle of Minimum Classical (Quantum) Entropy in output of QA means success results on intelligent output states. The searching QA's needed checking minimum of Classical Entropy and coordination the gap with Quantum Entropy Amount. The ability of co-ordination of these both values characterizes the intelligence of searching QA's.

Decoder

As in Deutsch's algorithm, when the output vector from the quantum gate has been measured, we must interpret it in order to find x.

From the analyses we did above, this step is very simple. In fact, it is sufficient to choose a large h in order to get the searched vector |x>⊗|0> or |x>⊗|1> with probability near to 1. After getting it we encode back into their binary values the first n basis vector in the resulting tensor product, obtaining string x as final answer.

Therefore, it is evinced that Grover's algorithm can be used in search problems.

A search problem can always be so stated: given a truth function $f:\{0,1\}^n \rightarrow \{0,1\}$ such that there is only one input $x \in \{0,1\}^n : f(x)=1$ find x: this is exactly the kind of problem that can be solved by the Grover's algorithm.

Comparing between them the algorithm above analyzed, it is clear that quantum algorithms have the same structure: a collection of vectors is sequentially submitted to a superposition operator, to an entanglement operator and to an interference operator. The resulting set of vectors is analyzed by a measurement block which extract the desired information.

Finally it must be observed that the differences among quantum algorithms consist essentially in the choice of the interference operator Int, the entanglement operator $U_F$ and of the superposition operator S.

The input vector is a sort of message that traverses a quantum channel made of three main sub-channels: superposition, entanglement and interference. The entanglement channel is the true input of the algorithm gate. It belongs to a given family depending on the problem to solve and on its input. The superposition and especially the interference channels are chosen in such a way that several measurements effectuated at the end of the channel reveal what kind of entanglement has taken place at the middle of the channel.

In conclusion, it can be stated that Quantum Algorithms are global random searching algorithms based on the quantum mechanics principles, laws, and quantum effects. In the quantum search, each design variable is represented by a finite linear superposition of classical initial states, with a sequence of elementary unitary steps manipulate the initial quantum state |i⟩ (for the input) such that a measurement of the final state of the system yields the correct output. It begins with elementary classical preprocessing, and then it applies the following quantum experiment: starting in an initial superposition of all possible states, it computes a classical function, applies a Quantum Fast Fourier Transform (QFFT), and finally performs a measurement. Depending on the outcome it may carry out one more similar quantum experiments, or complete the computation with some classical post-processing. Usually, three principle operators, i.e. linear superposition (coherent states), entanglement, and interference, are used in the quantum search algorithm.

In general form the structure of quantum search algorithm can be described as $$G = \left[ \underbrace{\frac{Interference}{(Int \otimes I_m)}}_{} \circ \underbrace{U_F}_{Entanglement} \right]^{h+1} \circ \underbrace{(H_n \otimes S_m)}_{Superposition} \quad (5)$$

In this quantum algorithms and genetic algorithms structures have the following interrelations:

$$GA: E[m(H, t+1)] \geq m(H, t) \cdot \underbrace{\frac{f(H, t)}{\bar{f}(t)}}_{Selection} \cdots \underbrace{\left[ 1 - p_c \frac{L(H)}{N-1} \left( 1 - \overbrace{\frac{m(H, t)f(H, t)}{M\bar{f}(t)}}^{P_d(H,t)} \right) \right]}_{Crossover} \underbrace{(1 - p_m)^{O(H)}}_{Mutation} \quad (6)$$

$$QA \; (Gate): \quad \left[ \frac{Interference}{(Int \otimes I_m)} \circ \frac{Entanglement}{U_F} \right]^{h+1} \circ \underbrace{(H_n \otimes S_m)}_{Superposition}$$

Figure 12:
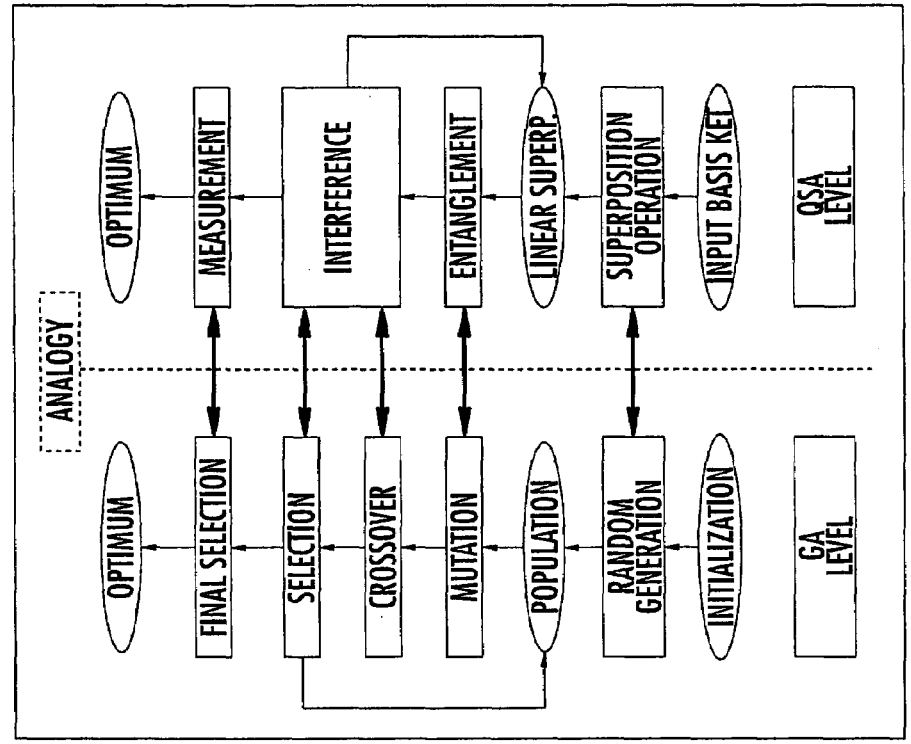
FIG. 12 shows the analogy between a GA and a QSA according to the invention.

In FIG. 12 the structures of GA and QSA are compared. In GA a starting population is randomly generated. Mutation and crossover operators are then applied in order to change the genome of some individuals and create some new genomes. Some individuals are then cut off according to a fitness function and selection of good individuals is done generating a new population. The procedure is then repeated on this new population till an optimum is found.

By analogy in QSA an initial basis vector is transformed into a linear superposition of basis vector by the superposition operator. Quantum operators such as entanglement and interference then act on this superposition of states generating a new one where some states (the non-interesting) have reduced their probability amplitude in modulus and some other (the most interesting) have increased it. The process is repeated several times in order to get to a final probability distribution where an optimum can be easily observed.

The quantum entanglement operator acts in analogy to the genetic mutation operator: in fact it maps every basis vector in the entering superposition into another basis vector by flipping some bits in the ket label. The quantum interference operator acts like the genetic crossover operator by building a new superposition of basis states from the interaction of the probability amplitudes of the states in the entering superposition. But the interference operator includes also the selection operator. In fact, interference increases the probability amplitude modulus of some basis states and decreases the probability amplitude modulus of some other ones according to a general principle, that is maximizing the quantity $$\mathfrak{I}_T(|\text{output}\rangle) = 1 - \frac{E_T^{Sh}(|\text{output}\rangle) - E_T^{VN}(|\text{output}\rangle)}{|T|} \quad (7)$$

with $T=\{1, \ldots, n\}$. This quantity is called the intelligence of the output state and measures how the information encoded into quantum correlation by entanglement is accessible by the measurement. The role of the interference operator is in fact to preserve the Von Neumann entropy of the entering entangled state and to reduce at its minimum the Shannon entropy, which has been increased to its maximum by the superposition operator. Note that there is a strong difference between GA and QSA: in GA the fitness functions changes with different instances of the same problem, whereas mutation and crossover are always random. In QSA the fitness function is always the same (the intelligence of the output state), whereas the entanglement operator strongly depends on the input function f.

Figure 13:
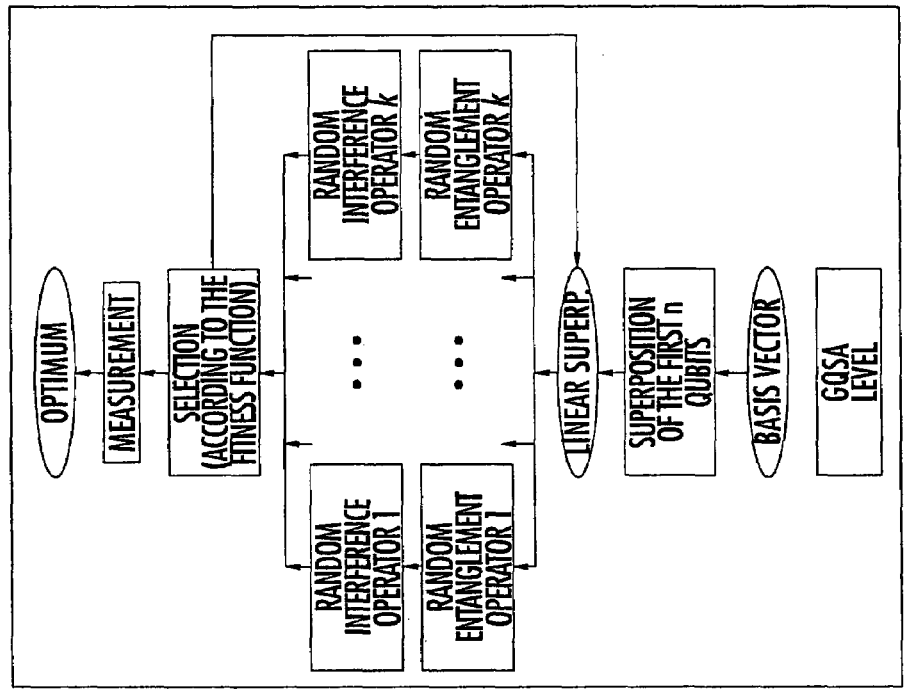
FIG. 13 is a block diagram for a QGSA according to the invention.

We propose in this patent to merge the two schemes of GA and QSA undergoing the analogy between them and integrating their peculiarities. The new scheme concerns quantum genetic search algorithms (QGSA) and is depicted in FIG. 13.

An initial superposition with t random non-null probability amplitude values is first generated $$|\text{input}\rangle = \sum_{i=1}^{t} c_i |x_i\rangle \quad (8)$$

Every ket corresponds to an individual of the population and in the general case is labeled by a real number. So, every individual corresponds to a real number $x_i$ and is implicitly weighted by a probability amplitude value $c_i$. The action of the entanglement and interference operators is genetically simulated: k different paths are randomly chosen, where each path corresponding to the application of an entanglement and interference operator. The entanglement operator includes an injective map transforming each basis vector into another basis vector. This is done defining a mutation ray $\epsilon>0$ and extracting t different values $\epsilon_1, \ldots, \epsilon_t$ such that $-\epsilon \leq \epsilon_i \leq \epsilon$. Then the entanglement operator $\mathbf{U}_F^j$ for path j is defined by the following transformation rule:

$$|x_i\rangle \xrightarrow{U_F^j} |x_i + \varepsilon_i\rangle \quad (9)$$

When $\mathbf{U}_F^j$ acts on the initial linear superposition, all basis vectors in it undergo mutation:

$$|\psi^j\rangle = \sum_{i=1}^{t} c_{i,j} |x_i + \varepsilon_{i,j}\rangle \quad (10)$$

The mutation operator $\epsilon$ can be described as following relation:

$$\varepsilon = \begin{cases} 1 & \text{for bit permutation 0} \\ 0 & \text{for bit permutation 1} \\ -1 & \text{for phase permutation} \end{cases} \quad (11)$$

Suppose there are eight states in the system, encoded in binary as 000, 001, 010, 011, 100, 110, 111. One of possible states that may be in during a computation is $$\frac{i}{\sqrt{2}}|000\rangle + \frac{1}{\sqrt{2}}|100\rangle + \frac{1}{\sqrt{2}}|110\rangle.$$

A unitary transform is usually constructed so that it is performed at the bit level.

For example, the unitary trans formation $$\begin{matrix} 0 \\ 1 \end{matrix} \begin{pmatrix} 0^0 & {}^1 1 \\ 1 & 0 \end{pmatrix}$$

will switch the state $|0\rangle$ to $|1\rangle$ and $|1\rangle$ to $|0\rangle$ (NOT operator).

Mutation of a chromosome in GA alters one or more genes. It can also be described by changing the bit at a certain position or positions. Switching the bit can be simply carried out by the unitary NOT-transform.

The unitary transformation that acts, as example on the last two bits will transform the state $|1001\rangle$ to state $|1011\rangle$ and the state $|0111\rangle$ to the state $|0101\rangle$ and so on can be described as the following matrix $$\begin{matrix} 00 \\ 01 \\ 10 \\ 11 \end{matrix} \begin{pmatrix} {}^{00} & {}^{01} & {}^{10} & {}^{11} \\ 1 & 0 & 0 & 0 \\ 0 & 0 & 0 & 1 \\ 0 & 0 & 1 & 0 \\ 0 & 1 & 0 & 0 \end{pmatrix} \quad (12)$$

is a mutation operator for the set of vectors $|0000\rangle$, $|0001\rangle$, $|1111\rangle$.

A phase shift operator Z can be described as the following $$Z: \begin{array}{l} |0\rangle \to |0\rangle \\ |1\rangle \to -|1\rangle \end{array}$$

and operator $$Y: \begin{array}{l} |0\rangle \to |1\rangle \\ |1\rangle \to -|0\rangle \end{array}$$

is a combination of negation NOT and a phase shift operator Z.

Remark 1. As example, the following matrix $$\begin{array}{c} \\ 00 \\ 01 \\ 10 \\ 11 \end{array} \begin{pmatrix} 00 & 01 & 10 & 11 \\ 1 & 0 & 0 & 0 \\ 0 & 1 & 0 & 0 \\ 0 & 0 & 0 & 1 \\ 0 & 0 & 1 & 0 \end{pmatrix} \quad (13)$$

operates a crossover on the last two bits transforming 1011 and 0110 in 1010 and 0111, where the cutting point is at the middle (one-point crossover).

The two-bit conditional phase shift gate has the following matrix form $$\begin{array}{c} \\ 00 \\ 01 \\ 10 \\ 11 \end{array} \begin{pmatrix} 00 & 01 & 10 & 11 \\ 1 & 0 & 0 & 0 \\ 0 & 1 & 0 & 0 \\ 0 & 0 & 1 & 0 \\ 0 & 0 & 0 & e^{i\phi} \end{pmatrix}$$

and the controlled NOT (CNOT) gate that can create entangled states is described by the following matrix:

$$CNOT: \begin{array}{l} |00\rangle \to |00\rangle \\ |01\rangle \to |01\rangle \\ |10\rangle \to |11\rangle \\ |11\rangle \to |10\rangle \end{array} \Rightarrow \begin{array}{c} 00 \\ 01 \\ 10 \\ 11 \end{array} \begin{pmatrix} 00 & 01 & 10 & 11 \\ 1 & 0 & 0 & 0 \\ 0 & 1 & 0 & 0 \\ 0 & 0 & 0 & 1 \\ 0 & 0 & 1 & 0 \end{pmatrix}$$

The interference operator $Int^1$ is chosen as a random unitary squared matrix of order t, whereas the interference operators for the other paths are generated from $Int^1$ according to a suitable law. Examples of such matrices are the Hadamard transformation matrix $H_t$ and the diffusion matrix $D_t$ that have been defined above, but many other ones can be built. The application of entanglement and interference operators produces a new superposition of maximum length t:

$$|\text{output}^j\rangle = \sum_{i=1}^{t} c'_{i,j} |x_i + \varepsilon_{i,j}\rangle \quad (14)$$

The average entropy value for this state is now evaluated. Let E(x) be the entropy value for individual x. Then $$E(|\text{output}^j\rangle) = \sum_{i=1}^{t} \|c'_{i,j}\|^2 E(x_i + \varepsilon_{i,j}) \quad (15)$$

The average entropy value is calculated by averaging every entropy value in the superposition with respect to the squared modulus of the probability amplitudes.

According to this sequence of operations, k different superpositions are generated from the initial one using different entanglement and interference operators. Every time the average entropy value is evaluated. Selection consists in holding only the superposition with minimum average entropy value. When this superposition is obtained, it becomes the new input superposition and the process starts again. The interference operator that has generated the minimum entropy superposition is hold and $Int^1$ is set to this operator for the new step. The computation stops when the minimum average entropy value falls under a given critical limit. At this point measurement is simulated, that is a basis value is extracted from the final superposition according to the squared modulus of its probability amplitude.

Figure 14:
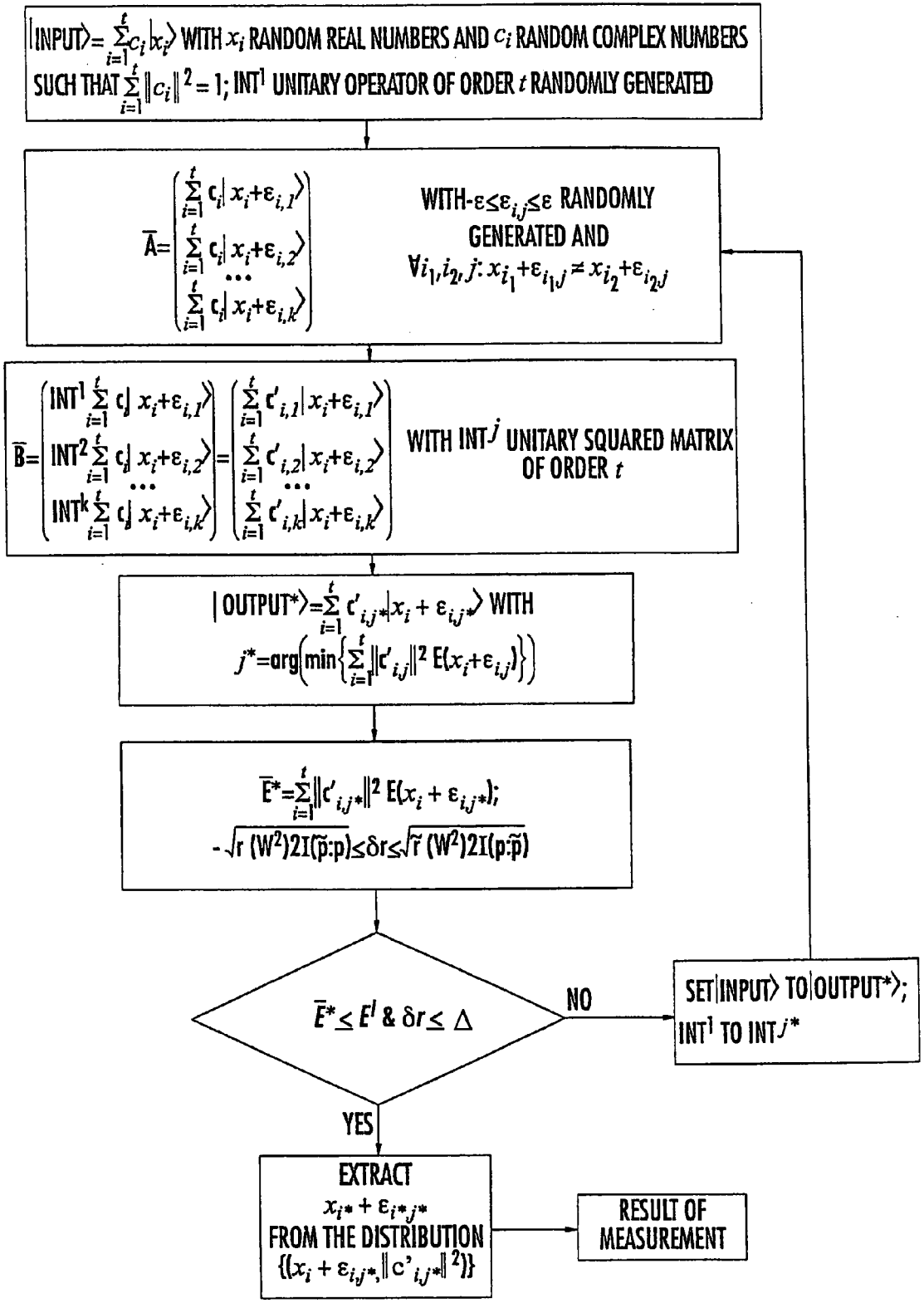
FIG. 14 is a block diagram of a Quantum Genetic Search Algorithm according to the invention.

The whole algorithm is resumed on FIG. 14 in the followings:

1.

$$|\text{input}\rangle = \sum_{i=1}^{t} c_i |x_i\rangle$$

with $x_t$ random real numbers and $c_t$ random complex numbers such that $$\sum_{i=1}^{t} \|c_i\|^2 = 1;$$

$Int^1$ unitary operator of order t randomly generated;

2.

$$\overline{A} = \begin{pmatrix} \sum_{i=1}^{t} c_i |x_i + \varepsilon_{i,1}\rangle \\ \sum_{i=1}^{t} c_i |x_i + \varepsilon_{i,2}\rangle \\ \cdots \\ \sum_{i=1}^{t} c_i |x_i + \varepsilon_{i,k}\rangle \end{pmatrix}$$

with $-\epsilon \leq \epsilon_{i,j} \leq \epsilon$ randomly generated and $\forall i_1, i_2, j: x_{i_1} + \epsilon_{i_1,j} \neq x_{i_2} + \epsilon_{i_2,j}$;

3.

$$\overline{B} = \begin{pmatrix} \text{Int}^1 \sum_{i=1}^{t} c_i |x_i + \varepsilon_{i,1}\rangle \\ \text{Int}^2 \sum_{i=1}^{t} c_i |x_i + \varepsilon_{i,2}\rangle \\ \ldots \\ \text{Int}^k \sum_{i=1}^{t} c_i |x_i + \varepsilon_{i,k}\rangle \end{pmatrix} = \begin{pmatrix} \sum_{i=1}^{t} c'_{i,1} |x_i + \varepsilon_{i,1}\rangle \\ \sum_{i=1}^{t} c'_{i,2} |x_i + \varepsilon_{i,2}\rangle \\ \ldots \\ \sum_{i=1}^{t} c'_{i,k} |x_i + \varepsilon_{i,k}\rangle \end{pmatrix}$$

with $\text{Int}^j$ unitary squared matrix of order t;

4.

$$|\text{output}^*\rangle = \sum_{i=1}^{t} c'_{i,j^*} |x_i + \varepsilon_{i,j^*}\rangle \text{ with}$$

$$j^* = \arg\left(\min\left\{\sum_{i=1}^{t} \|c'_{i,j}\|^2 E(x_i + \varepsilon_{i,j})\right\}\right);$$

5.

$$\overline{E}^* = \sum_{i=1}^{t} \|c'_{i,j^*}\|^2 E(x_i + \varepsilon_{i,j^*})$$

6. If $\overline{E}^* < E^1$ and information risk increment is lower than a pre-established quantity $\Delta$ then extract $x_{i^*} + \epsilon_{i^*,j^*}$ from the distribution $$\{(x_i + \varepsilon_{i,j^*}, \|c'_{i,j^*}\|^2)\};$$

7. Else set |input⟩ to |output*⟩, $\text{Int}^1$ to $\text{Int}^{j^*}$ and go back to step 2.

Remark 2. Step 6 includes methods of accuracy estimation and reliability measurements of the successful result. The simulation of quantum search algorithm is represented through information flow analysis, information risk increments and entropy level estimations:

1) Applying a quantum gate G on the input vector stores information into the system state, minimizing the gap between the classical Shannon entropy and the quantum von Neumann entropy;

2) Repeating the applying for calculation (estimation) of information risk increments (see below, Remark 3);

3) Measuring the basis vector for estimation the level of average entropy value;

4) Decoding the basis vector of successful result for computation time stopping when the minimum average entropy value falls under a given critical level limit.

Remark 3. The information risk increments are calculated (estimated) according to the following formula:

$$-\sqrt{r(W^2) 2I(\tilde{p}:p)} \leq (\delta r = \tilde{r} - r) \leq \sqrt{r(W^2) 2I(p:\tilde{p})}$$

where:
W is the loss function;
$r(W^2) = \iint W^2 p(x,\theta) dx d\theta$ is an average risk for the corresponding probability density function $p(x,\theta)$;
$x = (x_1, \ldots x_n)$ is a vector of measured values;
$\theta$ is an unknown parameter; and $$I(p:\tilde{p}) = \iint p(x,\theta) \ln \frac{p(x,\theta)}{\tilde{p}(x,\theta)} dx d\theta$$

is the relative entropy (the Kullback-Leibler measure of information divergence).

As stated above, a GA searches for a global optimum in a single solution space. In order to clearly understand the meaning of this statement, further clarifications follows.

Figure 15:
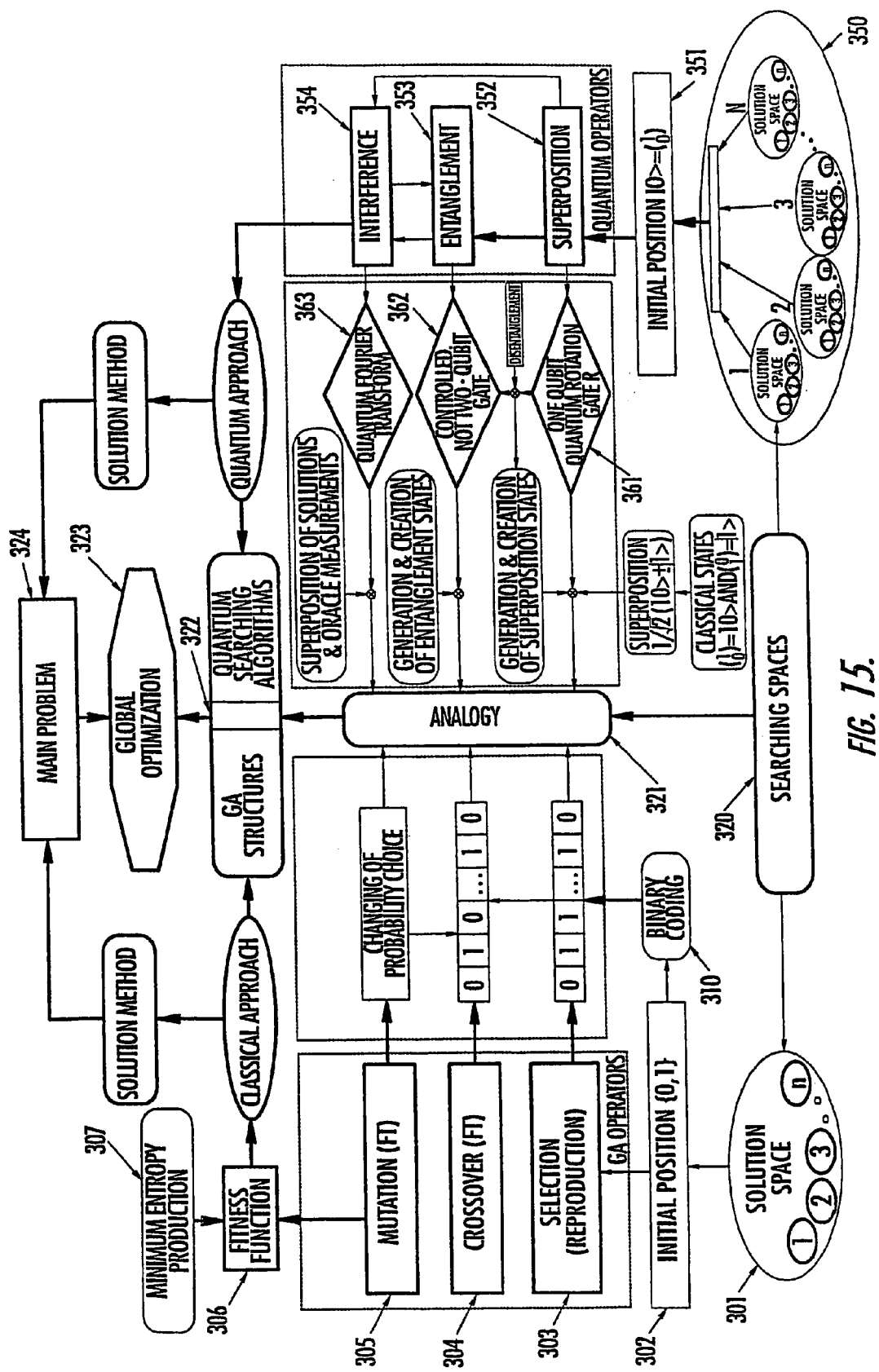
FIG. 15 describes the structure of classical Genetic Algorithms and Quantum Searching Algorithms for global optimization according to the invention.

A detailed description of the structures of GA and QSA algorithms is illustrated in FIG. 15. In the GA search, a solution space 301 leads to an initial position (input) 302. The initial position 302 is coded into binary strings using a binary coding scheme 310. GA operators as selection 303, crossover 304, and mutation 305 are applied to the coded strings to generate a population. Through a fitness function 306 (such as a fitness function based on minimum entropy production rate or some other desirable property) a global optimum for the single space 301 is found.

Example. The "single solution space" includes any possible coefficient gains of PID controller of plant under stochastic disturbance with fixed statistical properties as the correlation function and probability density function. After stochastic simulation of dynamic behavior of plant under stochastic excitation with GA we can receive the optimal coefficient gains of an intelligent PID controller only for stochastic excitation with fixed statistical characteristics. In this case we define the "single space of possible solutions" as 301. If we use stochastic excitation on a plant with other statistical characteristics, then the intelligent PID controller cannot realize a control law with a fixed KB. In this case we define a new space of possible solutions as 350.

Remark 4. If we want the universal look-up table for an intelligent PID controller from many single solution spaces, then the application of GA does not give us a final corrected result (GA—operators do not include superposition and quantum correlation as entanglement). GA gives the global optimum on the single solution space. In this case we loss the important information about statistical correlation between coefficient gains in the universal look-up table.

In contrast, in the QSA shown in FIG. 15, a group of N solution spaces 350 are used to create an initial position (input) 351. Quantum operators such as superposition 352, entanglement 353, and interference 354 operate on the initial position to produce a measurement. Superposition is created using a Hadamard transformation 361 (one-bit operation). Entanglement is created through a Controlled-NOT (CNOT) operation 362 (a two-bit operation). Interference is created through a Quantum Fourier Transform (QFT) 363. Using the quantum operators, a universal optimum for covering all the spaces in the group 350 is found.

Remark 5. Thus, the classical process of selection is loosely analogous to the quantum process of creating a superposition. The classical process of crossover is loosely analogous to the quantum process of entanglement. The classical process of mutation is loosely analogous to the quantum process of interference.

Figure 16:
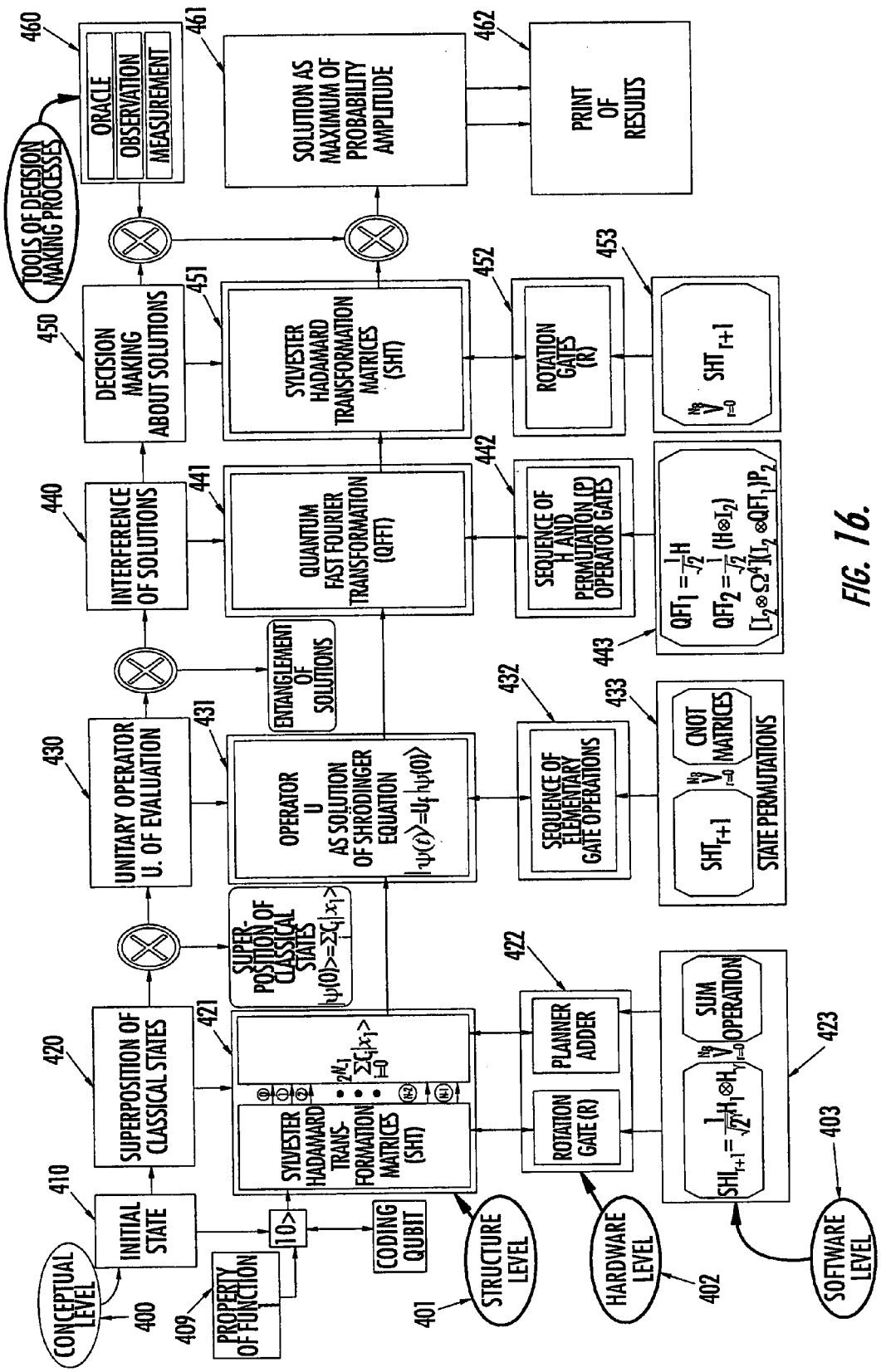
FIG. 16 describes the general structure of Quantum Algorithms according to the invention.

FIG. 16 shows a general structure of a QSA having a conceptual level 400, a structure level 401, a hardware level 402, and software level 403.

At the conceptual level 400, an initial state 410 is provided to a process block 420 that creates a superposition of states. The superposition of states is provided to a process block 430 that provides a unitary operator $U_f$ to the entanglement. An output of the process block 430 is provided to a solution block 440 that computes an interference of solutions. An output of the solution block 440 is provided to observation/measurement block 460.

At the structure level, an input is coded as a series of quantum bits (qubits) are prepared in an initial state (e.g., a logical zero state) and provided that are provided to a Hadamard Transform Matrix 421 to produce the superposition. The superposition from the matrix 421 to provide to the operator $U_f$ that produce the entanglement where $U_f$ is in general case a solution to the Schrödinger equation in a process block 431. An output from the process block 431 is provided to a Quantum Fourier Transform (QFT) to provide the interference. The output of the QFT 441 is provided to a Transform Matrix 451. An output of the Transform Matrix 451 is provided as a solution of quantum searching process with maximum probability amplitude 461.

At the hardware level, the superposition 420 is produced by rotation gates 422, the operator $U_f$ is implemented as a consequence of elementary gate operations and CNOT-gates 432, the QFFT 441 is implemented as a consequence of Hadamard and Permutation (P) operator gates, and the Transform Matrix 451 is implemented using rotation gates 452.

Figure 17:
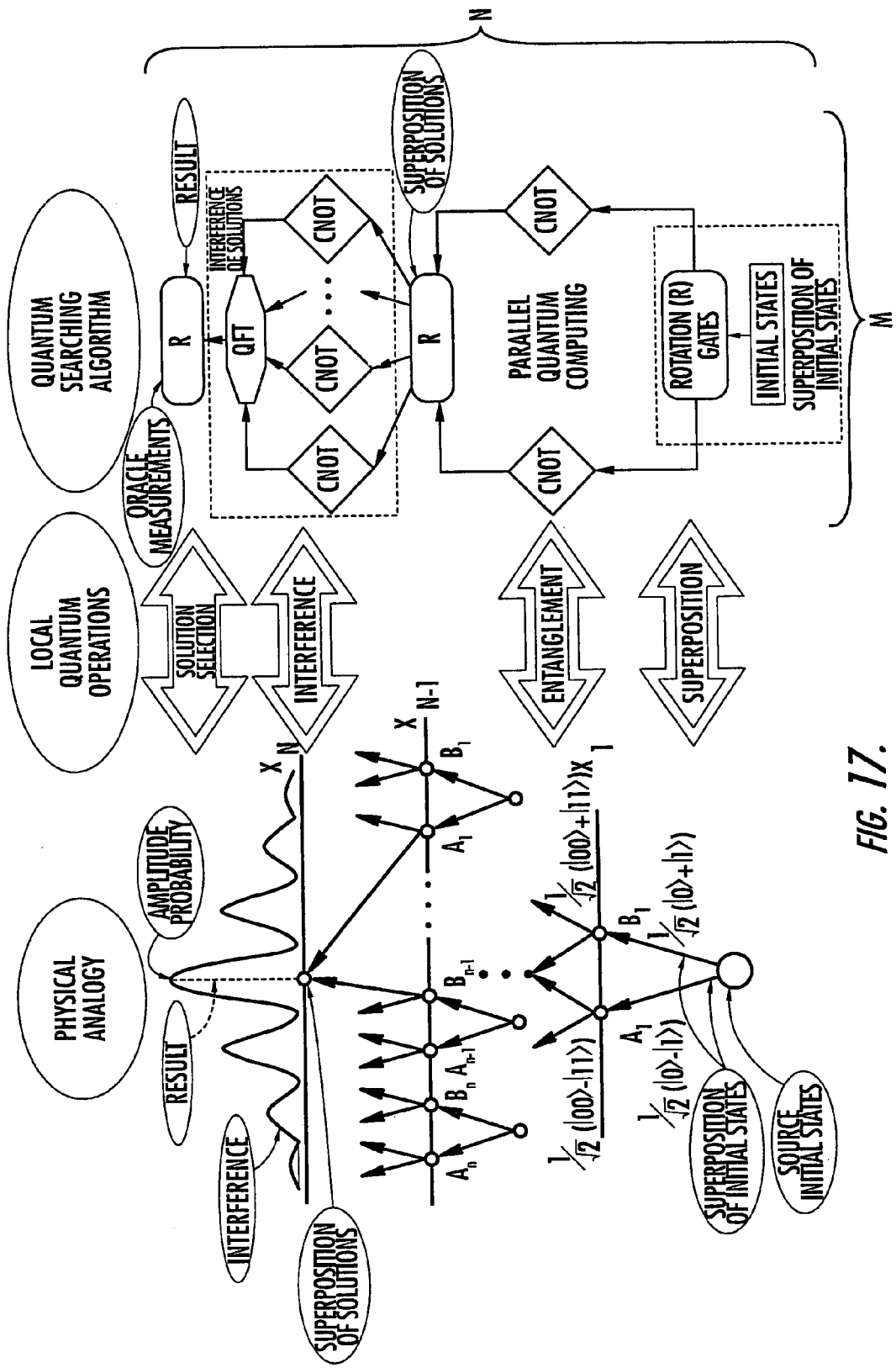
FIG. 17 depicts a quantum network for Quantum Searching Algorithm according to the invention.

FIG. 17 illustrates the QSA as an architecture involving the sequence from an initial state, through the creation of superposition. Entanglement is applied to the superposition using quantum parallelism inherent a coherent quantum system with entangled states. The parallelism collapsed when interference is introduced to produce a superposition of solutions through the QFFT. FIG. 17 illustrates these processes by comparing the classical double slit experiment to logical quantum operations and to the quantum search operations.

Remark 6. In the classical double slit, a source creates a particle having an initial superposition of states. This is analogous to the quantum algorithm operation of applying a Hadamard (rotation gates) transform to a qubit initial to an eigenstate. Returning to the double slit, entanglement is produced with the particle passes through the slits. This corresponds to the process of operating on the superposition using the unitary operator $U_f$. Again returning to the double slit, interference is produced when the entangled particles strike a photographic film placed behind the slits to produce an interference pattern (a superposition of solutions). This corresponds to the QFFT. Finally, selection of the desired solution corresponds to choosing the largest probability from the QFFT (that is, the brightest line produced on the film).

Figure 18:
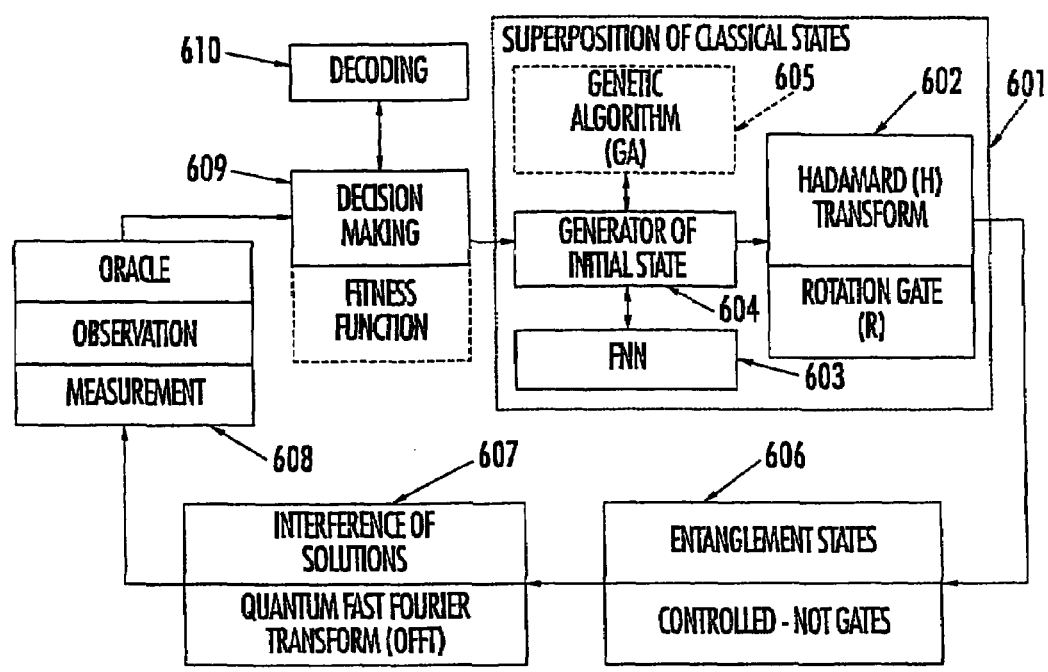
FIG. 18 is a diagram of a Quantum Searching Algorithm according to the invention.

The use of the QSA in connection with a GA or FNN is shown FIG. 18. A generator of initial states 604 works in connection with the GA 605 and, optionally a fuzzy neural network (FNN) 603, to produce a set of initial states. The initial states are provided to a Hadamard transform 602 to produce a superposition of states 601. The superposition of classical states is provided to a process block 606 that introduces entanglement through the use of operators such as a CNOT. An output from the process block 606 is provided to an interference block 607 that computes an interference of the entanglement states using QFFT. An output from the interference block 607 is provided to a measurement/observation block 608 which selects a desired solution from the superposition of solutions computed by the block 607.

An output from the measurement/observation block 608 is provided to a decision-making block 609. The decision block 609 makes decisions such as inputs for the generator of initial states 604 and, optionally, a new fitness function for the GA 605. The decision block 609 can also provide data to, and receives data from a decoding block 610. The decoding block 610 can communicate with sensors, other control systems, users, etc.

The basis of quantum computation is obtained from the laws of quantum theory wherein information is something that is encoded in the state of a physical system, and a computation is something that can be carried out on an actual physical realizable device.

A concrete example showing how a random excitation on control object can "kick" the single space of solutions for fuzzy controller is described in the followings.

Figure 19:
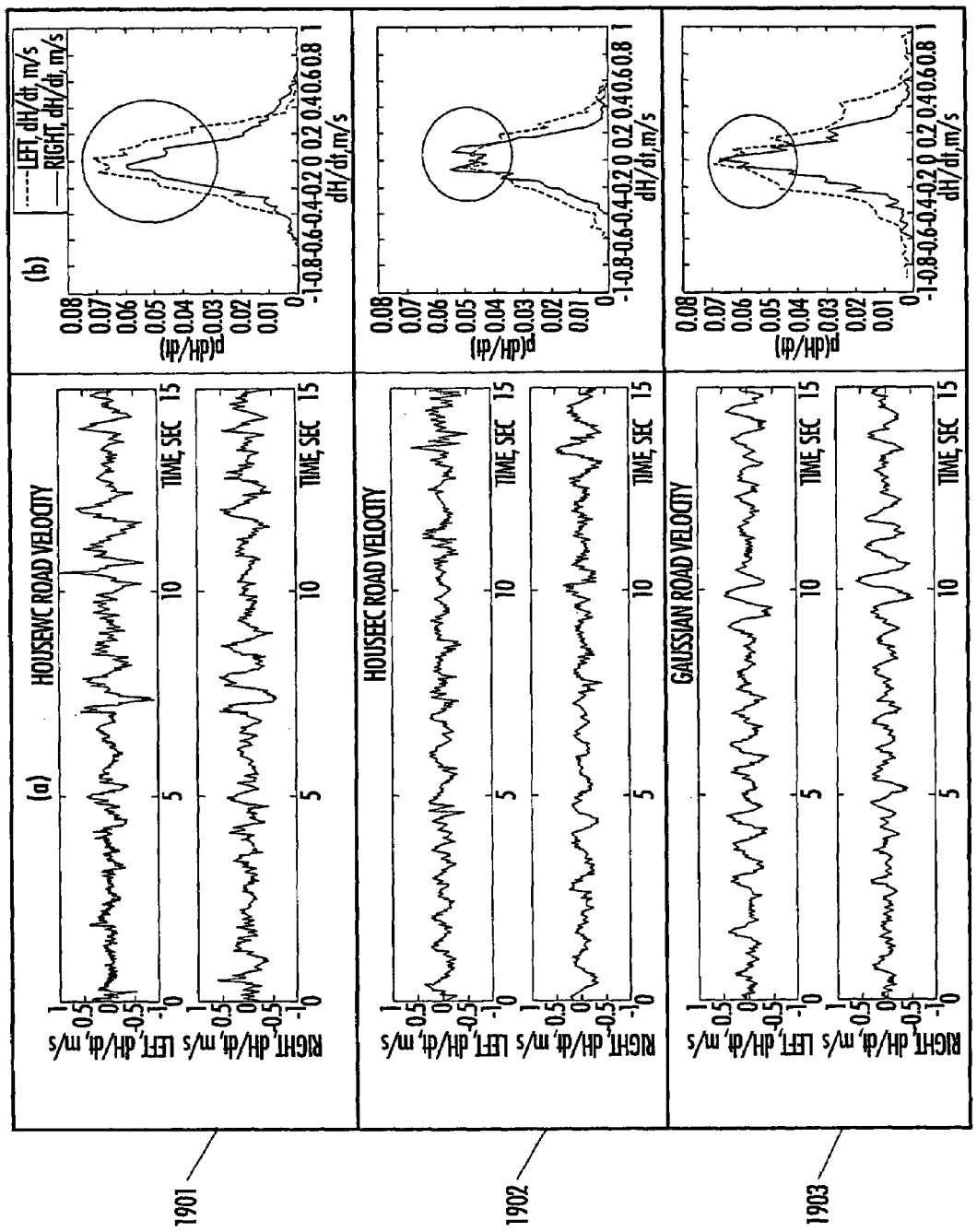
FIG. 19 shows several possible distributions of road profiles according to the invention.
Figure 20:
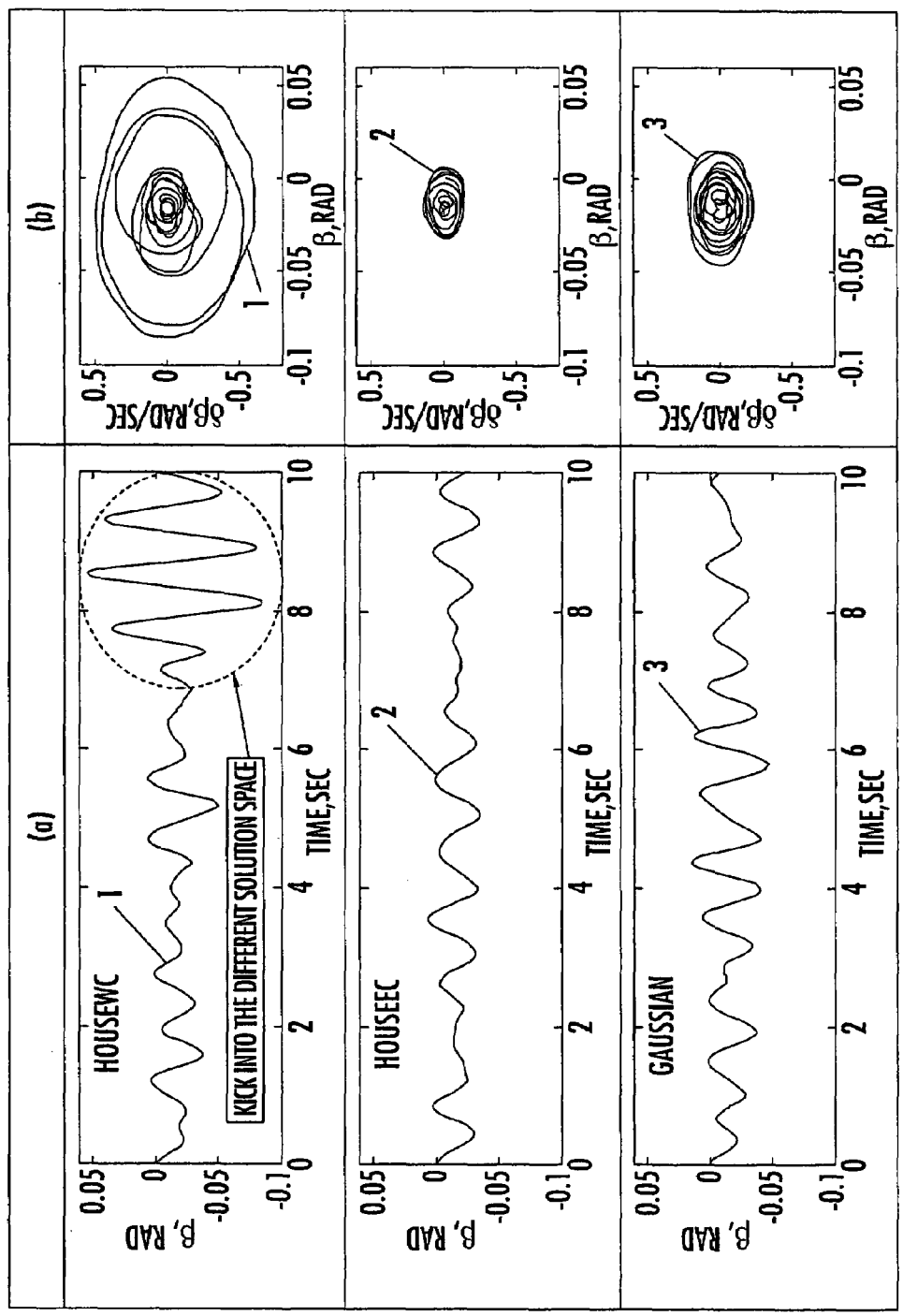
FIG. 20*a* compares different dynamic behavior of pitch angles of a vehicle after a simulation of a fuzzy control according to the invention.
FIG. 20*b* compares the phase portraits of the time diagrams of FIG. 20*a* according to the invention.
Figure 21:
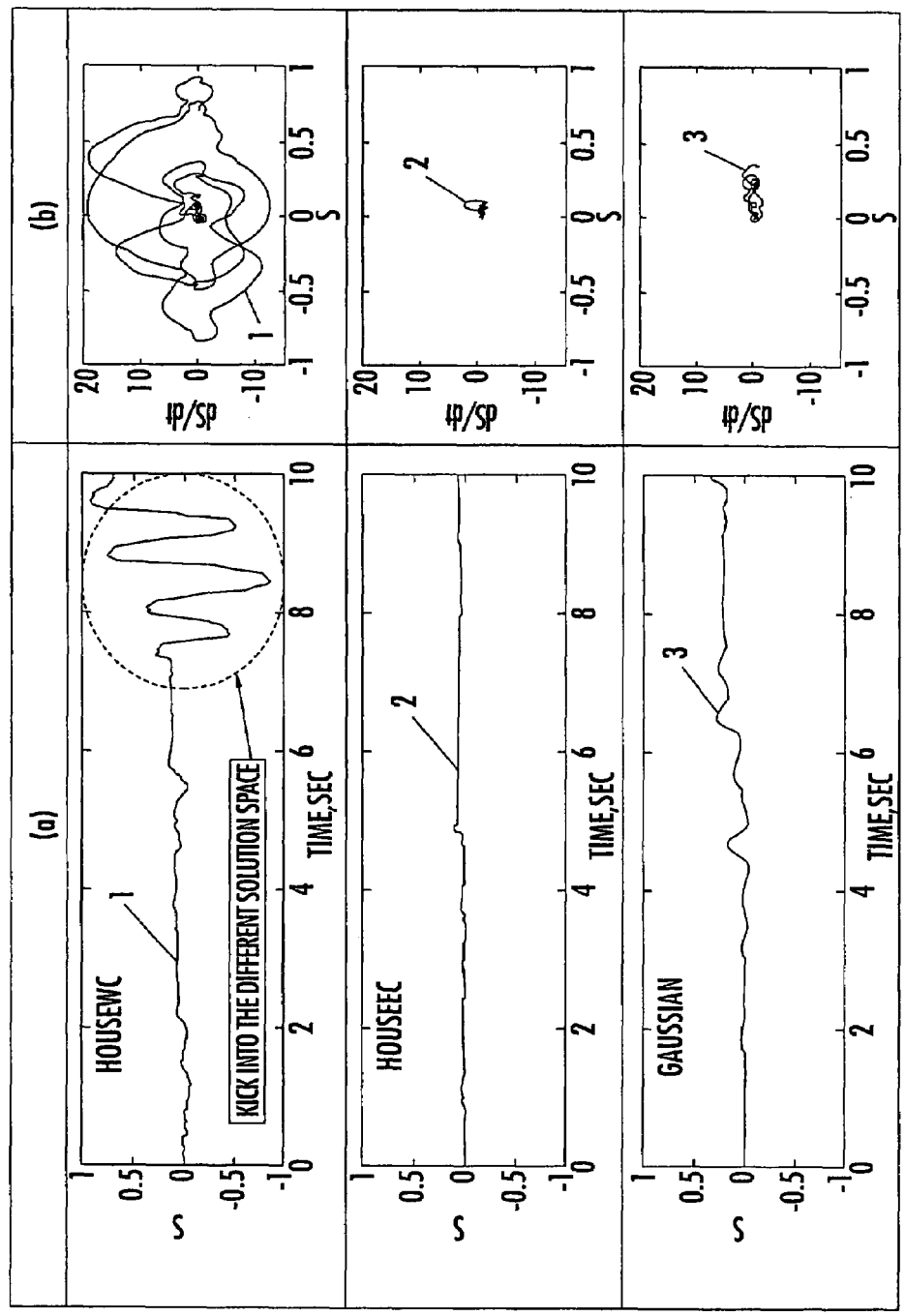
FIG. 21*a* compares the entropy accumulation of the corresponding dynamic behavior of FIG. 20*a*.
FIG. 21*b* compares the phase portraits of the time diagrams of FIG. 20*a*.
Figure 22:
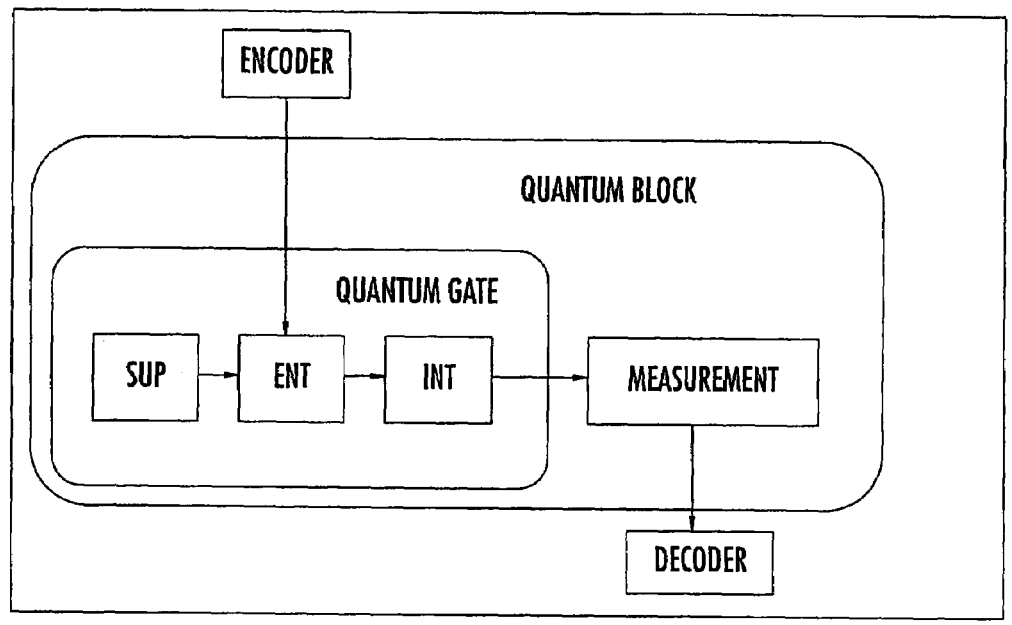
FIG. 22 is a block diagram of the accelerator according to the invention.

Example. The KB of the intelligent suspension control system was received with GA and with stochastic simulation using the random Gaussian signal as road. After an on-line simulation with a fuzzy controller we use another two real road signal (road measurements in Japan). The results of simulation for pitch angles in FIGS. 20 and 21 are shown. FIG. 20 shows that the changing in statistical characteristics of roads (see FIG. 19) kick the single space of solutions for the fuzzy controller.

In this case we must repeat the simulation with GA and use "another single space of solution" with the fitness function as entropy production for a fuzzy controller with non-Gaussian excitation on control object.

In more detail, we are applying GA to minimize the dynamic behavior of the dynamic system (Plant), and to minimize an entropy production rate. We are using different kinds of random signals (as a stochastic disturbances) which represents the profiles of roads. Some of these signals were measured from real roads, in Japan, and some of them were created using stochastic simulations with forming filters based on the FPK (Fokker-Planck-Kolmogorov) equation. In FIG. 19 three typical road signals are presented. Charts 1901, 1902, 1903 represents changing rates of the signals. Assigned time scale is calculated the way that simulates the vehicle speed of 50 kph. First two signals (HouseWC) and (HouseEC) are the measured real roads of Japan. A third signal is a Gaussian road obtained by stochastic simulation with the fixed type of the correlation function. We can see that the dynamic characteristics of these roads are similar (see charts (A)), but statistical characteristics of HouseWC road are very different from statistical characteristics of Gaussian and of HouseEC roads (see charts (B)). HouseWC road represents so called Non-Gaussian (color) stochastic process.

A big difference in the statistical characteristics of the road signals gives us completely different responses from a dynamic system and as a result, required different control solutions.

FIGS. 20 and 21 illustrate the dynamic and thermodynamic response of the suspension system (PLANT) to the above mentioned excitations. Charts (a) represent dynamic behavior of the pitch angle of the vehicle under HouseWC (line 1), HouseEC (line 2) and Gaussian (line 3) roads. The knowledge base as a look-up table for fuzzy controller in this case was obtained using Gaussian road signal, and then applied to the HouseWC and HouseEC roads. We see that system response from the roads with the same characteristics are similar, which means that GA has found the optimum solution for Gaussian-like signal shapes, but response obtained from the system with HouseWC road is a completely different signal. For this Non-Gaussian road we need new control GA strategy that differs from the above mentioned, e.g., it requires solution from different single space of solutions. On the phase portrait (Charts (b)), the difference of system responses is more visible.

It is desirable, however, to search for a global optimum in multiple solution spaces to find a "universal" optimum. A quantum genetic search algorithm provides the ability to search multiple spaces simultaneously (as described below).

Figure 2:
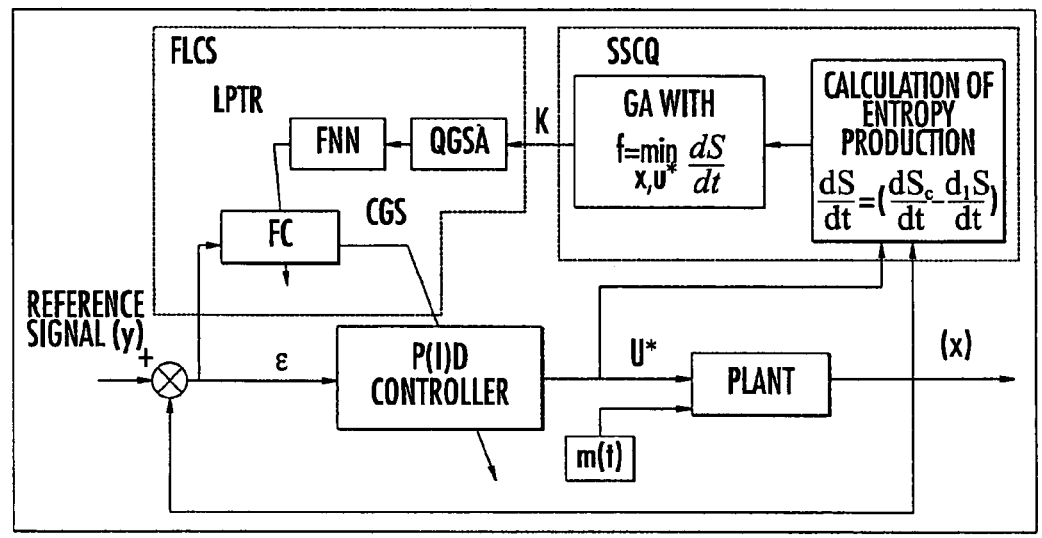
FIG. 2 is a general structure of an Intelligent Smart Control System based on Quantum Soft-Computing according to the invention.

FIG. 2 shows a modified version of the intelligent control system of the invention, wherein a Quantum Genetic Search Algorithm (QGSA) is interposed between the GA and the FNN. The QGSA searches several solution spaces, simultaneously, in order to find a universal optimum, that is, a solution that is optimal considering all solution spaces.

Accelerator for Quantum Algorithms

A hardware accelerator for simulating quantum algorithms on a classical computer is described below.

The accelerator has a modular structure allowing its generalization to complex models. Starting from known modules, we build an architecture whose objective is the minimization of exponential time required for quantum algorithms simulation on a classical computer. The main advantage of this methodology is the possibility of using the logic underlying quantum algorithms in the domain of Genetic Algorithm, opening the way to the new branch of Quantum Genetic Search Algorithm.

The hardware accelerator is composed of the following:
Encoder, Decoder: these blocks are the real interfaces with classical devices connected to the accelerator.
Quantum Block: it includes all non classical operations that have to be performed. It is composed of Quantum Gate and Measurement Gate.
Quantum Gate: it is the core of the Accelerator, and it is composed three modules that mix the information in a quantum way. The three modules are the following:
Superposition Module: it depends on the class of problems to solve.
Entanglement Module: it takes the information from the encoder.
Interference Module: its operations are iterated until a solution is reached.
Measurement Gate: extract quantum information through a series of pseudo-random routines.

Figure 23:
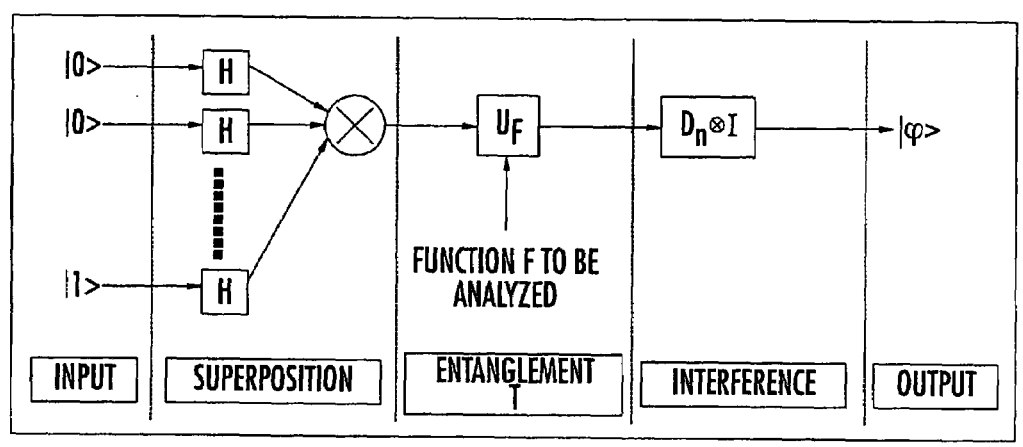
FIG. 23 is a block diagram of a Quantum Gate implementing the Grover's Algorithm according to the invention.
Figure 24:
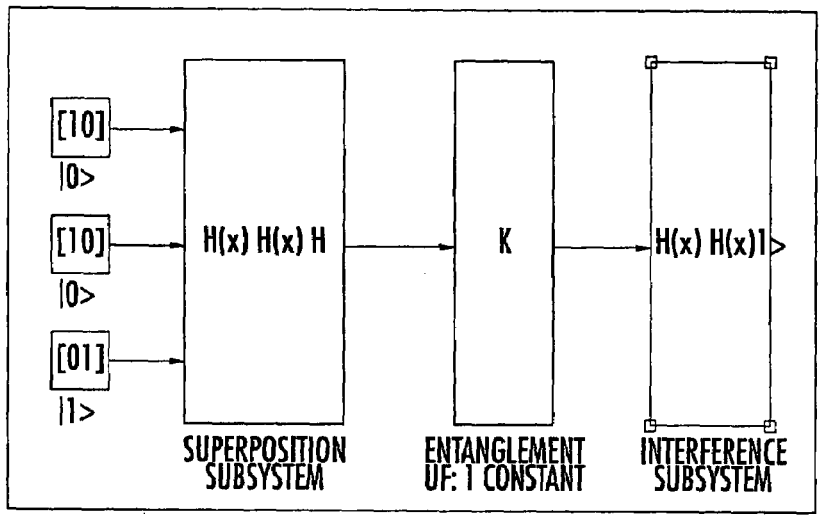
FIG. 24 is an example of a Quantum Gate for a Deutsch-Jozsa Algorithm according to the invention.
Figure 27:
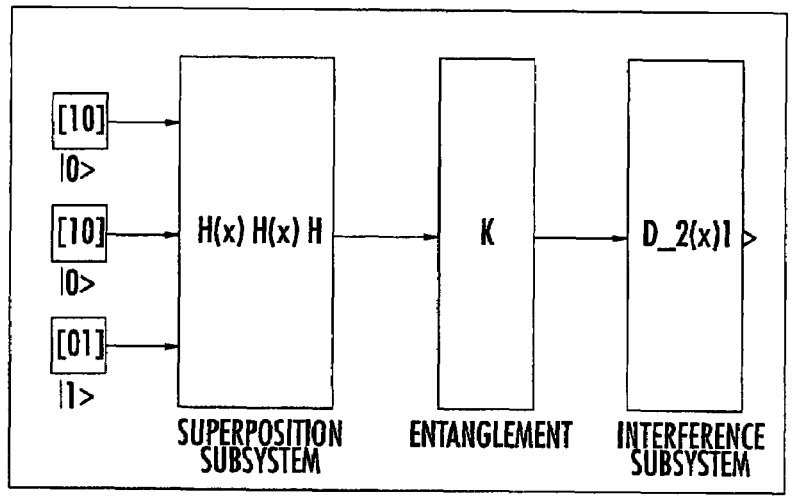
FIG. 27 is an example of a Quantum Gate for the Grover's Algorithm according to the invention.

The final information is sent to the Decoder. The three blocks of Superposition, Entanglement and Interference, suitably dimensioned for a certain number of qubits, constitute a Quantum Gate, in its general form. These three blocks are then "prepared" in order to implement the desired algorithm. Example of Quantum Gates implementing Grover's Algorithm are depicted in FIGS. 23 and 27, and an example of Quantum Gate implementing Deutsch-Jozsa Algorithm is depicted in FIG. 24.

Let us explain more in details how can be designed all the blocks that are enclosed in the scheme.
Superposition: On this step a tensor product among vectors is needed. This operation can be implemented by electric multipliers and mux-demux devices. H-Matrices can be build using ROM cells.
Entanglement: The large matrix $U_F$, which needs to be modified according to F, can be made using an EPROM device.
Interference: It needs the same kind of blocks needed for Superposition. Only the connections are different.

Figure 25:
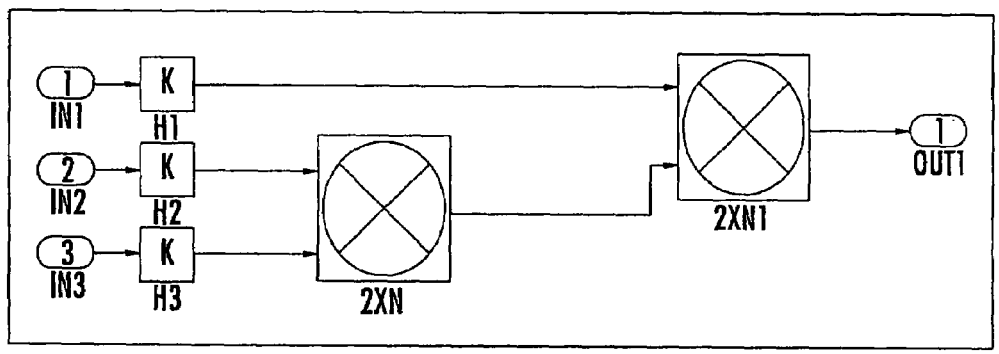
FIG. 25 is an embodiment of a superposition subsystem for the Deutsch-Jozsa Algorithm according to the invention.
Figure 26:
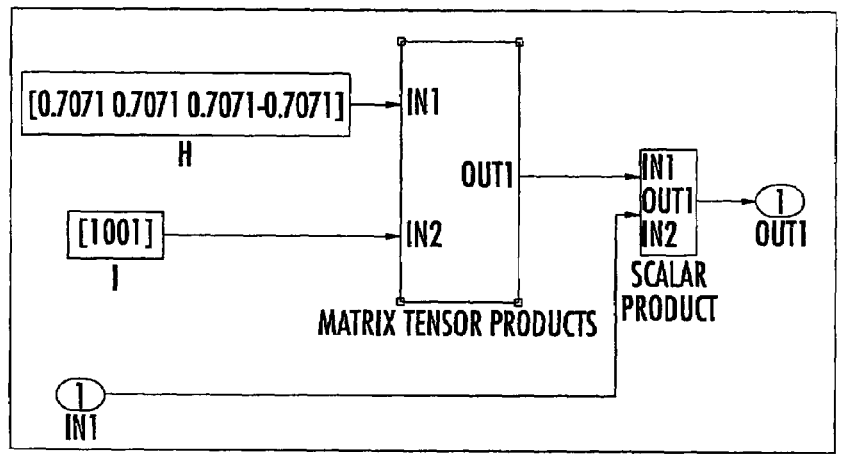
FIG. 26 is an embodiment of an interference subsystem for the Deutsch-Jozsa Algorithm according to the invention.
Figure 28:
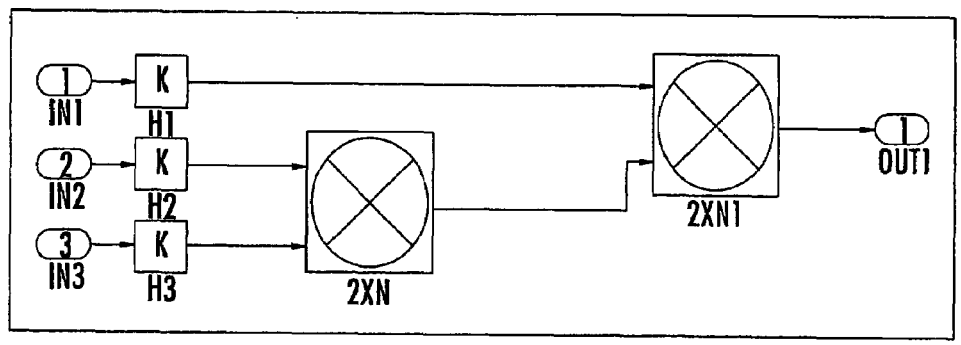
FIG. 28 is an embodiment of a superposition subsystem for the Grover's Algorithm according to the invention.
Figure 29:
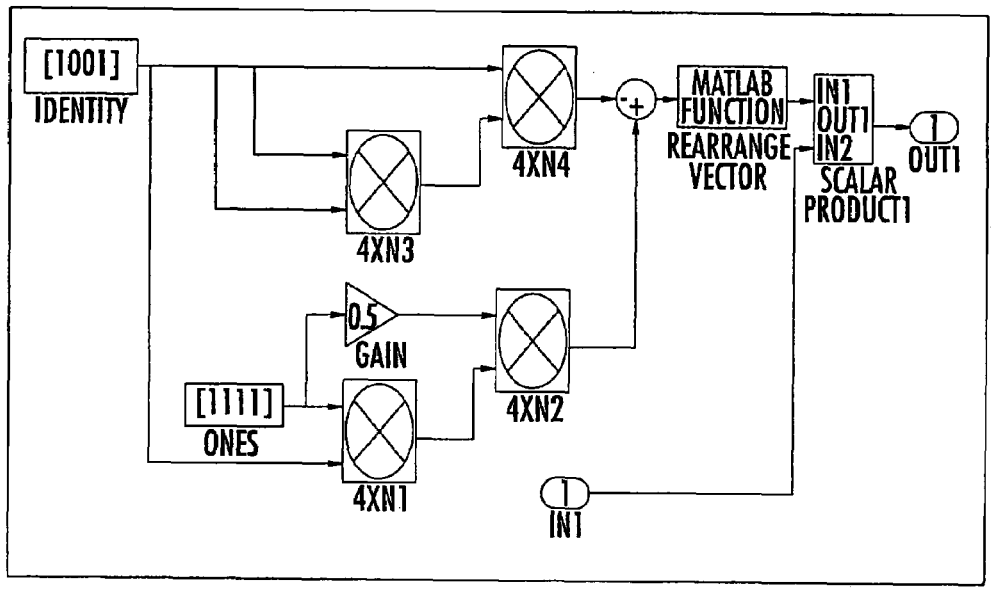
FIG. 29 is an embodiment of an interference subsystem for the Grover's Algorithm according to the invention.

In the following two examples of quantum gates utilization (see FIGS. 24-29) are proposed. FIGS. 24 to 26 are relative to Deutsch-Jozsa's Quantum Algorithms for decision making, and FIGS. 27 to 29 are relative to Grover's Quantum Algorithms for search in unstructured database.

As it can be seen from the above schemes, the core of each subsystem is the Tensor Product Gate that performs the tensor product between a pair of input vectors, outputting a matrix whose components are products of values of all possible different pairs constituted by a component of an input vector and a component of the other vector. A tensor Product Gate can be implemented in hardware form by suitably connecting a plurality of multipliers.

The quantum gates here represented have only two qubits but they can be improved very easily. In fact each Tensor Product Gate that is added to subsystems provides a doubling of qubits in the gate, if this happens jointly with a suitable re-sizing of mux-demux blocks present in scalar products.

It can also be noted that Interference Blocks in the proposed algorithms seems to be different from the architectural point of view. In fact the simplicity of the Deutsch-Jozsa algorithm allows us to adopt a simplified structure when building a gate implementing only this kind of algorithm. However the structure of the Grover Interference is more general and could implement Deutsch-Jozsa, too. This fact gives to the second example of gate having a feature of universality.

For what concerns a Quantum Genetic Search Algorithm Structure, its hardware part can be easily derived, with light modifications, from Grover's entanglement and interference blocks. In fact, the only difference lies in a random generation of all the matrices, but keeping them unitary in all cases.

Figure 30:
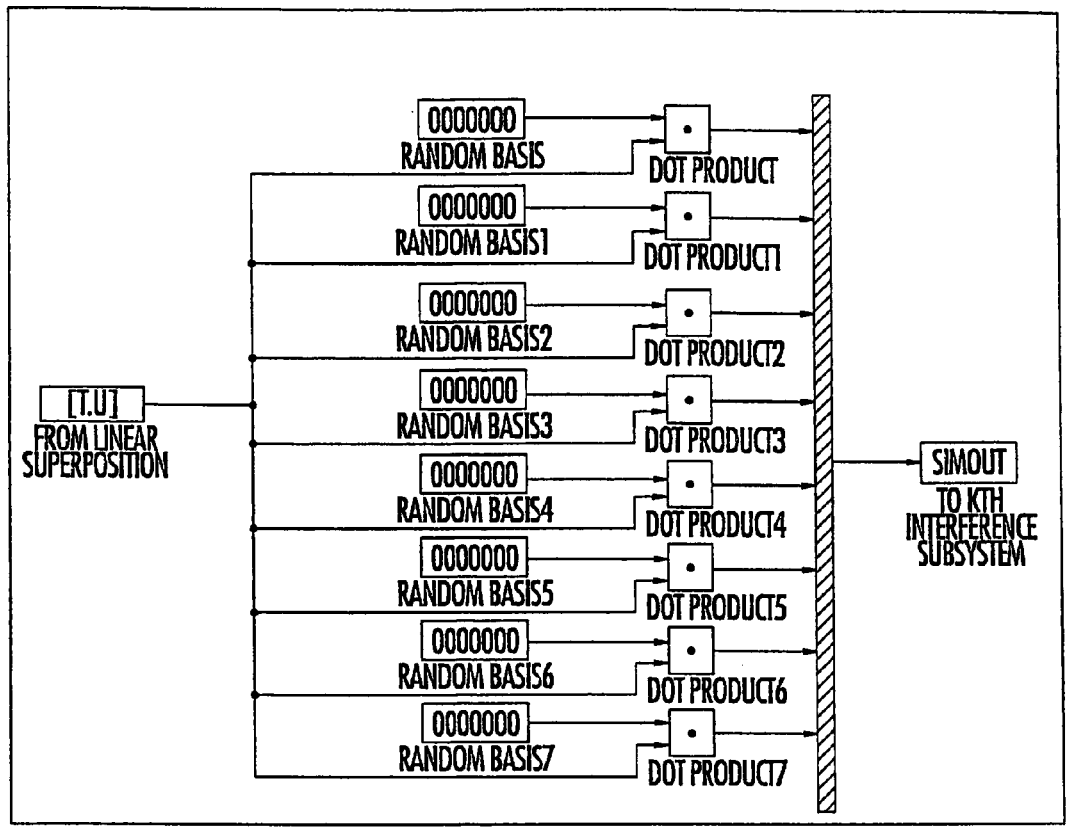
FIG. 30 is an embodiment of a $K^{th}$ entanglement subsystem according to the invention.
Figure 31:
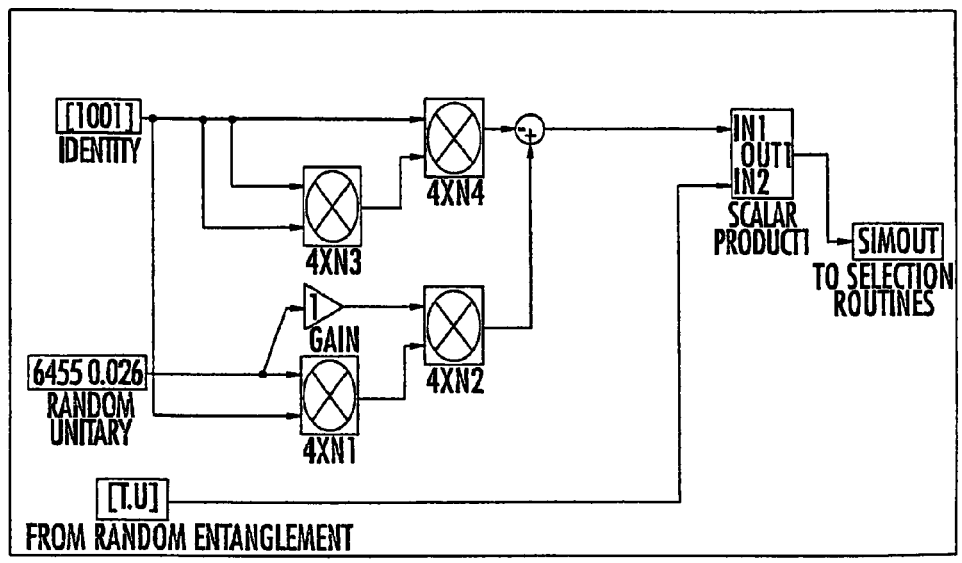
FIG. 31 is an embodiment of a $K^{th}$ interference subsystem according to the invention.

An example of a possible embodiment of a random entanglement operator and of a random interference subsystem are depicted in FIGS. 30 and 31. The core of the entanglement subsystem is the Dot Product Gate that performs the dot product between a pair of input vectors having the same number of components, outputting a value calculated as the sum of products of paired values of the components of the input vectors. A Dot Product Gate can be implemented in a hardware form by a using at least a multiplier, calculating the products of the paired values, and an adder for summing the products.

Algorithm for Searching in a Database

The Quantum Genetic Search Algorithm of the invention may be satisfactorily used even as an algorithm for searching in a database an item $x_i$ belonging to a set X that is closest to a certain value $y_0$.

As previously stated, a search problem can always be restated as a Grover's problem. Given that the Quantum Genetic Search Algorithm of the invention may be regarded as a particularly efficient kind of Quantum Algorithm, it is possible to use a Quantum Genetic Search Algorithm for solving a search problem choosing superposition, entanglement and interference operators according to a Grover's algorithm.

More specifically, an algorithm for searching in a database an item $x_i$ belonging to a set X that is closest to a certain value $y_0$ is defined by:
representing in vector form each item belonging to the set X producing an initial set of vectors;

calculating a second set of vectors by a linear superposition of vectors of the initial set of vectors according to a Grover's Quantum Search Algorithm;

performing on vectors of the second set a certain number of parallel computations of random entanglement operations and random interference operations according to a Grover's Quantum Search Algorithm, producing as many vectors representatives of items of the set X;

associating to each resulting value of the parallel computations a fitness function which must be as greater as smaller the difference between the above mentioned resulting value and the desired value $y_0$ is;

performing a selection operation of resulting values of the parallel computations according to a Genetic Algorithm using the fitness functions; and identifying the searched item $x_i$ as the final result of the selection.

Method for Controlling a Process and Relative Controller

The QGSA can be used in a method for controlling a process (PLANT) driven by a control signal (U*). The control signal (U*) is calculated as a function of a parameter adjustment signal (CGS) and an error signal ($\epsilon$), obtained as the difference between the state of the process (X) and of a reference signal (Y).

The object of the method is to minimize a certain physical quantity, which can be for example the entropy production of the controlled process. To reach this goal, a signal (s) representative of the quantity to be minimized is derived by processing paired values of the state (X) of the process and the control signal (U*).

The method of the invention advantageously uses the Quantum Genetic Search Algorithm to find the best control signal (U*) to input the process to control. Such a control signal is produced by a controller with an adjustable transfer characteristic as a function of a vector of values to assign to the parameters of the controller.

So the problem of controlling a process can be restated in the following manner: find a vector of values that minimizes a certain quantity which is function of the vector, i.e., find a vector that minimizes a certain vector function.

Therefore, it is evident that Genetic Algorithms are of great importance in methods for controlling a process and how a Quantum Genetic Search Algorithm can be effectively used in such applications.

First, a correction signal (K2) is periodically calculated from a set of several different values of the control signal (U*), that minimize the derived signal (s) to be minimized. This correction signal (K2) is calculated by applying to a set of vectors representing as many different control signals (U*) a Quantum Genetic Search Algorithm, using a fitness function that is as greater as lower the quantity to be minimized is.

Finally such a correction signal (K2) is fed to a fuzzy neural network that produces the parameter adjustment signal (CGS) that is provided together with the error signal ($\epsilon$) to a fuzzy processor, which adjusts the transfer characteristic of the controller.

Many different embodiments of this method can be implemented by changing the physical quantity to be minimized, which can be for example the difference between the Shannon and von Neumann Entropy or the Heisenberg uncertainty or, more specifically, for an internal combustion engine, the entropy production of the thermodynamic process.

It is also possible to have a suitably adapted Quantum Genetic Search Algorithm of the invention choosing the interference and entanglement operators according to any of quantum problems: for example, it is possible to choose such operators according to Grover's problem or a Shor's problem.

A preferred embodiment of the method of the invention includes running a Genetic Algorithm with the set of vectors representing as many different control signals (U*), producing a temporarily correction signal (K), which is elaborated by a Quantum Genetic Search Algorithm. This embodiment is preferred because in that way the convergence of the Quantum Genetic Search Algorithm is faster.

A structure of a preferred hardware embodiment of the method of the invention is depicted in FIG. 2. The process (PLANT) driven by a control signal U* is placed in a classical feed-back control loop together with a PID controller. The PID produces the driving signal U* depending on an error signal $\epsilon$ calculated as a function of a state of the process X and of a reference signal Y.

A circuit block derives a signal s representative of a quantity to be minimized, which can be the entropy production, for example, calculated by processing paired values of the state X of the process and the control signal U*.

The signal s can be input into a circuit QGSA implementing a Quantum Genetic Search Algorithm, outputting a correction signal K2, or can be first managed by a circuit GA implementing a Genetic Algorithm, that produces a temporary correction signal K to input the QGSA circuit.

Although the circuit implementing the GA is not essential in the structure depicted in FIG. 2, because a Quantum Genetic Search Algorithm of the invention may be considered as a "generalization" of a Genetic Algorithm, generally the circuit GA implementing a Genetic Algorithm is present in the system's architecture.

Since the GA circuit produces structured data for the Quantum Genetic Search Algorithm, this allows a faster convergence of the algorithm. Generally it can be stated that a Genetic Algorithm produces an optimal solution from a single space of solution. With the GA circuit implementing a Genetic Algorithm we can compress information from a single space of solution with the guarantee of the safety of informative parameters in the signal K. The quantum search on structured data guarantees the search of a successful solution with higher probability and accuracy than on unstructured data.

A fuzzy neural network FNN produces a driving signal depending on values of the correction signal K2 output by the QGSA, and a fuzzy controller FC adjusts the transfer characteristic of the classical PID controller depending on values of the driving signal and of the error signal $\epsilon$.

Training System for an Intelligent Control System with Reduced Number of Sensors The Quantum Genetic Search Algorithm can be used to realize an intelligent control system able to drive a process with a reduced number of sensors as compared to an optimal intelligent control system of the prior art.

Before using a Fuzzy Neural Network (FNN), a "training" phase is necessary in which the FNN learns how to drive the process to be controlled. This "training" is run at the factory or repair center using many different sensors of physical quantities that characterize the running of the process. Generally, in this phase, several sensors that cannot be supported in the normal operation of the process are used. For this reason, it is also necessary to teach the FNN how to drive the process with a reduced number of sensors, i.e. only with these sensors that will be present in the normal operation of the process.

Figure 32:
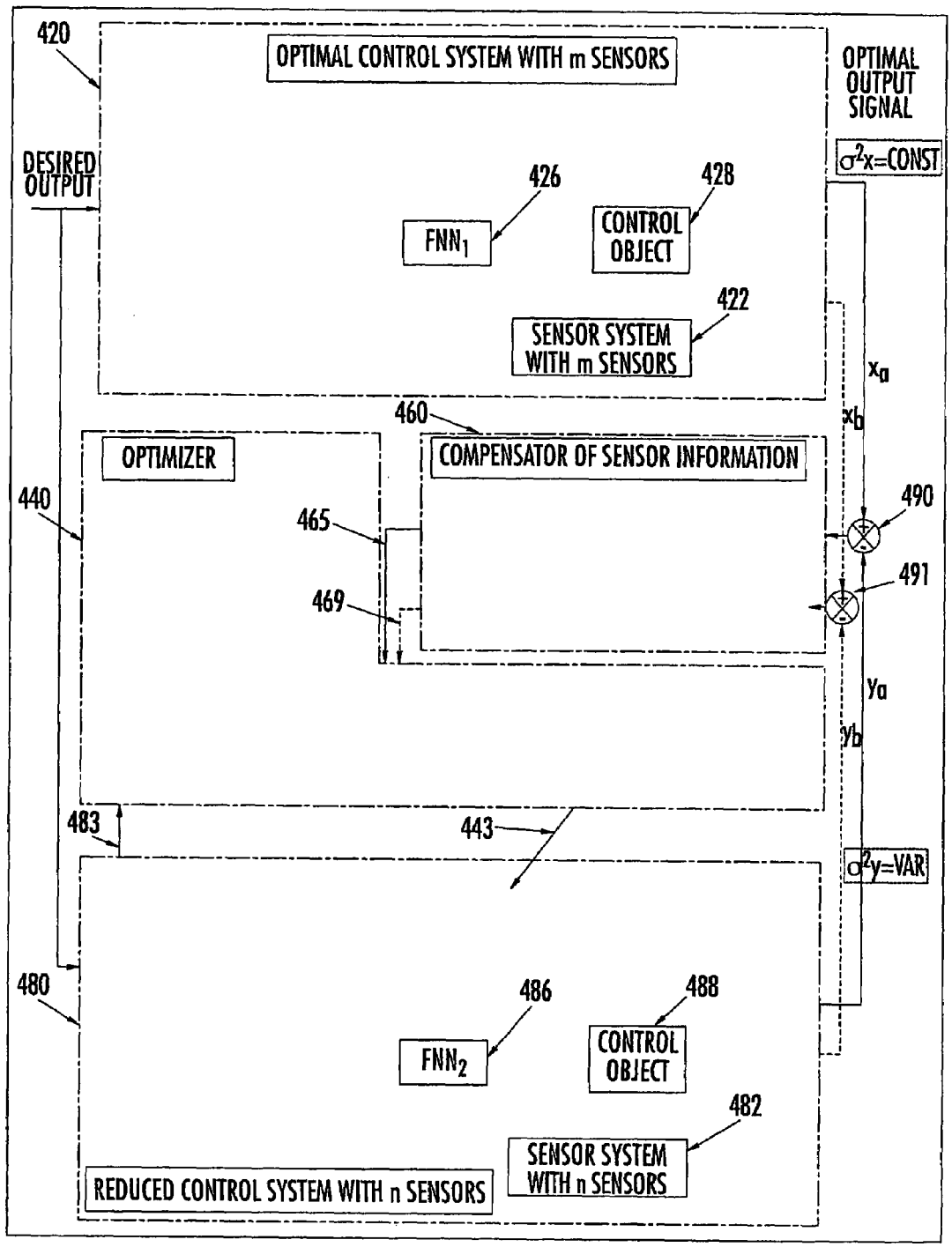
FIG. 32 is a basic structure of an intelligent control system simulator with a reduced number of sensors according to the invention.
Figure 33:
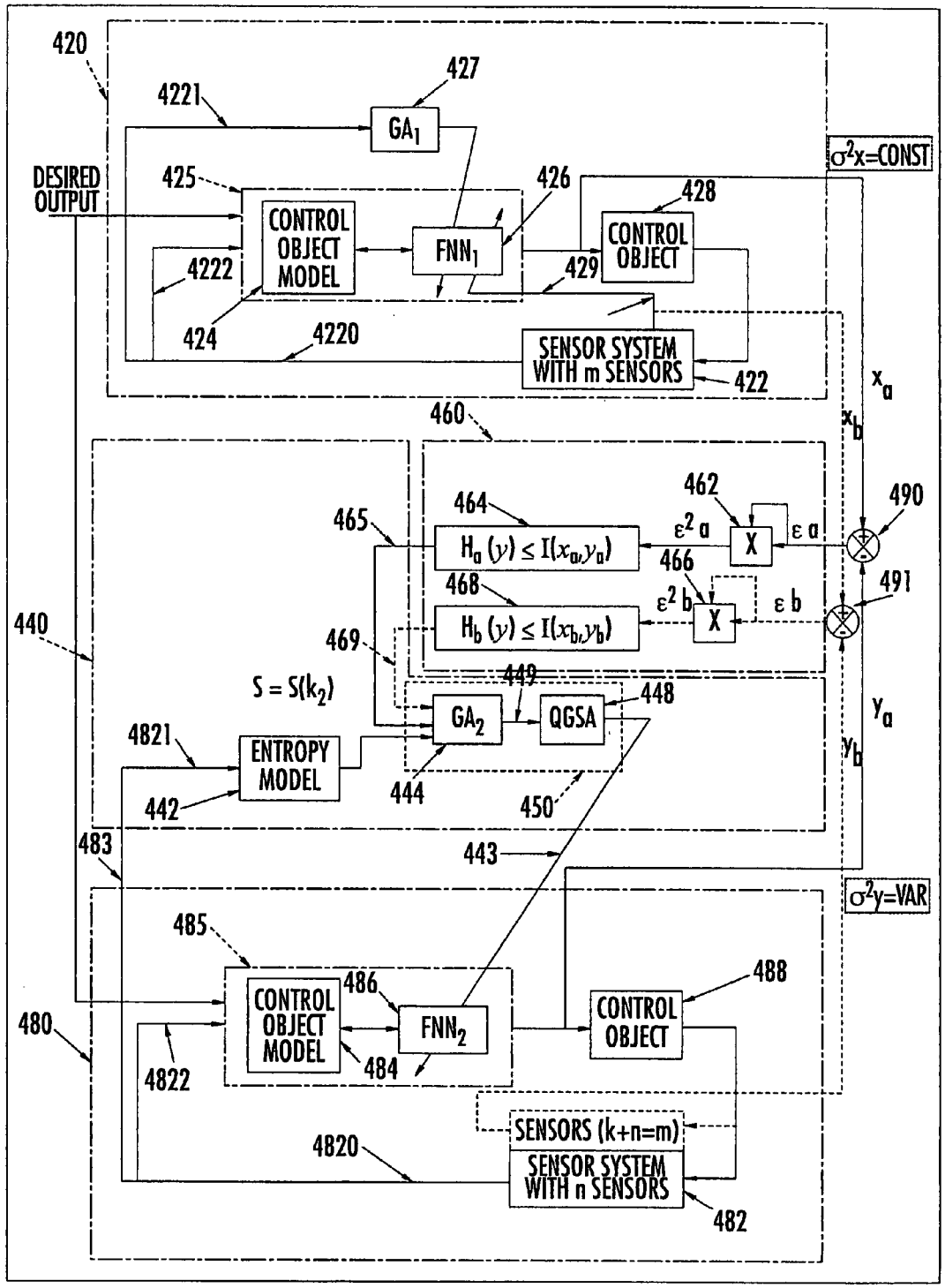
FIG. 33 is a more detailed structure of the intelligent control system simulator with a reduced number of sensors illustrated in FIG. 32.

This goal can be reached by the architecture depicted in FIG. 32 and in FIG. 33 in a greater detail. FIG. 33a is a legend of functional blocks and signals present in the mentioned figures.

The general structure of a reduced control system is shown in FIGS. 32 and 33. FIG. 32 is a block diagram showing a reduced control system 480 and an optimal control system 420. The optimal control system 420, together with an optimizer 440 and a compensator of sensor information 460 are used to teach the reduced control system 480. In FIG. 32, a desired signal (representing the desired output) is provided to an input of the optimal control system 420 and to an input of the reduced control system 480. The optimal control system 420 having m sensors, provides an output sensor signal $x_b$ and an optimal control signal $x_a$. A reduced control system 480 provides an output sensor signal $y_b$ and a reduced control signal $y_a$. The signals $x_b$ and $y_b$ includes data from k sensors where k≦m−n. The k sensors typically are the sensors that are not common between sensor systems 422 and 482. The signals $x_b$ and $y_b$ are provided to first and second inputs of subtractor 491. An output of the subtractor 491 is a signal $\epsilon_b$, where $\epsilon_b = x_b − y_b$.

The signal $\epsilon_b$ is provided to a sensor input of a sensor compensator 460. The signals $x_a$ and $y_a$ are provided to first and second inputs of the subtractor 490. An output of the subtractor 490 is a signal $\epsilon_a$ where $\epsilon_a = x_a − y_a$. The signal $\epsilon_a$ is provided to a control signal input of the sensor compensator 460. A control information output of sensor compensator 460 is provided to a control information input of the optimizer 440. A sensor information output of the sensor compensator 460 is provided to a sensor information input of the optimizer 440. A sensor signal 483 from the reduced control system 480 is also provided to an input of the optimizer 440. An output of the optimizer 440 provides a teaching signal 443 to an input of the reduced control system 480.

In the description that follows, off-line mode typically refers to a calibration mode, wherein the control object 428 (and the control object 488) is run with an optimal set of m sensors. In one embodiment, the off-line mode is run at the factory or repair center where the additional sensors (i.e., the sensors that are in the m set but not in the n set) are used to train the FNN1 426 and the FNN2 486. The on-line mode typically refers to an operational mode (e.g., normal mode) where the system is run with only the n set of sensors.

FIG. 33 is a block diagram showing the details of the blocks in FIG. 32. In FIG. 33, the output signal $x_b$ is provided by an output of sensor set m 422 having m sensors given by m=k+n. The information from the sensor system m 422 is a signal (or group of signals) having optimal information content $I_1$. In other words, the information $I_1$ is the information from the complete set of m sensors in the sensor system 422. The output signal $x_a$ is provided by an output of a control unit 425. The control signal $x_a$ is provided to an input of a control object 428. An output of the control object 428 is provided to an input of the sensor system 422.

Information $I_k$ from the set k of sensors is provided to an on-line learning input of a fuzzy neural network (FNN1) 426 and to an input of a first genetic algorithm (GA1) 427. Information $I_n$ from the set of sensors n in the sensor system 422 is provided to an input of a control object model 424. An off-line tuning signal output from the algorithm GA1 427 is provided to an off-line tuning signal input of the FNN1 426. A control output from the FNN 426 is the control signal $x_a$, which is provided to a control input of the control object 428. The control object model 424 and the FNN 426 together comprise an optimal fuzzy control unit 425.

Also in FIG. 33, the sensor compensator 460 includes a multiplier 462, a multiplier 466, an information calculator 464, and an information calculator 468. The multiplier 462 and the information calculator 464 are used in an on-line (normal) mode. The multiplier 466 and the information calculator 468 are provided for off-line checking.

The signal $\epsilon_a$ from the output of the adder 490 is provided to a first input of the multiplier 462 and to a second input of the multiplier 462. An output of the multiplier 462, which is a signal $\epsilon_a^2$, is provided to an input of the information calculator 464. The information calculator 464 computes $H_a(y) \leq I(x_a, y_a)$. An output of the information calculator 464 is an information criteria for accuracy and reliability $I(x_a, y_a) \rightarrow$ max of the control signal in the reduced control system.

The signal $\epsilon_b$ from the output of the adder 491 is provided to a first input of the multiplier 466 and to a second input of the multiplier 466. An output of the multiplier 466, which is a signal $\epsilon_b^2$, is provided to an input of the information calculator 468. The information calculator 468 computes $H_b(y) \leq I(x_b, y_b)$. An output of information calculator 468 is an information criteria for accuracy and reliability, $I(x_b, y_b) \rightarrow$ max of the output signal of the control object with a reduced number of sensors.

The optimizer 440 includes a second genetic algorithm (GA2) 444 and an entropy model 442. The signal $I(x_a, y_a) \rightarrow$ max from the information calculator 464 is provided to a first input of the algorithm (GA2) 444 in the optimizer 440. An entropy signal S→min is provided from an output of the thermodynamic model 442 to a second input of the genetic algorithm GA2 444. The signal $I(x_b, y_b) \rightarrow$ max from the information calculator 468 is provided to a third input of the algorithm (GA2) 444 in the optimizer 440.

The signals $I(x_a, y_a) \rightarrow$ max and $I(x_b, y_b) \rightarrow$ max provided to the first and third inputs of the algorithm (GA2) 444 are information criteria, and the entropy signal $S(k_2) \rightarrow$ min provided to the second input of the algorithm (GA2) 444 is a physical criteria based on entropy. An output of the algorithm GA2 444 is a teaching signal for a FNN2 486 described below.

The reduced control system 480 includes a reduced sensor set 482, a control object model 484, the FNN2 486, and the control object 488. When run in a special off-line checking (verification) mode, the sensor system 482 also includes the set of sensors k. The control object model 484 and the FNN2 486 together comprise a reduced fuzzy control unit 485. An output of the control object 488 is provided to an input of the sensor set 482. An $I_2$ output of the sensor set 482 contains information from the set n of sensors, where n=$(k_1+k_2)$<m, such that $I_2<I_1$. The Information $I_2$ is provided to a tuning input of the FNN2 486, to an input of the control object model 484 and to an input of the entropy model 442. The teaching signal 443 from the algorithm GA2 444 is provided to a teaching signal input of the FNN2 486. A control output from the FNN2 486 is the signal $y_a$, which is provided to a control input of the control object 488.

The control object models 424 and 484 may be either full or partial models. A full mathematical model representation of control objects is a description with differential equations including dissipative processes, while a partial model is a model obtained without a complete analytical description.

As an example, for a suspension control system, it is possible to write non-linear equations for the system "car+suspension" and calculate in analytical form the entropy production rate using dissipative terms of nonlinear equations, while for an engine control system the analytical description of mathematical model is not available.

Although FIGS. 32 and 33 show the optimal system 420 and the reduced system 480 as separate systems, typically the system 420 and 480 are the same system. The system 480 is "created" from the system 420 be removing the extra sensors and training the neural network. Thus, typically, the control object models 424 and 484 are the same. The control object 428 and 488 are also typically the same.

FIG. 33 shows an off-line tuning arrow mark from GA1 427 to the FNN1 426 and from the GA2 444 to the FNN2 486. FIG. 33 also shows an on-line learning arrow mark 429 from the sensor system 422 to the FNN1 426. The tuning of the GA2 444 changes a set of bonding coefficients in the FNN2 486. The bonding coefficients are changed (using, for example, an iterative backward propagation or trial error process) so that $I(x,y)$ trends toward a maximum and S trends toward a minimum. In other words, the information of the coded set of the coefficients is sent to the FNN2 486 from GA2 444 as $I(x,y)$ and S are evaluated. Typically, the bonding coefficients in the FNN2 486 are tuned to off-line mode at a factory or service center.

The teaching signal 429 is a signal that operates on the FNN1 426 during operation of the optimal control system 420 with an optimal control set. Typically, the teaching signal 429 is provided by sensors that are not used with the reduced control system 480 when the reduced control system is operating in an on-line mode. The GA1 427 tunes the FNN1 426 during the off-line mode. The signal lines associated with $x_b$ and $y_b$ are dashed to indicate that the $x_b$ and $y_b$ signals are typically used only during a special off-line checking (i.e., verification) mode. During the verification mode, the reduced control system is run with an optimal set of sensors. The additional sensor information is provided to the optimizer 440 and the optimizer 440 verifies that the reduced control system 480 operates with the desired, almost optimal, accuracy.

For stable and unstable control objects with a non-linear dissipative mathematical model description and reduced number of sensors (or a different set of sensors) the control system design is connected with calculation of an output accuracy of the control object and reliability of the control system according to the information criteria $I(x_a,y_a) \to $max and $I(x_b,y_b) \to$max. Control system design is also connected with the checking for stability and robustness of the control system, and the control object according to the physical criteria $S(k_2) \to$min.

In a first step, the genetic algorithm GA2 444 with a fitness function described as the maximum of mutual information between an optimal control signal $x_a$ and a reduced control signal $y_a$ is used to develop a teaching signal 443 for the fuzzy neural network FNN2 486 in an off-line simulation. The fuzzy neural network FNN2 486 is realized using a learning process with back-propagation of error for adaptation to the teaching signal, and to develop a look-up table for changing the parameters of the PID-controller in the controller 485. This provides sufficient conditions for achieving the desired control reliability with sufficient accuracy.

In a second step, the genetic algorithm GA2 444, with a fitness function described as the minimum entropy, S or production rate dS/dt, (calculated according to a mathematical model or experimental results of sensor measurement information of the control object 488), is used to realize a node-correction look-up table in the FNN2 486. This approach provides stability and robustness of the reduced control system 480 with reliable and sufficient accuracy of control. This provides a sufficient condition of design for the robust intelligent control system with the reduced number of sensors.

The first and second steps above need not be done in the listed order or sequentially. In the simulation of unstable objects, both steps are preferably done in parallel using the fitness function as the sum of the physical and the information criteria.

After the simulation of a look-up table for the FNN2 486, the mathematical model of control object 484 is changed on the sensor system 482 for checking the qualitative characteristics between the reduced control system with the reduced number of sensors, and the reduced control system with a full complement (optimum number) of sensors. Parallel optimization in the GA2 444 with two fitness functions is used to realize the global correction of a look-up table in the FNN2 486. The entropy model 442 extracts data from the sensor system information $I_2$ to help determine the desired number of sensors for measurement and control of the control object 488.

FIGS. 32 and 33 show the general case when the reduction of sensors excludes the measurement sensors in the output of the control object, and the calculation comparison of control signal of information criteria is possible. The sensor compensator 460 computes the information criteria as a maximum of mutual information between the two control signals $x_a$ and $y_a$ (used as the first fitness function for the GA2 444). The entropy model 442 presents the physical criteria as a minimum production entropy (used as the second fitness function in the GA2 444) using the information from the sensors 482. The output of the GA2 444 is the teaching signal 443 for the FNN2 486 that is used on-line to develop the reduced control signal $y_a$ such that the quality of the reduced control signal $y_b$ is similar to the quality of the optimal control signal $x_a$. Thus, the optimizer 440 provides stability and robustness of control (using the physical criteria), and reliability with sufficient accuracy (using the information criteria).

With off-line checking, the optimizer 440 provides correction of the control signal $y_a$ from the FNN2 486 using new information criteria. Since the information measure is additive, it is possible to do the on-line/off-line steps in sequence or in parallel. In off-line checking, the sensor system 482 typically uses all of the sensors only for checking of the quality and correction of the control signal $y_a$. This approach provides the desired reliability and quality of control, even when the control object 488 is unstable.

For the reduced sensor system 482 (with n sensors) the FNN2 486 preferably uses a learning and adaptation process instead of a Fuzzy Controller (FC) algorithm. If the Control Object will work in different environments, with different statistical characteristics, then, the global optimizer 450 is used. The global optimizator 450 includes GA2 444 and QGSA 448. The output 449 of GA2 is input to QGSA 448. The output of QGSA 448 is a teaching signal for FNN2 486. The output 449 must be generated for each single solution space.

Reduced Control System Applied to an Internal Combustion Engine

In one embodiment, the reduced control system may be applied to an internal combustion piston engine, a jet engine, a gas-turbine engine, a rocket engine, etc., to provide control without the use of extra sensors, such as, for example, an oxygen sensor.

Figure 34:
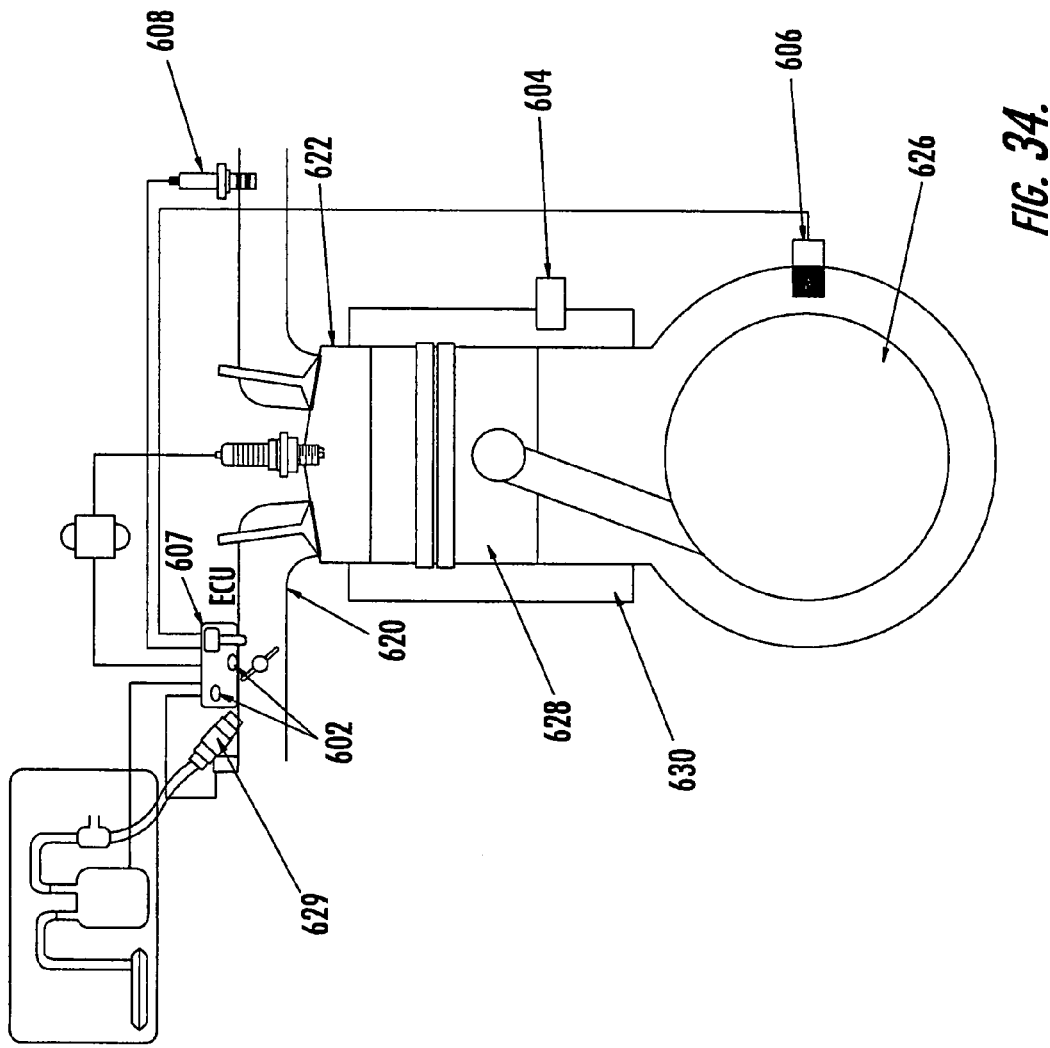
FIG. 34 depicts an internal combustion piston engine according to the invention.

FIG. 34 shows an internal combustion piston engine having four sensors including an intake air temperature sensor 602, a water temperature sensor 604, a crank angle sensor 608. The air temperature sensor 602 measures the air temperature in an intake manifold 620. A fuel injector 629 provides fuel to the air in the intake manifold 620. The intake manifold 620 provides air and fuel to a combustion chamber 622. Burning of the fuel-air mixture in the combustion chamber 622 drives a piston 628. The piston 628 is connected to a crank 626 such that movement of the piston 628 turns the crank 626. The crank angle sensor 606 measures the rotational position of the crank 626. The water sensor measures the temperature of the water in a water jacket 630 surrounding the combustion chamber 622 and the piston 628. Exhaust gases from the combustion chamber 622 are provided to an exhaust manifold 624, and the air-fuel ratio sensor 608 measures the ratio of air to fuel in the exhaust gases.

Figure 35:
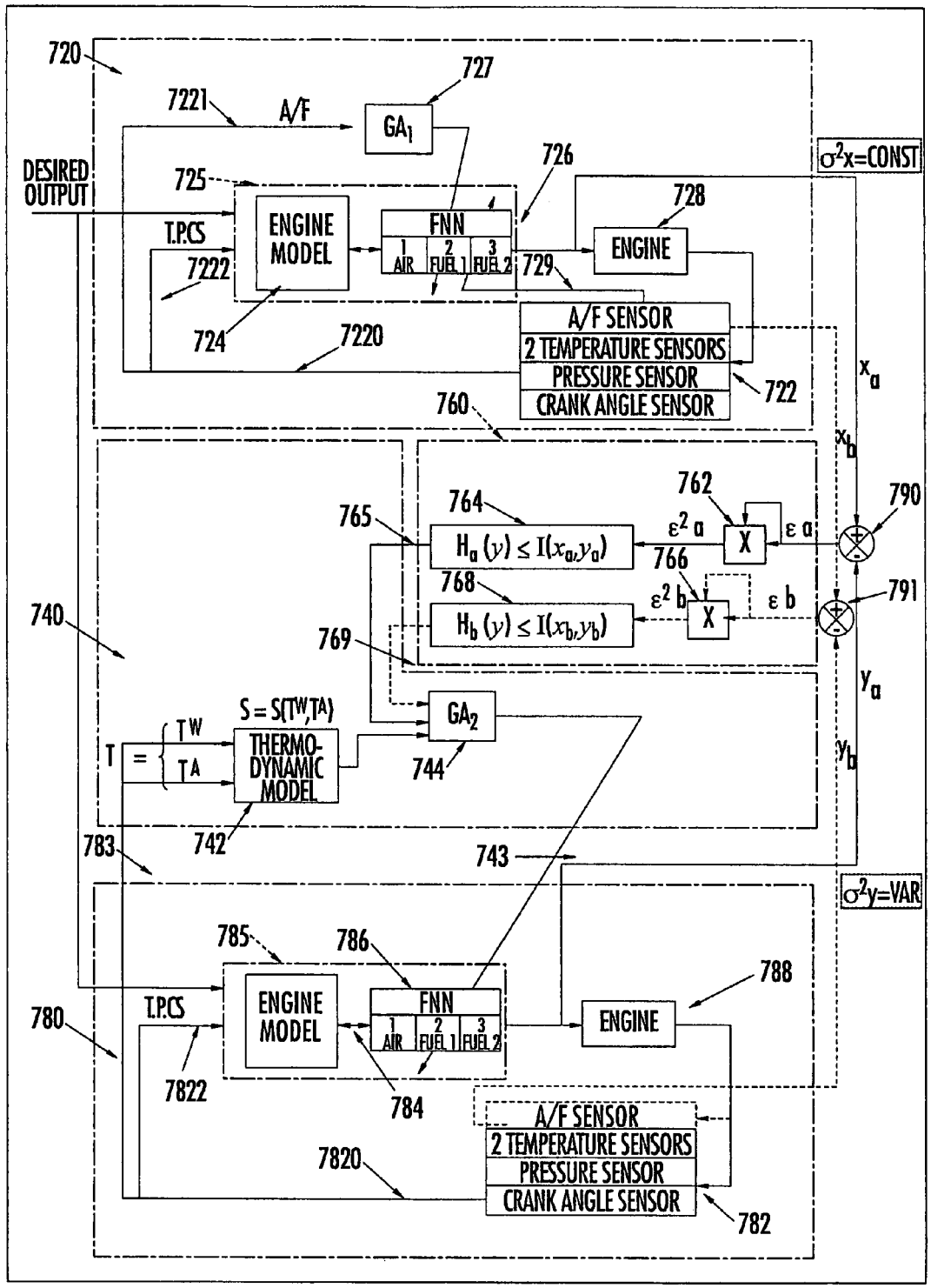
FIG. 35 is a block diagram of a reduced control system for an internal combustion engine not implementing a Quantum Genetic Search Algorithm according to the invention.

FIG. 35 is a block diagram showing a reduced control system 780 and an optimal control system 720. The optimal control system 720, together with an optimizer 740 and a sensor compensator 760 are used to teach the reduced control system 780. In FIG. 35, a desired signal (representing the desired engine output) is provided to an input of the optimal control system 720 and to an input of the reduced control system 780. The optimal control system 720, having five sensors, provides an optimal control signal $x_a$ and an sensor output signal $x_b$. A reduced control system 780 provides a reduced control output signal $y_a$, and an output sensor signal $y_b$. The signals $x_b$ and $y_b$ include data from the A/F sensor 608. The signals $x_b$ and $y_b$ are provided to first and second inputs of a subtractor 791. An output of a subtractor 791 is a signal $\epsilon_b$ where $\epsilon_b = x_b - y_b$. The signal $\epsilon_b$ is provided to a sensor input of a sensor compensator 760. The signals $x_a$ and $y_a$ are provided to first and second inputs of a subtractor 790. An output of the subtractor 790 is a signal $\epsilon_a$ where $\epsilon_a = x_a - y_a$. The signal $\epsilon_a$ is provided to a control signal input of the sensor compensator 760. A control information output of the sensor compensator 760 is provided to a control information input of the optimizer 740. A sensor information output of the sensor compensator 760 is provided to a sensor information input of the optimizer 740. A sensor signal 783 from the reduced control system 780 is also provided to an input of the optimizer 740. An output of the optimizer 740 provides a teaching signal 747 to an input of the reduced control system 780.

The output signal $x_b$ is provided by an output of a sensor system 722 having five sensors, including the intake temperature sensor 602, the water temperature sensor 604, the crank angle sensor 607, and air-fuel ration (A/F) sensor 608. The information from the sensor system 722 is a group of signals having optimal information content $I_1$. In other words, the information $I_1$, is the information from the complete set of five sensors in the sensor system 722.

The output signal $x_a$ is provided by an output of a control unit 725. The control signal $x_a$ is provided to an input of an engine 728. An output of engine 728 is provided to an input of the sensor system 722. Information $I_{k1}$ from the A/F sensor 608 is provided to an on-line learning input of a fuzzy neural network (FNN) 726 and to an input of a first Genetic Algorithm (GA1) 727. Information $I_{k1}$ from the set of four sensors excluding the A/F sensor 608 is provided to an input of an engine model 724. An off-line tuning signal output from the algorithm GA1 727 is provided to an off-line tuning signal input of the FNN 726. A control output from the FNN 726 is a fuel injector the control signal $U_1$, which is provided to a control input of the engine 728. The signal $U_1$ is also the signal $x_a$. The engine model 724 and the FNN 726 together comprise an optimal control unit 725.

The sensor compensator 760 includes a multiplier 762, a multiplier 766, and an information calculator 764. The multiplier 762 and the information calculator 764 are used in an on-line (normal) mode. The multiplier 766 and the information calculator 768 are provided for off-line checking.

The signal $\epsilon_a$ from the output of the adder 790 is provided to a first input of the multiplier 762 and to a second input of the multiplier 762. An output of the multiplier 762, which is a signal $\epsilon_a^2$, is provided to an input of the information calculator 764. The information calculator 764 computes $H_a(y) \leq I(x_a, y_a)$. An output of the information calculator 764 is an information criteria for accuracy and reliability, $I(x_a, y_a) \rightarrow \max$.

The signal $\epsilon_b$ from the output of the adder 791 is provided to a first input of the multiplier 766 and to a second input of the multiplier 766. An output of the multiplier 764, which is a signal $\epsilon_a^2$, is provided to an input of the information calculator 768. The information calculator 768 computes $H_b(y) \leq I(x_b, y_b)$. An output of the information calculator 768 is an information criteria for accuracy and reliability, $I(x_b, y_b) \rightarrow \max$.

The optimizer 740 includes a second Genetic Algorithm (GA2) 744 and a thermodynamic (entropy) model 742. The signal $I(x_a, y_a) \rightarrow \max$ from the information calculator 764 is provided to a first input of the algorithm (GA2) 744 in the optimizer 740. An entropy signal $S \rightarrow \min$ is provided from an output of the thermodynamic model 742 to a second input of the algorithm (GA2) 744. The signal $I(x_b, y_b) \rightarrow \max$ from the information calculator 768 is provided to a third input of the algorithm (GA2) 744 in the optimizer 740.

The signals $I(x_a, y_a) \rightarrow \max$ and $I(x_b, y_b) \rightarrow \max$ provided to the first and third inputs of the algorithm (GA2) 744 are information criteria, and the entropy signal $S(k2) \rightarrow \min$ provided to the second input of the algorithm GA2 744 is a physical criteria based on entropy. An output of the algorithm GA2 744 is a teaching signal for the FNN 786.

The reduced control system 780 includes a reduced sensor system 782, an engine model 784, the FNN 786, and an engine 788. The reduced sensor system 782 includes all of the engine sensors in the sensor system 722 except the A/F sensor 608. When run in a special off-line checking mode, the sensor system 782 also includes A/F sensor 608. The engine model 784 and the FNN 786 together comprise a reduced control unit 785. An output of the engine 788 is provided to an input of the sensor set 782. An $I_2$ output of the sensor set 782 contains information from four engine sensors, such that $I_2 < I_1$. The information $I_2$ is provided to an input of the control object model 784, and to an input of the thermodynamic model 742. The teaching signal 747 from the algorithm GA2 744 is provided to a teaching signal input of the FNN 786. A control output from the FNN 786 is an injector control signal $U_2$, which is also the signal $y_a$.

Operation of the system shown in FIG. 35 is in many respects similar to the operation of the system shown in FIGS. 32 and 33.

The thermodynamic model 742 is built using the thermodynamic relationship between entropy production and temperature information from the water temperature sensor 604

($T^W$) and the air temperature sensor 602 ($T^A$). The entropy production $S(T^W,T^A)$ is calculated using the relationship:

$$S = c\frac{\left[\ln\left(\frac{T^W}{T^A}\right)\right]^2}{\Delta\tau - \ln\left(\frac{T^W}{T^A}\right)} \quad (16)$$

where $\Delta\tau$ is the duration of a finite process.

The external specific work between two arbitrary states follows in the form:

$$l(T^i, T^f, \tau^i, \tau^f) = c(T^i - T^f) - cT^e\ln\frac{T^i}{T^f} - cT^e\frac{\left[\ln\frac{T^i}{T^f}\right]^2}{\tau^f - \tau^i - \ln\frac{T^i}{T^f}} \quad (17)$$

From equation (17), with $T^i=T^W$ and $T^f=T^A$, then the minimal integral of the entropy production is:

$$S_\sigma = c\frac{\left[\ln\frac{T^W}{T^A}\right]^2}{\Delta\tau - \ln\left(\frac{T^W}{T^A}\right)}, \quad \text{where } \Delta\tau = \tau^f - \tau^i \quad (18)$$

The function from equation (17) satisfies the backward Hamilton-Jacobi equation.

Figure 36:
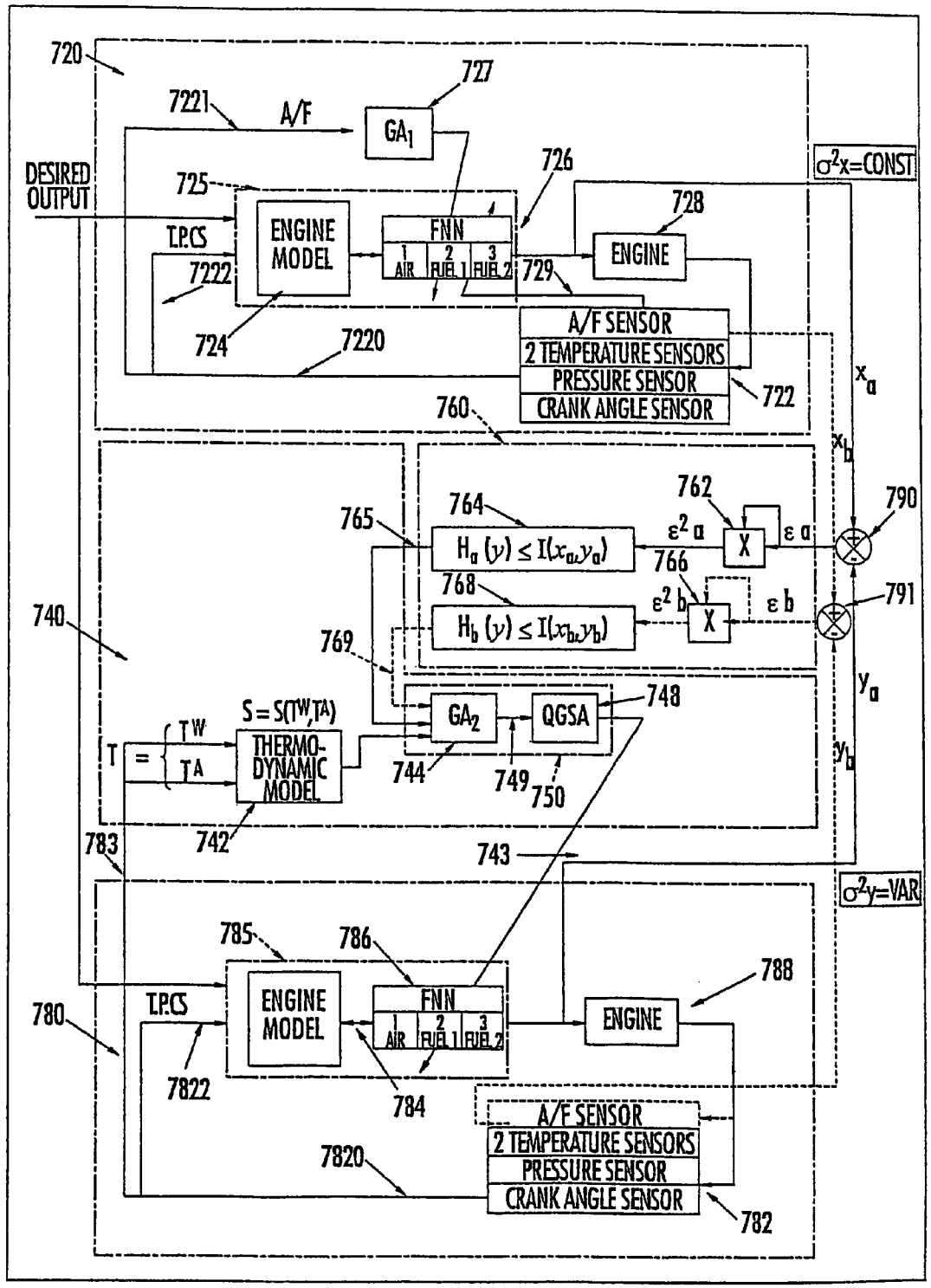
FIG. 36 is a block diagram of a reduced control system for an internal combustion engine implementing a Quantum Genetic Search Algorithm according to the invention.

FIG. 36 illustrates the case when a partial engine model is presented as a stochastic A/F ratio (Bounded control). This means that statistical properties of the stochastic A/F ratio are modeled with different density probability functions (Gaussian, Non-Gaussian as Uniform distribution, Rayleigh distribution and etc.).

Reduced Control System Applied to a Vehicle Suspension

Another embodiment includes a control system for a vehicle suspension to provide control of the suspension system using data from a reduced number of sensors. In this case the optimized control system provides an optimum control signal based on data obtained from a plurality of angle (pitch and roll) and position sensors.

An embodiment of an intelligent control system of a vehicle suspension can be obtained using a similar hardware architecture to the one depicted in FIG. 36 for an internal combustion engine. The main difference includes substituting several functional blocks with the appropriate functional blocks for a vehicle suspension. For example, blocks 728 and 788 must be the vehicle suspension system, blocks 724 and 784 must be a vehicle suspension model, sensors 722 and 782 must be the appropriate sensors for monitoring a vehicle suspension, such as position sensors and roll angle sensors.

What is claimed is:

1. A method for controlling a process driven by a control signal for producing a corresponding output, the method comprising:

generating an error signal as a function of a state of the process and of a reference signal;

generating a control signal as a function of the error signal and of a parameter adjustment signal and providing the control signal to the process;

generating a signal representative of a quantity to be minimized by processing paired values of the state of the process and the control signal; and generating a correction signal from a set of several different values of the control signal that minimizes the generated signal to be minimized, the correction signal being periodically calculated by a Quantum Genetic Search Algorithm comprising a genetic algorithm and a quantum search algorithm merged together.

2. A method according to claim 1 wherein generating the generating a correction signal further comprises:

generating an initial set of vectors representing in vector form several different possible values of the correction signal;

generating a second set of vectors by a linear superposition of the initial set of vectors;

performing on the second set of vectors a certain number of parallel computations of random entanglement operations and random interference operations according to the quantum search algorithm, and generating as many vector representatives of values of the control signal as of the process;

associating to each resulting value of the parallel computations a fitness function calculated using paired values of the control signal and the state of the process corresponding to the considered resulting value; and performing a selection operation of resulting values of the parallel computations according to the genetic algorithm using the fitness functions, with the correction signal being generated as a final result of the selection.

3. A method according to claim 1 wherein the parameter adjustment signal is generated using a neural network and a fuzzy logic processor based upon the error signal and the correction signal.

4. A method according to claim 3 wherein generating the initial set of vectors comprises:

generating a first set of vectors representing several different possible values of the correction signal; and applying the genetic algorithm on the first set of vectors for calculating a temporary correction signal using a fitness function calculated using paired values of the control signal and the state of the process corresponding to the considered resulting value;

the initial set being generated as a collection of the different values of the temporary correction signal.

5. A method according to claim 2 wherein the calculated signal to be minimized represents an information distance between Shannon entropy and von Neumann entropy of pairs of the control signal and the state of the process; with the fitness function being an information intelligence measure of each resulting value of the parallel computations.

6. A method according to claim 1 wherein the derived signal to be minimized is the Heisenberg uncertainty.

7. A method according to claim 1 wherein the quantum search algorithm comprises a Grover quantum search algorithm.

8. A method according to claim 2 wherein the linear superposition comprises a Hadamard rotation.

9. A method according to claim 2 wherein the interference operation is obtained by an interference operator comprising a random unitary squared matrix implementing a Fast Quantum Fourier Transform.

10. A controller for a process driven by a control signal, the controller comprising:

a first circuit block for producing an error signal as a function of a state of the process and of a reference signal;

a second circuit block having an adjustable transfer characteristics for generating the control signal as a function of the error signal, with the control signal being feed to the process;

a third circuit block for deriving a signal representative of a quantity to be minimized by processing paired values of the state of the process and the control signal;

a fourth circuit block for calculating a correction signal from a set of several different values of the control signal that minimizes the derived signal representing the quantity to be minimized, said fourth circuit block comprising a Quantum Genetic Search Algorithm for periodically calculating the correction signal, said Quantum Genetic Search Algorithm comprising a genetic algorithm and a quantum search algorithm merged together;

a fifth circuit for producing a driving signal depending on values of the correction signal; and a sixth circuit for adjusting the transfer characteristics of said second circuit block depending on values of the driving signal and the error signal.

11. A controller according to claim 10 wherein said fifth circuit comprises a fuzzy neural network; and wherein said sixth circuit comprises a fuzzy controller.

12. A controller according to claim 10 wherein said Quantum Genetic Search Algorithm performs the following operations for calculating the correction signal:

generating an initial set of vectors representing in vector form several different possible values of the correction signal;

generating a second set of vectors by a linear superposition of the initial set of vectors;

performing on the second set of vectors a certain number of parallel computations of random entanglement operations and random interference operations according to the quantum search algorithm, and generating as many vector representatives of values of the control signal as of the process;

associating to each resulting value of the parallel computations a fitness function calculated using paired values of the control signal and the state of the process corresponding to the considered resulting value; and performing a selection operation of resulting values of the parallel computations according to the genetic algorithm using the fitness functions, with the correction signal being generated as a final result of the selection.

13. A controller according to claim 10 wherein the process is associated with an internal combustion engine; and wherein the signal derived by said third circuit represents an entropy production of the internal combustion engine.

14. A controller according to claim 12 wherein the signal derived by said third circuit represents an information distance between Shannon entropy and von Neumann entropy of pairs of the control signal and the state of the process; and wherein the fitness function is an information intelligence measure of each resulting value of the parallel computations.

15. A controller according to claim 10 wherein said second circuit block comprises a proportional-integral-differential controller.

* * * * *

UNITED STATES PATENT AND TRADEMARK OFFICE
CERTIFICATE OF CORRECTION

PATENT NO. : 7,383,235 B2
APPLICATION NO. : 09/979348
DATED : June 3, 2008
INVENTOR(S) : Serguei Ulyanov et al.

It is certified that error appears in the above-identified patent and that said Letters Patent is hereby corrected as shown below:

| | |
|---|---|
| Column 1, Line 54 | Delete: "referred as" <br> Insert: --referred to as-- |
| Column 6, Line 62 | Delete: "of" |
| Column 8, Line 23 | Delete: "basic" <br> Insert: --basis-- |
| Column 8, Line 24 | Delete: "peace" <br> Insert: --piece-- |
| Column 8, Line 67 | Delete: "$s=p \oplus q(p_0+q_0)$" <br> Insert: --$s=p \oplus q=(p_0+q_0)$-- |
| Column 9, Line 28 | Delete: "$\oplus$" <br> Insert: --$\otimes$-- |
| Column 10, Line 11 | Delete: "$|i\rangle$" <br> Insert: --$|j\rangle$-- |
| Column 10, Line 57 | Delete: "$\oplus$" <br> Insert: --$\otimes$-- |
| Column 11, Line 21 | Delete: "being" <br> Insert: --be-- |
| Column 13, Line 11 | Delete: "$C\hat{\ }\forall$" <br> Insert: --$C \wedge \forall$-- |
| Column 13, Line 30 | Delete: "$C\hat{\ }\forall$" <br> Insert: --$C \wedge \forall$-- |
| Column 13, Line 33 | Delete: "such that" <br> Insert: --such as that-- |

UNITED STATES PATENT AND TRADEMARK OFFICE
CERTIFICATE OF CORRECTION

PATENT NO. : 7,383,235 B2
APPLICATION NO. : 09/979348
DATED : June 3, 2008
INVENTOR(S) : Serguei Ulyanov et al.

It is certified that error appears in the above-identified patent and that said Letters Patent is hereby corrected as shown below:

| | |
|---|---|
| Column 14, Line 11 | Delete: "$U_F$]"<br>Insert: --$U_F]^h$-- |
| Column 15, Line 62 | Delete: "vector"<br>Insert: --vectors-- |
| Column 16, Line 19 | Delete: "C^∀"<br>Insert: --C∧∀-- |
| Column 16, Line 19 | Delete: "E"<br>Insert: --$\epsilon$-- |
| Column 16, Line 20 | Delete: "⊕"<br>Insert: --⊗-- |
| Column 16, Line 39 | Delete: "($-M_{00} + M_{01} - M_{10} + M_{11}$)"<br>Insert: --($-M_{00} + M_{01} - M_{10} - M_{11}$)-- |
| Column 18, Line 4 | Delete: "x"<br>Insert: --$\underline{x}$-- |
| Column 18, Line 25 | Delete: "C^∀"<br>Insert: --C∧∀-- |
| Column 19, Line 9 | Delete: "\|x>"<br>Insert: --"\|$\underline{x}$>-- |
| Column 19, Line 20 | Delete: "\|x>"<br>Insert: --"\|$\underline{x}$>-- |
| Column 19, Line 52 | Delete: "\|x>"<br>Insert: --"\|$\underline{x}$>-- |
| Column 19, Line 64 | Delete: "\|x>"<br>Insert: --"\|$\underline{x}$>-- |

UNITED STATES PATENT AND TRADEMARK OFFICE
CERTIFICATE OF CORRECTION

PATENT NO. : 7,383,235 B2
APPLICATION NO. : 09/979348
DATED : June 3, 2008
INVENTOR(S) : Serguei Ulyanov et al.

It is certified that error appears in the above-identified patent and that said Letters Patent is hereby corrected as shown below:

| | |
|---|---|
| Column 20, Line 9 | Delete: "\|x>"<br>Insert: --"\|x>-- |
| Column 20, Line 15 | Delete: "\|x>"<br>Insert: --"\|x>-- |
| Column 20, Line 22 | Delete: "\|x>"<br>Insert: --"\|x>-- |
| Column 21, Line 32 | Delete: "coordination the"<br>Insert: --coordination of the-- |
| Column 21, Line 33 | Delete: "these both"<br>Insert: --both these-- |
| Column 22, Line 4 | Delete: "extract"<br>Insert: --extracts-- |
| Column 24, Line 3 | Delete: "$\epsilon_i$"<br>Insert: --$\epsilon_t$-- |
| Column 24, Line 40 | Delete: "trans formation"<br>Insert: --transformation-- |
| Column 26, Line 44 | Delete: "$x_t$"<br>Insert: --$x_t$-- |
| Column 26, Line 44 | Delete: "$c_t$"<br>Insert: --$c_t$-- |
| Column 28, Line 15 | Delete: "follows"<br>Insert: --follow-- |
| Column 29, Line 11 | Delete: "are"<br>Insert: --is-- |
| Column 29, Line 12 | Delete: "provided that" |

UNITED STATES PATENT AND TRADEMARK OFFICE
CERTIFICATE OF CORRECTION

PATENT NO. : 7,383,235 B2
APPLICATION NO. : 09/979348
DATED : June 3, 2008
INVENTOR(S) : Serguei Ulyanov et al.

It is certified that error appears in the above-identified patent and that said Letters Patent is hereby corrected as shown below:

| | |
|---|---|
| Column 31, Line 64 | Delete: "build" <br> Insert: --built-- |
| Column 33, Line 42 | Delete: "is function" <br> Insert: --is a function-- |
| Column 34, Line 10 | Delete: "temporarily" <br> Insert: --temporary-- |
| Column 35, Line 21 | Delete: "includes" <br> Insert: --include-- |
| Column 39, Line 27 | Delete: "an" <br> Insert: --a-- |
| Column 43, Line 4-5 | Delete: "characteristics" <br> Insert: --characteristic-- |
| Column 43, Line 6 | Delete: "feed" <br> Insert: --fed-- |

Signed and Sealed this

Twenty-first Day of October, 2008

JON W. DUDAS
*Director of the United States Patent and Trademark Office*